United States Patent
Hayakawa et al.

(10) Patent No.: US 11,299,566 B2
(45) Date of Patent: Apr. 12, 2022

(54) HINDERED AMINE STABILIZED UV ACTIVE ORGANOPALLADIUM CATALYZED POLYCYCLOOLEFIN COMPOSITIONS AS OPTICAL MATERIALS

(71) Applicant: PROMERUS, LLC, Akron, OH (US)

(72) Inventors: Shun Hayakawa, Akron, OH (US); Guodong Deng, Akron, OH (US); Ruslan Burtovyy, Akron, OH (US); Leah Langsdorf, Akron, OH (US); Larry F Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 0 days.

(21) Appl. No.: 17/356,637

(22) Filed: Jun. 24, 2021

(65) Prior Publication Data

US 2022/0002453 A1    Jan. 6, 2022

Related U.S. Application Data

(60) Provisional application No. 63/043,269, filed on Jun. 24, 2020.

(51) Int. Cl.

| | | |
|---|---|---|
| *C08F 32/04* | (2006.01) | |
| *C08F 132/04* | (2006.01) | |
| *C08F 232/04* | (2006.01) | |
| *C08F 2/50* | (2006.01) | |
| *C08F 4/70* | (2006.01) | |
| *C08F 4/80* | (2006.01) | |
| *C08F 110/14* | (2006.01) | |
| *C08F 210/14* | (2006.01) | |
| *C08F 2/02* | (2006.01) | |
| *C08F 2/24* | (2006.01) | |
| *C08F 32/00* | (2006.01) | |

(52) U.S. Cl.
CPC ............ *C08F 110/14* (2013.01); *C08F 2/50* (2013.01); *C08F 4/7027* (2013.01); *C08F 32/04* (2013.01); *C08F 210/14* (2013.01); *C08F 2/02* (2013.01); *C08F 2/24* (2013.01); *C08F 4/70* (2013.01); *C08F 4/80* (2013.01); *C08F 32/00* (2013.01); *C08F 2500/17* (2013.01)

(58) Field of Classification Search
CPC ...... C08F 32/04; C08F 132/04; C08F 232/04; C08F 2/02; C08F 2/24; C08F 2/50; C08F 4/70; C08F 4/7027; C08F 4/80
See application file for complete search history.

(56) References Cited

U.S. PATENT DOCUMENTS

| | | | |
|---|---|---|---|
| 7,718,744 B2 | 5/2010 | Yoon et al. | |
| 10,626,198 B2 * | 4/2020 | Rhodes | .................... C08F 32/08 |
| 11,230,566 B2 * | 1/2022 | Burtovyy | ................ C07C 13/68 |
| 2004/0229157 A1 | 11/2004 | Rhodes et al. | |
| 2004/0254318 A1 | 12/2004 | Chun et al. | |
| 2018/0194880 A1 | 7/2018 | Rhodes et al. | |
| 2020/0377632 A1 * | 12/2020 | Burtovyy | ................. C08K 5/45 |
| 2021/0198392 A1 * | 7/2021 | Deng | .......................... C08J 5/18 |
| 2021/0198393 A1 * | 7/2021 | Deng | .................... C08F 132/08 |
| 2021/0380733 A1 * | 12/2021 | Byrne | ..................... C07F 5/069 |

FOREIGN PATENT DOCUMENTS

JP    2010-260916 A    11/2010

OTHER PUBLICATIONS

Written Opinion of PCT/US2021/038800, dated Oct. 21, 2021.

* cited by examiner

*Primary Examiner* — Rip A Lee
(74) *Attorney, Agent, or Firm* — Balaram Gupta

(57) ABSTRACT

Embodiments in accordance with the present invention encompass compositions comprising a organopalladium compound, a photoacid generator, a photosensitizer, one or more olefinic monomers and a stabilizer, such as for example a hindered amine, which undergo vinyl addition polymerization when said composition is exposed to a suitable actinic radiation to form a substantially transparent film. The compositions of this invention are stable at room temperature for several days to several months and can also be stored at higher temperatures from about 40° C. to 60° C. for several days and undergo mass polymerization only when subjected to suitable actinic radiation. The monomers employed therein have a range of optical and mechanical properties, and thus these compositions can be tailored to form films having various opto-electronic properties. Accordingly, compositions of this invention are useful in various applications, including as coatings, encapsulants, fillers, leveling agents, sealants, adhesives, among others.

20 Claims, No Drawings

HINDERED AMINE STABILIZED UV ACTIVE ORGANOPALLADIUM CATALYZED POLYCYCLOOLEFIN COMPOSITIONS AS OPTICAL MATERIALS

CROSS REFERENCE TO RELATED APPLICATIONS

This application claims the benefit of U.S. Provisional Application No. 63/043,269, filed Jun. 24, 2020, which is incorporated herein by reference in its entirety.

BACKGROUND OF THE INVENTION

Field of the Invention

Embodiments in accordance with the present invention relate generally to a long shelf life stable single component mass polymerizable polycycloolefin monomer compositions having high optical transparency and exhibiting suitable refractive index that match the refractive index of layers in optical devices, such as optical sensors, light emitting diodes (LEDs), organic light emitting diode (OLED), among other devices. More specifically, this invention relates to single component compositions encompassing norbornene (NB) based olefinic monomers, which are very stable at room temperature to about 60° C. and undergo mass vinyl addition polymerization only when exposed to suitable radiation in the presence of organopalladium catalysts to form optical layers having utility in a variety of opto-electronic applications including as encapsulants, coatings, and fillers.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U. S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

U.S. Pat. Nos. 9,944,818 and 10,266,720, disclose a two component mass polymerizable composition which is capable of tailoring to the desirable refractive index and is suitable as a filler and a protective coating material, thus potentially useful in the fabrication of a variety of OLED devices.

U.S. Pat. No. 10,626,198, discloses a single component mass vinyl addition polymerizable composition which is thermally activated and capable of tailoring to the desirable refractive index and is suitable as a filler and a protective coating material, thus potentially useful in the fabrication of a variety of OLED devices.

However, there is still a need for organic filler materials that are stable at ambient conditions to fabricating temperature conditions of various devices and undergo rapid mass polymerization only when exposed to suitable actinic radiation at ambient temperature or at suitable elevated temperatures.

Thus, it is an object of this invention to provide organic materials that overcome the gaps faced by the art. More specifically, it is an object of this invention to provide a single component composition that will mass polymerize when exposed to suitable actinic radiation under the conditions of the fabrications of an OLED device yet remains stable when stored at ambient temperature conditions to higher temperatures up to 60° C. It is further an object of this invention to provide stable single component mass polymerizable composition with no change in viscosity at or below normal storage conditions but which undergoes mass polymerization only when exposed to suitable actinic radiation.

It is further an object of this invention to provide single component composition that can be used in a variety of other applications including for example 3D printing, ink-jettable coatings, sealants, and the like.

Other objects and further scope of the applicability of the present invention will become apparent from the detailed description that follows.

SUMMARY OF THE INVENTION

Surprisingly, it has now been found that by employing a single component composition encompassing small amounts of certain hindered amine derivatives and other stabilizing compounds, it is now possible to stabilize the compositions from room temperature up to 60° C. for several days, and can be employed for the fabrication of a variety of devices including for example an OLED device having a transparent optical layer which features hitherto unachievable properties, i.e., high colorless optical transparency, desirable film thickness of the filler layer typically in the range of 10 to 20 µm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically treated at ambient fabrication conditions, adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 60° C. for several days to weeks and undergo mass polymerization only when exposed to suitable actinic radiation. The compositions undergo mass vinyl addition polymerization very quickly when subjected to such actinic radiation and generally the compositions become solid objects in few minutes, i.e., within 1-10 minutes and more generally in less than one hour.

Accordingly, there is provided a single component composition encompassing a) one or more olefinic monomers; b) an organopalladium compound of formulae (I) or (IA) or (IB) as described herein; c) a photoacid generator as described herein; d) an additive of the formulae (X) to (XV) as described herein; and e) a photosensitizer.

In another aspect of this invention there is also provided a kit encompassing the composition of this invention for forming a three dimensional object, such as for example, a transparent film.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "⌇" denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "$(C_1-C_6)$alkyl" includes methyl and ethyl groups, and straight-chained or branched propyl, butyl, pentyl and hexyl groups. Particular alkyl groups are methyl, ethyl, n-propyl, isopropyl and tert-butyl. Derived expressions such as "$(C_1-C_4)$alkoxy", "$(C_1-C_4)$thioalkyl" "$(C_1-C_4)$alkoxy$(C_1-C_4)$alkyl", "hydroxy$(C_1-C_4)$alkyl", "$(C_1-C_4)$alkylcarbonyl", "$(C_1-C_4)$alkoxycarbonyl$(C_1-C_4)$alkyl", "$(C_1-C_4)$alkoxycarbonyl", "diphenyl$(C_1-C_4)$alkyl", "phenyl$(C_1-C_4)$alkyl", "phenylcarboxy$(C_1-C_4)$alkyl" and "phenoxy$(C_1-C_4)$alkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_1-C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1-C_6)$perfluoroalkoxy", is to be construed accordingly. It should further be noted that certain of the alkyl groups as described herein, such as for example, "$(C_1-C_6)$alkyl" may partially be fluorinated, that is, only portions of the hydrogen atoms in said alkyl group are replaced with fluorine atoms and shall be construed accordingly.

As used herein, the expression "$(C_6-C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "$(C_6-C_{10})$aryl$(C_1-C_4)$alkyl" means that the $(C_6-C_{10})$aryl as defined herein is further attached to $(C_1-C_4)$alkyl as defined herein. Representative examples include benzyl, phenylethyl, 2-phenylpropyl, 1-naphthylmethyl, 2-naphthylmethyl and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1-C_6)$alkyl, $(C_2-C_6)$alkenyl, $(C_1-C_6)$perfluoroalkyl, phenyl, hydroxy, —$CO_2H$, an ester, an amide, $(C_1-C_6)$alkoxy, $(C_1-C_6)$thioalkyl and $(C_1-C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "derived" is meant that the polymeric repeating units are polymerized (formed) from, for example, polycyclic norbornene-type monomers in accordance with formulae (V) to (VII) wherein the resulting polymers are formed by 2,3 enchainment of norbornene-type monomers as shown below:

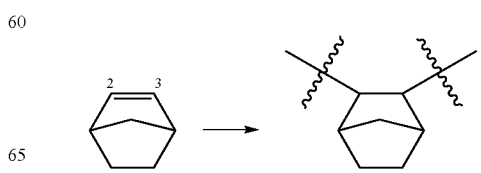

Accordingly, in accordance with the practice of this invention there is provided a single component composition encompassing a) one or more olefinic monomers;

b) an organopalladium compound selected from the group consisting of a compound of formula (I), a compound of formula (IA) and a compound of formula (IB):

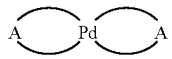
(I)

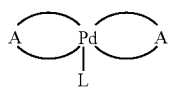
(IA)

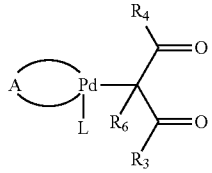
(IB)

wherein:

L is a ligand selected from the group consisting of P(R)$_3$, P(OR)$_3$, O=P(R)$_3$, RCN and substituted or unsubstituted pyridines, where R is selected from the group consisting of methyl, ethyl, linear or branched (C$_3$-C$_{16}$)alkyl, (C$_1$-C$_{16}$)perfluoroalkyl, (C$_3$-C$_{10}$)cycloalkyl, (C$_6$-C$_{10}$)aryl(C$_1$-C$_{16}$)alkyl and substituted or unsubstituted (C$_6$-C$_{10}$)aryl; each A independently is a bidentate monoanionic ligand of formula (II):

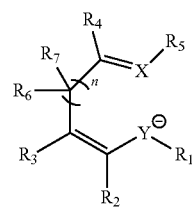
(II)

wherein:

n is an integer 0, 1 or 2;

X and Y are independently of each other selected from O, N and S;

R$_1$, R$_2$, R$_3$, R$_4$, R$_5$, R$_6$ and R$_7$ are the same or different and each independently selected from the group consisting of hydrogen, methyl, ethyl, linear or branched (C$_3$-C$_{16}$)alkyl, (C$_1$-C$_{16}$)perfluoroalkyl, (C$_3$-C$_{10}$)cycloalkyl, (C$_6$-C$_{10}$)aryl (C$_1$-C$_6$)alkyl and substituted or unsubstituted (C$_6$-C$_{10}$)aryl; provided when either X or Y is O or S, R$_1$ and R$_5$, respectively, do not exist;

c) a photoacid generator selected from the group consisting of:

a compound of the formula (III):

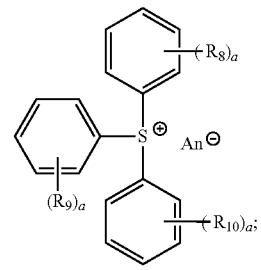
(III)

a compound of the formula (IV):

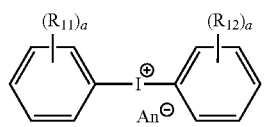
(IV)

wherein:

a is an integer from 0 to 5;

An$^\ominus$ is selected from the group consisting of Cl$^\ominus$, Br$^\ominus$, I$^\ominus$, BF$_4^\ominus$, tetrakis(pentafluorophenyl)borate, tetrakis(3,5-bis (trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3, 4,5-tetrafluorophenyl)borate, tetrakis(3,4,5,6-tetrafluorophenyl)borate, tetrakis(3,4,5-trifluorophenyl) borate, methyltris(perfluorophenyl)borate, ethyltris (perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris (pentafluorophenyl)borate, (octyloxy)tris (pentafluorophenyl)borate, tetrakis[3,5-bis[1-methoxy-2,2, 2-trifluoro-1-(trifluoromethyl)ethyl]pheny-l]borate, tetrakis [3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)-ethyl]-5-(trifluoromethyl)phenyl]borate, PF$_6^\ominus$, SbF$_6^\ominus$, n-C$_4$F$_9$SO$_3^\ominus$, CF$_3$SO$_3^\ominus$ and p-CH$_3$(C$_6$H$_4$)—SO$_3^\ominus$;

R$_8$, R$_9$, R$_{10}$, R$_{11}$ and R$_{12}$ are the same or different and each independently selected from the group consisting of halogen, methyl, ethyl, linear or branched (C$_3$-C$_{20}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$) alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl, (C$_6$-C$_{10}$)-aryloxy, (C$_6$-C$_{10}$)thioaryl, (C$_1$-C$_6$)alkanoyl(C$_6$-C$_{10}$)thioaryl, (C$_1$-C$_6$)alkoxy(C$_6$-C$_{10}$)aroyl(C$_1$-C$_6$)alkyl and (C$_6$-C$_{10}$)thioaryl-(C$_6$-C$_{10}$)diarylsulfonium salt;

d) a compound selected from the group consisting of:

a compound of the formula (X):

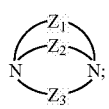
(X)

where $Z_1$, $Z_2$ and $Z_3$ are the same or different and each independently is $((CH_2)_gO)_h(CH_2)_g)$ where g and h are integers from 2 to 4;

a compound of the formula (XI):

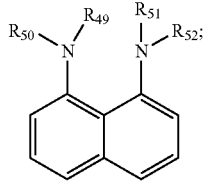

(XI)

where $R_{49}$, $R_{50}$, $R_{51}$ and $R_{52}$ are the same or different and each independently selected from the group consisting of hydrogen, methyl, ethyl and linear or branched $(C_3-C_{20})$ alkyl; and a compound of the formula (XII):

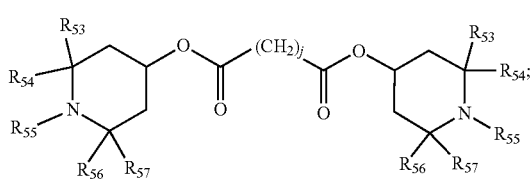

(XII)

a compound of the formula (XIII):

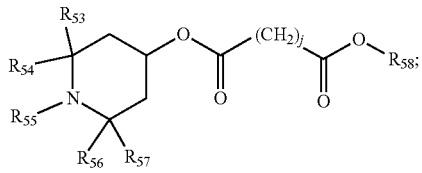

(XIII)

where j is an integer from 6 to 16;

$R_{53}$, $R_{44}$, $R_{56}$, $R_{57}$ and $R_{58}$ are the same or different and each independently selected from the group consisting of hydrogen, methyl, ethyl and linear or branched $(C_3-C_{20})$ alkyl;

$R_{55}$ is selected from the group consisting of methyl, ethyl, linear or branched $(C_3-C_{20})$alkyl, methoxy, ethoxy and linear or branched $(C_3-C_{20})$alkoxy; and a compound of the formula (XIV):

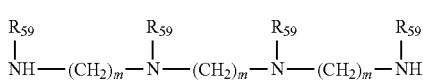

(XIV)

where each m maybe same or different and is an integer from 2 to 6;

$R_{59}$ is a group of the formula:

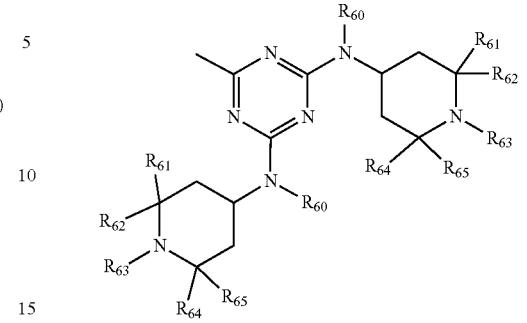

$R_{60}$, $R_{61}$, $R_{62}$, $R_{63}$, $R_{64}$ and $R_{65}$ are the same or different and each independently selected from the group consisting of hydrogen, methyl, ethyl and linear or branched $(C_3-C_{20})$ alkyl; and a compound of the formula (XV):

(XV)

where p is an integer from 1 to 5;

each $R_{66}$ maybe the same or different and each independently selected from the group consisting of halogen, methyl, ethyl and linear or branched $(C_3-C_{20})$alkyl and $NR_{67}R_{68}$, where each $R_{67}$ and $R_{67}$ are the same or different and each independently selected from the group consisting of methyl, ethyl and linear or branched $(C_3-C_{20})$alkyl; and e) a photosensitizer.

It should be noted that the ligand, L of the organopalladium compounds of formulae (IA) or (IB) can generally be a Lewis Base, which is coordinately bonded to palladium. That is, the Lewis Base is bonded to palladium by sharing both of its lone pair of electrons. Accordingly, any of the Lewis Base known in the art that would function as such can be used for this purpose. Advantageously, it has now been found that a Lewis Base, which can dissociate readily under the polymerization conditions as described further in detail below generally provides more suitable compounds of formula (IA) or (IB) as polymerization catalysts, i.e., initiators. Thus, in one aspect of this invention judicious selection of the Lewis Base (LB) will provide a modulation of the catalytic activity of the compounds of this invention.

Accordingly, it has now been found that suitable LBs that can be employed include without any limitation substituted and unsubstituted nitriles, including alkyl nitrile, aryl nitrile or aralkyl nitrile; phosphine oxides, including substituted and unsubstituted trialkyl phosphine oxides, triaryl phosphine oxides, triarylalkyl phosphine oxides, and various combinations of alkyl, aryl and aralkyl phosphine oxides; substituted and unsubstituted pyrazines; substituted and unsubstituted pyridines; phosphites, including substituted and unsubstituted trialkyl phosphites, triaryl phosphites, triarylalkyl phosphites, and various combinations of alkyl, aryl and aralkyl phosphites; phosphines, including substituted and unsubstituted trialkyl phosphines, triaryl phosphines, triarylalkyl phosphines, and various combinations of alkyl, aryl and aralkyl phosphines. Various other LBs that may be employed include various ethers, alcohols, ketones, amines and anilines, arsines, stibines, and the like.

It should further be noted that some of the Lewis Base used herein may also act as stabilizers of the compositions as described further herein. Accordingly, in some embodiments the Lewis Base employed function both as a ligand for the catalyst as well as a stabilizer for the composition of this invention. Accordingly, judicious selection of the Lewis Base (i.e., L) in suitable amounts as described herein may provide uniquely advantageous benefits in not only stabilizing the composition of this invention but also activate the catalyst only when subjected to suitable actinic radiation as further described hereinbelow.

In some embodiments of this invention, the LB is selected from acetonitrile, propionitrile, n-butyronitrile, tert-butyronitrile, benzonitrile ($C_6H_5CN$), 2,4,6-trimethylbezonitrile, phenyl acetonitrile ($C_6H_5CH_2CN$), pyridine, 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 2,6-di-t-butylpyridine, 2,4-di-t-butylpyridine, 2-methoxypyridine, 3-methoxypyridine, 4-methoxypyridine, pyrazine, 2,3,5,6-tetramethylpyrazine, diethyl ether, di-n-butyl ether, dibenzyl ether, tetrahydrofuran, tetrahydropyran, benzophenone, triphenylphosphine oxide, triphenyl phosphate or phosphines or phosphites of formula $PR_3$, where R is independently selected from methyl, ethyl, ($C_3$-$C_6$)alkyl, substituted or unsubstituted ($C_3$-$C_7$)cycloalkyl, ($C_6$-$C_{10}$)aryl, ($C_6$-$C_{10}$)aralkyl, methoxy, ethoxy, ($C_3$-$C_6$)alkoxy, substituted or unsubstituted ($C_3$-$C_7$) cycloalkoxy, ($C_6$-$C_{10}$)aryloxy or ($C_6$-$C_{10}$)arylalkoxy. Representative examples of $PR_3$ include without any limitation trimethyl phosphine, triethyl phosphine, tri-n-propyl phosphine, tri-iso-propyl phosphine, tri-n-butyl phosphine, tri-iso-butyl phosphine, tri-tert-butyl phosphine, tricyclopentylphosphine, triallylphosphine, tricyclohexylphosphine, triphenyl phosphine, trimethyl phosphite, triethyl phosphite, trifluoroethyl phosphite, tri-n-propyl phosphite, tri-iso-propyl phosphite, tri-n-butyl phosphite, tri-iso-butyl phosphite, tri-tert-butyl phosphite, tricyclopentylphosphite, triallylphosphite, tricyclohexylphosphite, triphenyl phosphite, and the like. It should however be noted that various other known LBs which will bring about the intended activity can also be used in this embodiment of the invention.

Surprisingly, it has now been found that employing small amounts of one or more of an additive of formulae (X) to (XV) it is now possible to stabilize the compositions of this invention. In general, the shelf life stability of the compositions can be increased from 0 days to several days by using any of the additives of formulae (X) to (XV). It has been observed that by employing as low as 0.1 molar parts of ay one of the additives when compared with 2 to 4 molar parts of the photoacid generators the stability of the compositions of this invention can be improved as much as seven to fourteen days at room temperature. Although it is not clear as to how the stability of the compositions are increased it is speculated that by employing one or more additives of formulae (X) to (XV) it is now possible to stabilize the photoacid generator. It is further postulated that any acid released by the photoacid generator is neutralized by the additive of formulae (X) to (XV) and thereby preventing any premature polymerization of the olefinic monomers as employed herein.

The amount of the additive of formulae (X) to (XV) also depends on the types of the additive employed and thus the amount may vary depending upon the specific type of additive employed in a composition of this invention. Also, mixtures of additives can be employed which may include one or more of the same types of additives of formulae (X) to (XV) or a mixture of one or more of additives of formulae (X) to (XV). A several of these additives are also known in the art and readily available commercially. For example, the additives of formulae (XII) and (XIII) are known commercially. For example, a mixture of a compound of formula (XII) and a compound of formula (XIII) is commercially available under the tradename TINUVIN® 292, which is a mixture of bis(1,2,2,6,6-pentamethylpiperidin-4-yl) sebacate and methyl 1,2,2,6,6-pentamethylpiperidin-4-yl sebacate. A compound of formula (XI), 1,8-bis(dimethylamino)-naphthalene, is commercially available under the tradename PROTON SPONGE®. Similarly, various other compounds of formulae (X) to (XV) as described herein are commercially available, and are commonly used as light stabilizers, particularly, ultraviolet (UV) rays. Specifically, the compounds of formulae (X) to (XV) operate as UV protectors by combining with oxygen when exposed to light to form stable nitroxide radicals. Accordingly, the compounds of formulae (X) to (XV) provide additional benefits for the composition of this invention.

Accordingly, in some embodiments, the composition of this invention encompasses one or more compounds of formula (X), which provide increased stability to the compositions, thereby increasing their shelf life stability at room temperature from one week to two weeks or longer. The compounds of formula (X) are commonly known as cryptands and various cryptands that are suitable as an additive in the composition of this invention are further described below. The amount of the compound of formula (X) employed can vary from 0.05 molar parts to 0.5 molar parts when compared with 2 to 4 molar parts of the photoacid generator employed. In some other embodiments the amount of the compound of formula (X) employed can be higher than 0.5 molar parts, such as for example, 1 molar parts when compared with 2 to 4 molar parts of the photoacid generator employed.

In some embodiments, the composition of this invention encompasses one or more compounds of formula (XI), which provide increased stability to the compositions, thereby increasing their shelf life stability at room temperature from one week to five weeks or longer. In some embodiments the shelf life stability can be increased up to four months by employing a compound of formula (XI) as an additive in the composition of this invention. The amount of the compound of formula (XI) employed can vary from 0.005 molar parts to 0.5 molar parts when compared with 2 to 4 molar parts of the photoacid generator employed. In some other embodiments the amount of the compound of formula (XI) employed can be higher than 0.5 molar parts, such as for example, 1 molar parts when compared with 2 to 4 molar parts of the photoacid generator employed.

In some other embodiments, the composition of this invention encompasses one or more compounds of formula (XII), which provide increased stability to the compositions, thereby increasing their shelf life stability at room temperature from seven days to eighty days or longer. In some embodiments the shelf life stability can be increased up to eight months by employing a compound of formula (XII) as an additive in the composition of this invention. The amount of the compound of formula (XII) employed can vary from 0.005 molar parts to 1 molar part when compared with 2 to 4 molar parts of the photoacid generator employed. In some other embodiments the amount of the compound of formula (XII) employed can be higher than 1 molar part, such as for example, 2 molar parts when compared with 2 to 4 molar parts of the photoacid generator employed. In some embodiments the additive employed is a mixture of a compound of formula (XII) and a compound of formula (XIII.)

In some embodiments a compound of formula (XIV) is used as an additive in the composition of this invention. An exemplary compound of formula (XIV) is:

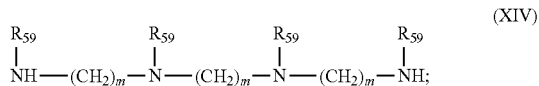

where m is 3, $R_{59}$ is a group of the formula:

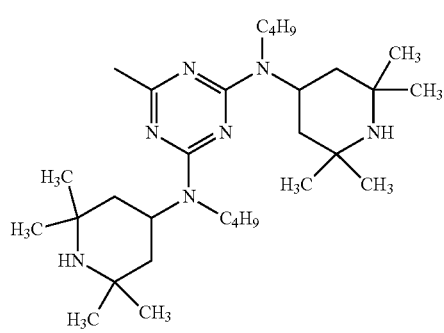

is available commercially under the tradename CHIMASSORB® 119 from BASF.

In some other embodiments, the composition of this invention encompasses one or more compounds of formula (XV), which provide increased stability to the compositions, thereby increasing their shelf life stability at room temperature from seven days to eighty days or longer. The amount of the compound of formula (XV) employed can vary from 0.005 molar parts to 1 molar part when compared with 2 to 4 molar parts of the photoacid generator employed. In some other embodiments the amount of the compound of formula (XV) employed can be higher than 1 molar part, such as for example, 2 molar parts when compared with 2 to 4 molar parts of the photoacid generator employed.

Non-limiting examples of the compounds of formula (X) include the following:

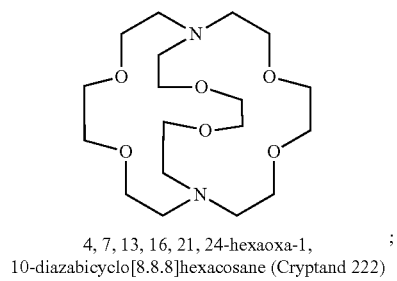

4, 7, 13, 16, 21, 24-hexaoxa-1,
10-diazabicyclo[8.8.8]hexacosane (Cryptand 222)

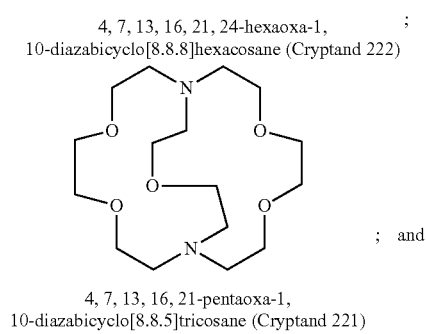

4, 7, 13, 16, 21-pentaoxa-1,
10-diazabicyclo[8.8.5]tricosane (Cryptand 221)

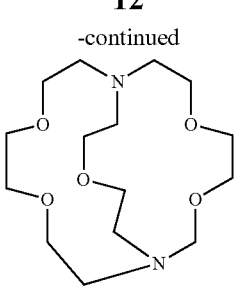

4, 7, 13, 18-tetraoxa-1, 10-diazabicyclo[8.5.5]icosane (Cryptand 211)

Non-limiting examples of the compounds of formula (XI) include the following:

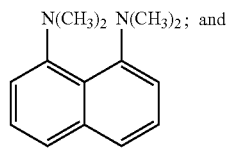

1,8-bis(dimethylamino)naphthalene (Proton Sponge®)

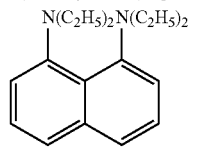

1,8-bis(diethylamino)naphrhalene

Non-limiting examples of the compounds of formula (XII) include the following:

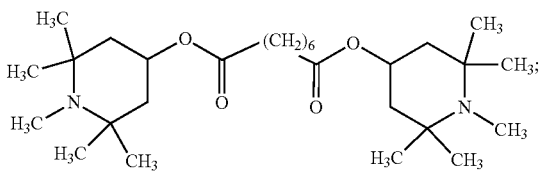

bis(1,2,2,6,6-pentamethylpiperidin-4-yl) octanedioate

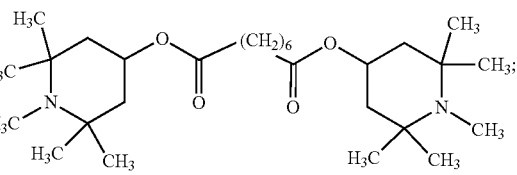

bis(1,2,2,6,6-pentamethylpiperidin-4-yl) sebacate (HALS-1)

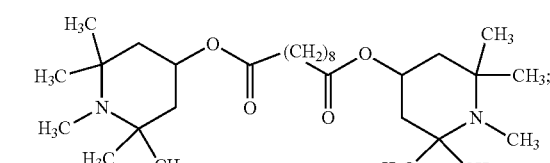

bis(2,2,6,6-tetramethyl-1-(octyloxy)piperidin-4-yl sebacate (HALS-2)

-continued

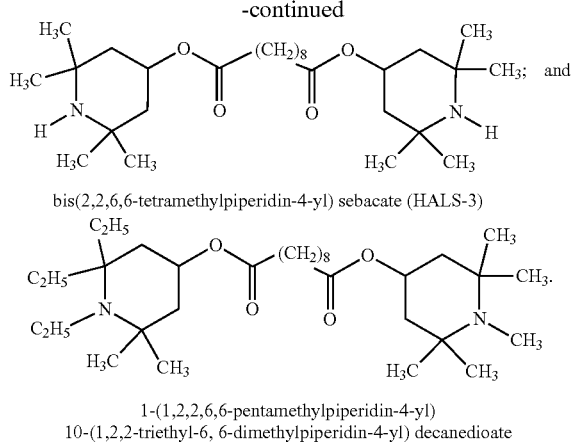

bis(2,2,6,6-tetramethylpiperidin-4-yl) sebacate (HALS-3)

1-(1,2,2,6,6-pentamethylpiperidin-4-yl)
10-(1,2,2-triethyl-6, 6-dimethylpiperidin-4-yl) decanedioate Non-limiting examples of the compounds of formula (XIII) include the following:

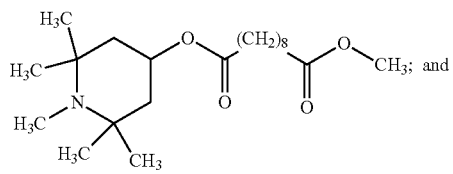

methyl (1,2,2,6,6-pentamethylpiperidin-4-yl) sebacate

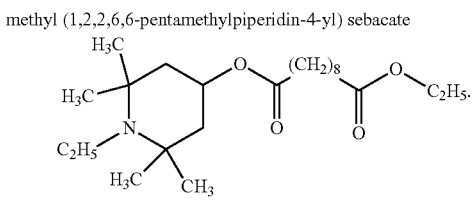

1-ethyl 10-(1-ethyl-2,2,6,6-tetramethylpiperidin-4-yl) decanedioate

Non-limiting examples of the compounds of formula (XV) include the following:
2,6-di-tert-butylpyridine (DBP);
4-methyl-2,6-di-tert-butylpyridine;
4-dimethylaminopyridine (DMAP); and
3-bromopyridine (BP).

Various olefinic monomers which undergo vinyl addition polymerization can be employed in the composition of this invention. Such olefinic monomers include without any limitation alicyclic olefins, such as ethylene, propylene, butylene, styrene, and the like. Other olefinic monomers include cyclo-olefins and bicyclo-olefins, and so on.

In some embodiments of this invention the olefinic monomers which are suitable in the composition of this invention are of the formula (V):

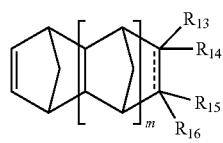

(V)

wherein:
m is an integer 0, 1 or 2;
====== is a single bond or a double bond;

$R_{13}$, $R_{14}$, $R_{15}$ and $R_{16}$ are the same or different and each independently selected from the group consisting of hydrogen, halogen, a hydrocarbyl or halohydrocarbyl group selected from methyl, ethyl, linear or branched ($C_3$-$C_{16}$) alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, epoxy($C_1$-$C_{10}$)alkyl, epoxy($C_1$-$C_{10}$)alkyloxy($C_1$-$C_{10}$)alkyl, epoxy($C_3$-$C_{10}$)cycloalkyl, perfluoro($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy, ($C_6$-$C_{10}$)aryl($C_1$-$C_6$)alkoxy, perfluoro($C_6$-$C_{10}$)aryloxy, perfluoro($C_6$-$C_{10}$)aryl($C_1$-$C_3$)alkoxy, a group of formula (A):

—Z-Aryl    (A);

a group of formula (A1):

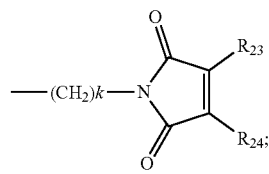

(A1)

a group of formula (A2):

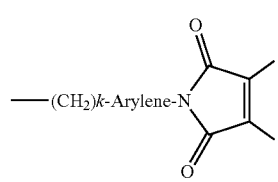

(A2)

a group of formula (A3):

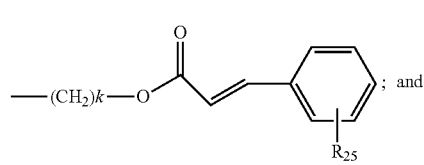

(A3)

a group of formula (A4):

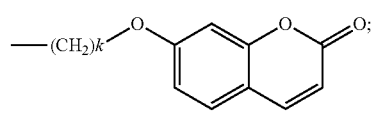

(A4)

wherein:
Z is selected from the group consisting of:
O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, $(SiR_{17}R_{18})_bO$, where $R_{17}$ and $R_{18}$ are the same or different and each independently selected from hydrogen, methyl, ethyl, linear or branched $(C_3-C_{12})$alkyl, substituted or unsubstituted $(C_6-C_{14})$aryl, methoxy, ethoxy, linear or branched $(C_3-C_6)$alkyloxy, $(C_2-C_6)$acyl, $(C_2-C_6)$acyloxy, and substituted or unsubstituted $(C_6-C_{14})$aryloxy; and b is an integer from 0 to 12, inclusive; Aryl is selected from the group consisting of substituted or unsubstituted phenyl, substituted or unsubstituted biphenyl and substituted or unsubstituted naphthyl, substituted or unsubstituted terphenyl, substituted or unsubstituted anthracenyl substituted or unsubstituted fluorenyl, wherein said substituents are selected from the group consisting of halogen, methyl, ethyl, linear or branched $(C_3-C_6)$alkyl, perfluoro$(C_1-C_{12})$alkyl, $(C_3-C_{12})$cycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_6)$alkyl, methoxy, ethoxy, linear or branched $(C_3-C_{16})$alkoxy, perfluoro$(C_1-C_{12})$alkoxy, $(C_3-C_{12})$cycloalkoxy, $(C_6-C_{10})$aryloxy, $(C_6-C_{10})$aryl$(C_1-C_6)$alkoxy, perfluoro$(C_6-C_{10})$aryloxy and perfluoro$(C_6-C_{10})$aryl$(C_1-C_3)$alkoxy;

k is an integer from 1 to 12;

$R_{23}$, $R_{24}$ and $R_{25}$ are the same or different and each independently selected from the group consisting of hydrogen, methyl, ethyl, linear or branched $(C_3-C_{12})$alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_6)$alkyl; or $R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$aryl;

or one of $R_{13}$ and $R_{14}$ taken together with one of $R_{15}$ and $R_{16}$ and the carbon atoms to which they are attached to form a substituted or unsubstituted $(C_5-C_{14})$cyclic, $(C_5-C_{14})$bicyclic or $(C_5-C_{14})$tricyclic ring.

More specifically, the Aryl as defined herein is substituted or unsubstituted biphenyl of formula:

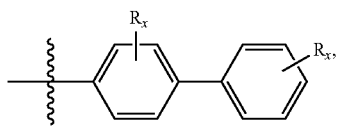

substituted or unsubstituted naphthyl of formula:

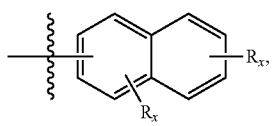

substituted or unsubstituted terphenyl of formula:

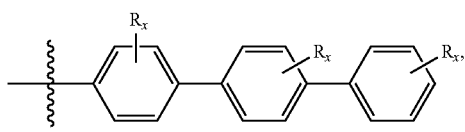

substituted or unsubstituted anthracenyl of formula:

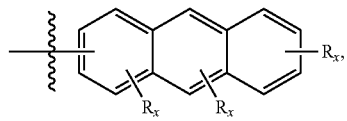

substituted or unsubstituted fluorenyl of formula:

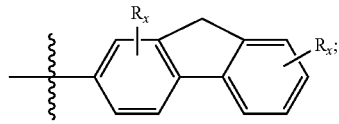

where $R_x$ in each occurrence is independently selected from methyl, ethyl, linear or branched $(C_3-C_{12})$alkyl or $(C_6-C_{10})$aryl;

The monomers of formula (V) as described herein are themselves known in the literature or can be prepared by any of the known methods in the art to make such or similar types of monomers.

In addition, the monomers as described herein readily undergo mass vinyl addition polymerization, i.e., in their neat form without use of any solvents by vinyl addition polymerization using transition metal procatalysts, such as for example, organopalladium compounds as described herein. See for example, U.S. Pat. Nos. 7,442,800 B2; and 7,759,439 B2; pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the organopalladium compound of formula (I), a photoacid generator or photosensitizer as described herein or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the organopalladium compound of formula (I), a photoacid generator or photosensitizer and/or monomers can be employed in this invention. Examples of such solvents include alkanes, cycloalkanes, aromatics, such as toluene, ester solvents such as ethyl acetate, THF, dichloromethane, dichloroethane, and the like.

Advantageously, it has now been found that one or more of the monomers themselves can be used to dissolve the organopalladium compound of formula (I) or a photoacid generator or photosensitizer and thus avoiding the need for the use of solvents. In addition, one monomer can itself serve as a solvent for the other monomer and thus eliminating the need for an additional solvent. For example, if a first monomer of formula (V) is a solid at room temperature, then a second monomer of formula (V), which is a liquid at room temperature can be used as a solvent for the first monomer of formula (V) which is a solid or vice versa. Therefore, in such situations more than one monomer can be employed in the composition of this invention.

In some embodiments, the monomers of formula (V) employed in the composition of this invention may serve as high refractive index materials imparting high refractive index to the resulting polymeric film upon mass polymerization. In general, the monomers of formula (V) which are suitable in this invention feature a refractive index of at least 1.5. In some embodiments the refractive index of the monomers of formula (V) is higher than 1.5. In some other embodiments the refractive index of the monomers of formula (V) is in the range from about 1.5 to 1.6. In yet some other embodiments the refractive index of the monomers of formula (V) is higher than 1.55, higher than 1.6 or higher than 1.65. In some other embodiments it may even be higher than 1.7.

In some other embodiments, it is generally contemplated that monomer of formula (V) may also be used as a viscosity modifier. Accordingly, in general, such a monomer of formula (V) is a liquid at room temperature and can be used in conjunction with another monomer of formula (V) which is a solid or a high viscosity liquid.

In a further embodiment of this invention the composition of this invention encompasses at least two different monomers of formula (V) and is in a clear liquid state having a viscosity below 100 centipoise. In general, the composition of this invention exhibits low viscosity, which can be below 100 centipoise. In some embodiments, the viscosity of the composition of this invention is less than 90 centipoise. In some other embodiments the viscosity of the composition of this invention is in the range from about 5 to 100 centipoise. In yet some other embodiments the viscosity of the composition of this invention is lower than 80 cP, lower than 60 cP, lower than 40 cP, lower than 20 cP. In some other embodiments it may even be lower than 10 cP or lower than 8 cP.

When the composition of this invention contains two monomers, they can be present in any desirable amounts that would bring about the intended benefit, including either refractive index modification or viscosity modification or both or any other desirable property depending upon the intended final application. Accordingly, the molar ratio of first monomer of formula (V) to second monomer of formula (V) can be from 0:100 to 100:0. That is, only one monomer of formula (V) can be employed in certain applications. In other words, any amount of these two monomers can be employed. In some embodiments, the molar ratio of first monomer of formula (V):second monomer of formula (V) is in the range from 1:99 to 99:1; in some other embodiments it is from 5:95 to 95:5; it is from 10:90 to 90:10; it is from 20:80 to 80:20; it is from 30:70 to 70:30; it is from 60:40 to 40:60; and it is 50:50, and so on.

In general, the compositions in accordance with the present invention encompass the above described one or more of monomer of formula (V), as it will be seen below, various composition embodiments are selected to provide properties to such embodiments that are appropriate and desirable for the use for which such embodiments are directed, thus such embodiments are tailorable to a variety of specific applications. Accordingly, in some embodiments the composition of this invention contains more than two distinct monomers of formula (V), such as for example three different monomers of formula (V) or four different monomers of formula (V).

For example, as already discussed above, proper combination of different monomers of formula (V) makes it possible to tailor a composition having the desirable refractive index, viscosity and optical transmission properties, among other properties. In addition, it may be desirable to include other polymeric or monomeric materials which are compatible to provide desirable optical properties depending upon the end use application. Accordingly, the compositions of this invention can also include other high refractive polymeric materials which will bring about such intended benefit. Examples of such polymers include without any limitation, poly(α-methylstyrene), poly(vinyl-toluene), copolymers of α-methylstyrene and vinyl-toluene, and the like.

Advantageously, it has further been found that the compositions of this invention can also contain additional monomers different from the monomer of formula (V). In some embodiments, the composition according to this invention may further contain one or more monomers selected from monomer of formula (VI) or monomer of formula (VII).

The monomer of formula (VI) is:

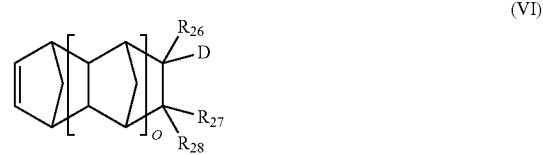

(VI)

wherein:

o is an integer from 0 to 2, inclusive;

D is $SiR_{29}R_{30}R_{31}$ or a group selected from:

$$-(CH_2)_c-O-SiR_{29}R_{30}R_{31} \qquad (E);$$

$$-(CH_2)_c-SiR_{29}R_{30}R_{31} \qquad (F); \text{ and}$$

$$-(SiR_{29}R_{30})_c-O-SiR_{29}R_{30}R_{31} \qquad (G); \text{ wherein}$$

c is an integer from 1 to 10, inclusive, and where one or more of $CH_2$ is optionally substituted with $(C_1-C_{10})$alkyl or $(C_1-C_{10})$perfluoroalkyl;

$R_{26}$, $R_{27}$ and $R_{28}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{29}$, $R_{30}$ and $R_{31}$ are each independently of one another methyl, ethyl, linear or branched $(C_3-C_9)$alkyl, substituted or unsubstituted $(C_6-C_{14})$aryl, methoxy ethoxy, linear or branched $(C_3-C_9)$alkoxy or substituted or unsubstituted $(C_6-C_{14})$aryloxy.

In this aspect of the invention, it has now been found that monomers of formula (VI) provides further advantages. Namely, the monomers of formula (VI) depending upon the nature of the monomer may impart high or low refractive index to the composition, thus it can be tailored to meet the need. In addition, the monomers of formula (VI) generally improve the adhesion properties and thus can be used as "adhesion modifiers." Finally, the monomers of formula (VI) may exhibit low viscosity and good solubility for the procatalyst and/or activator, among various other advantages.

The monomer of formula (VII) is:

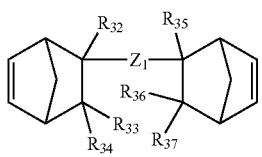
(VII)

wherein:

$Z_1$ is selected from the group consisting of substituted or unsubstituted $(C_1-C_{12})$alkylene, $-(CH_2)_dO(CH_2)_e-$, $-(CH_2)_a(SiR_{38}R_{39})(OSiR_{40}R_{41})_f(CH_2)_e-$ where d, e and f are independently integers from 0 to 6, inclusive, $R_{38}$, $R_{39}$, $R_{40}$ and $R_{41}$ are the same or different and independently of each other selected from methyl, ethyl, linear or branched $(C_3-C_{12})$alkyl, and an arylene selected from the following:

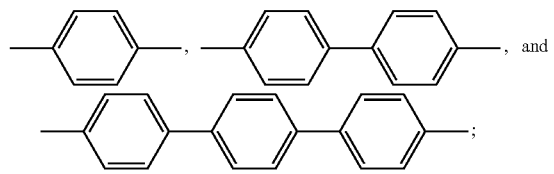

$R_{32}$, $R_{33}$, $R_{34}$, $R_{35}$, $R_{36}$ and $R_{37}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$-aryloxy.

The monomers of formula (VII) are bifunctional monomers and may exhibit high refractive index especially when $Z_1$ is an arylene group. Accordingly, it is contemplated that incorporation of monomers of formula (VII) into composition of this invention generally increases the refractive index of the composition and also increase crosslinkability with other molecules. Thus, by incorporation of monomers of formula (VII) into the composition of this invention it may be possible to increase compatibility with other materials depending upon the intended application thereby enhancing the properties of the composition of the invention.

In another aspect of this invention it is conceivable that the composition of this invention may contain only one monomer of formula (V) or formula (VI) or formula (VII). That is, any one of the monomers of formulae (V) to (VII) may be sufficient to form a composition of this invention. In some other embodiments the composition of this invention encompasses any two monomers of formulae (V) to (VII) and in any desirable proportions. In some other embodiments the composition of this invention encompasses any three monomers of formulae (V) to (VII) in any combinations thereof and in any desirable proportions. All such possible permutations and combinations of monomers of formulae (V) to (VII) are part of this invention.

Accordingly, any of the monomers within the scope of monomer of formula (V) can be employed in the composition of the invention. Representative examples of monomer of formula (V) include the following without any limitations:

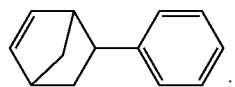
5-phenylbicyclo[2.2.1]
hept-2-ene (PhNB)

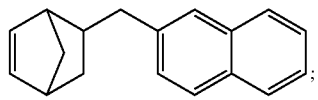
2-(bicyclo[2.2.1]hept-5-en-2-ylmethyl)naphthalene

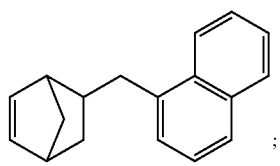
1-(bicyclo[2.2.1]hept-5-en-2-ylmethyl)naphthalene

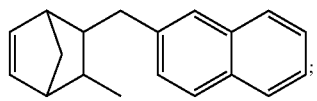
2-((3-methylbicyclo[2.2.1]hept-5-en-2-yl)methyl)naphthalene

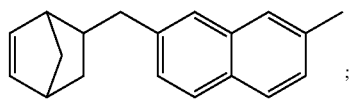
2-(bicyclo[2.2.1]hept-5-en-2-ylmethyl)-7-methylnaphthalene

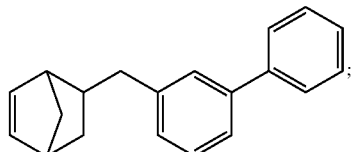
5-([1,1'-biphenyl]-3-ylmethyl)bicyclo[2.2.1]hept-2-ene

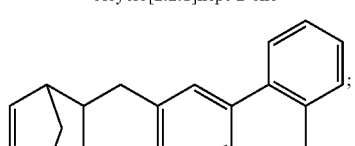
5-((2'-methyl-[1,1'-biphenyl]-3-yl)methyl)bicyclo[2.2.1]hept-2-ene

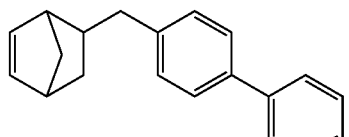
5-([1,1'-biphenyl]-4-ylmethyl)bicyclo[2.2.1]hept-2-ene

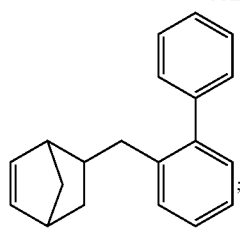

5-([1,1'-biphenyl]-2-ylmethyl)bicyclo[2.2.1]hept-2-ene

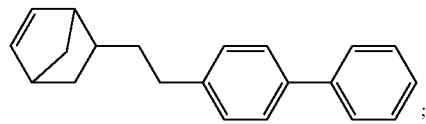

5-(2-([1,1'-biphenyl]-4-yl)ethyl)bicyclo[2.2.1]hept-2-ene (NBEtPhPh)

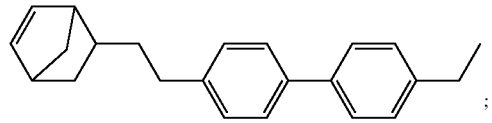

5-(2-(4'-ethyl-[1,1'-biphenyl]-4-yl)ethyl)bicyclo[2.2.1]hept-2-ene

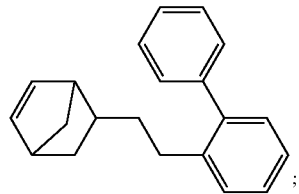

5-(2-([1,1'-biphenyl]-2-yl)ethyl)bicyclo[2.2.1]hept-2-ene

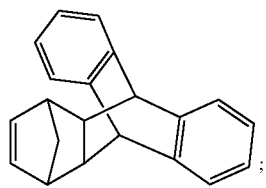

(9R,10S,11R,12S)-9,10-dihydro-9,10-[2]bicycloanthracene

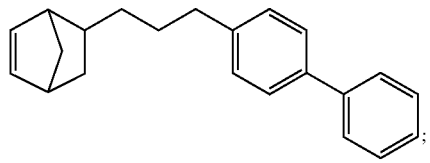

5-(3-([1,1'-biphenyl]-4-yl)propyl)bicyclo[2.2.1]hept-2-ene

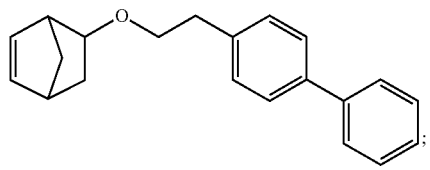

5-(2-([1,1'-biphenyl]-4-yl)ethoxy)bicyclo[2.2.1]hept-2-ene

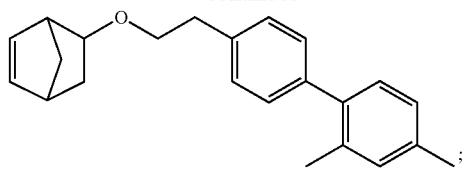

5-(2-(2',4'-dimethyl-[1,1'-biphenyl]-4-yl)ethoxy)bicyclo[2.2.1]hept-2-ene

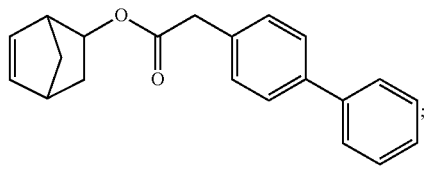

bicyclo[2.2.1]hept-5-en-2-yl 2-([1,1'-biphenyl]-4-yl)acetate

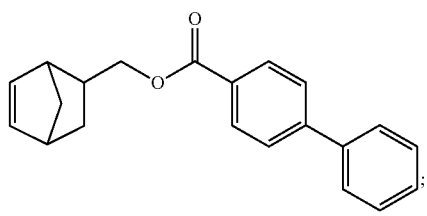

bicyclo[2.2.1]hept-5-en-2-ylmethyl [1,1'-biphenyl]-4-carboxylate

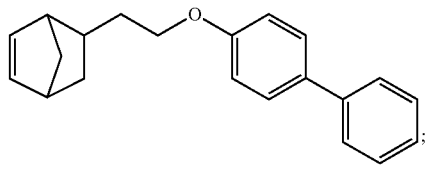

5-(2-([1,1'-biphenyl]-4-yloxy)ethyl)bicyclo[2.2.1]hept-2-ene

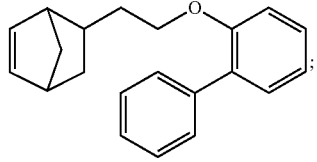

5-(2-([1,1'-biphenyl]-2-yloxy)ethyl)bicyclo[2.2.1]hept-2-ene (NBEtOPhPh)

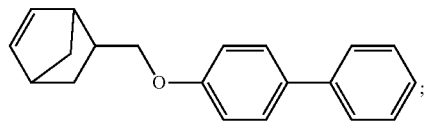

5-(2-([1,1'-biphenyl]-4-yloxy)methyl)bicyclo[2.2.1]hept-2-ene

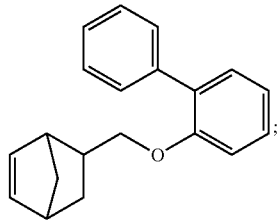

5-(2-([1,1'-biphenyl]-2-yloxy)methyl)bicyclo[2.2.1]hept-2-ene (NBMeOPhPh)

-continued

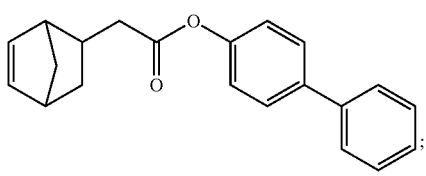

[1,1'-biphenyl]-4-yl 2-
(bicyclo[2.2.1]hept-5-en-2-yl)
acetate

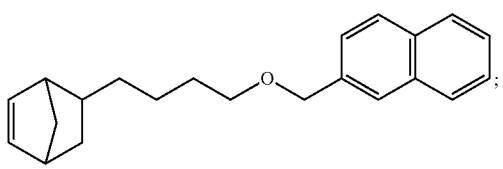

2-((4-(bicyclo[2.2.1]hept-5-en-2-
yl)butoxy)methyl)naphthalene

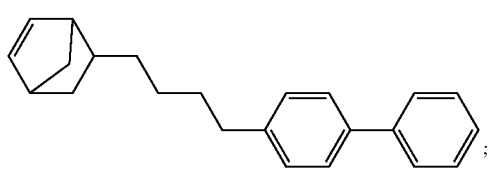

5-(4-([1,1'-biphenyl]-4-yl)
butyl)bicyclo[2.2.1]hept-2-ene

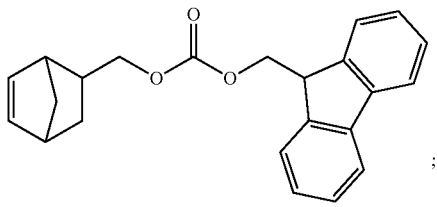

(9H-fluoren-9-yl)methyl
(bicyclo[2.2.1]hept-5-en-2-ylmethyl)
carbonate

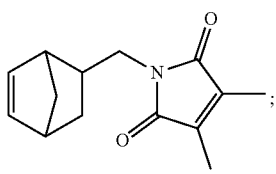

1-(4-bicyclo[2.2.1]hept-5-
en-2-ylmethyl)-
3,4-dimethyl-1H-pyrrole-
2,5-dione
(MeDMMINB)

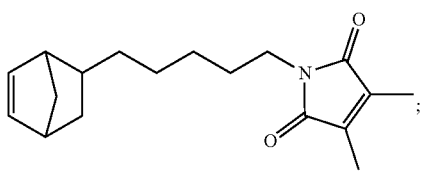

1-(4-bicyclo[2.2.1]hept-5-en-2-ylpentyl)-
3,4-dimethyl-1H-pyrrole-2,5-dione
(PentylDMMINB)

-continued

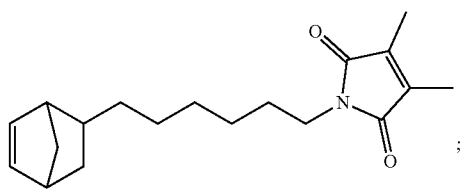

1-(4-bicyclo[2.2.1]hept-5-en-2-ylhexyl)-
3,4-dimethyl-1H-pyrrole-2,5-dione
(HxDMMINB)

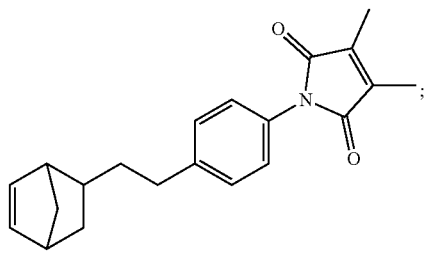

1-(4-bicyclo[2.2.1]hept-5-en-2-ylethyl)1,4-phenylene-
3,4-dimethyl-1H-pyrrole-2,5-dione (EtPhDMMINB)

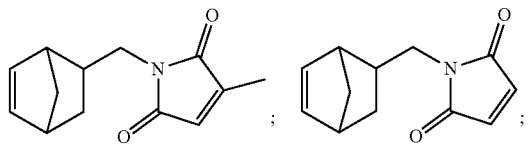 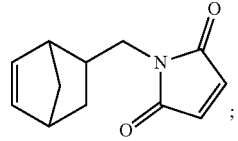

1-(4-bicyclo[2.2.1]hept-5-en-2-
ylmethyl)-3-methyl-
1H-pyrrole-2,5-dione
(MeMMINB)

1-(4-bicyclo[2.2.1]hept-
5-en-2-ylmethyl)-1H-
pyrrole-2,5-dione
(MeMINB)

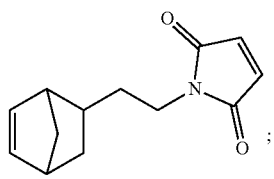

1-(4-bicyclo[2.2.1]hept-5-
en-2-ylethyl)-1H-pyrrole-
2,5-dione
(EtMINB)

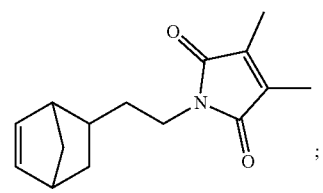

1-(4-bicyclo[2.2.1]hept-5-
en-2-ylethyl)-3,4-dimethyl-1H-pyrrole-
2,5-dione

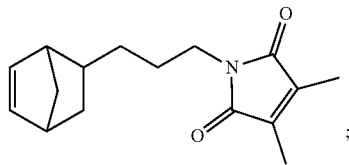

1-(4-bicyclo[2.2.1]hept-5-en-
2-ylpropyl)-
3,4-dimethyl-1H-pyrrole-2,5-dione

-continued

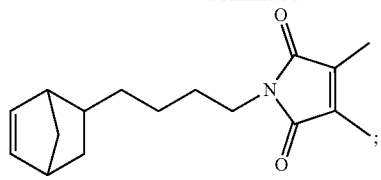

1-(4-bicyclo[2.2.1]hept-5-en-2-ylbutyl)-
3,4-dimethyl-1H-pyrrole-2,5-dione

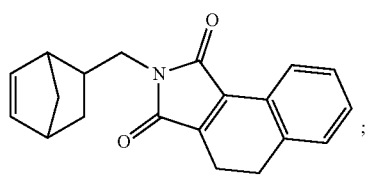

NBDHNMI

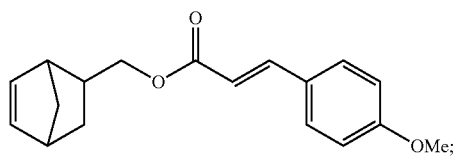

bicyclo[2.2.1]hept-5-en-2-ylmethyl
4-methoxy-cinnamate
(NBMeMeOCinn)

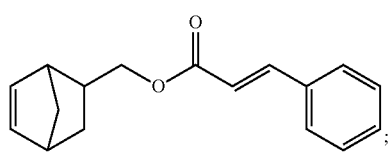

bicyclo[2.2.1]hept-5-en-2-ylmethyl
cinnamate
(NBMeCinn)

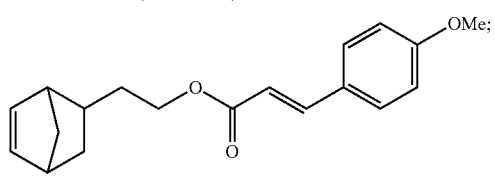

bicyclo[2.2.1]hept-5-en-2-ylethyl
4-methoxy-cinnamate
(NBEtMeOCinn)

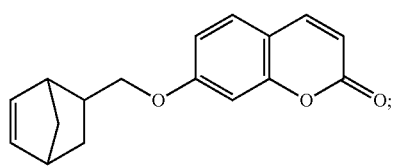

7-(bicyclo[2.2.1]hept-5-en-2-ylmethoxy)-
2H-chromen-2-one
(NBMeCoum)

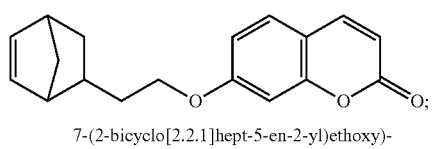

7-(2-bicyclo[2.2.1]hept-5-en-2-yl)ethoxy)-
2H-chromen-2-one
(NBEtCoum)

-continued

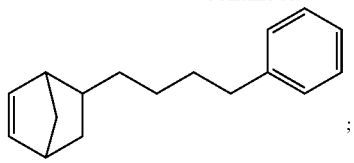

5-(4-phenylbutyl)bicyclo
[2.2.1]hept-2-ene

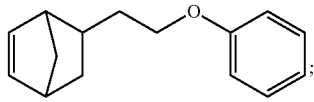

5-(2-phenoxyethyl)bicyclo
[2.2.1]hept-2-ene

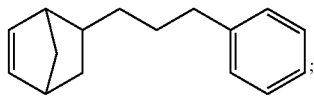

5-(3-phenylpropyl)bicyclo
[2.2.1]hept-2-ene

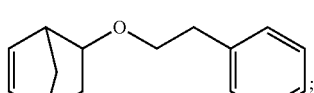

5-phenethoxybicyclo
[2.2.1]hept-2-ene

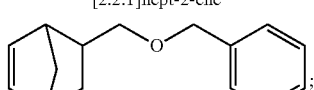

5-((benzyloxy)methyl)bicyclo
[2.2.1]hept-2-ene

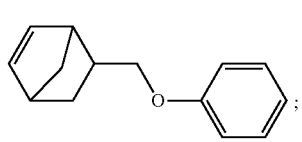

5-(phenoxymethyl)bicyclo
[2.2.1]hept-2-ene

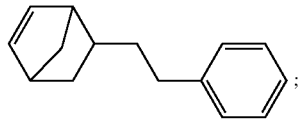

5-phenethylbicyclo
[2.2.1]hept-2-ene

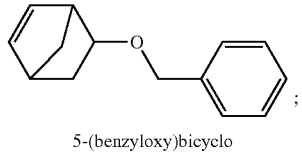

5-(benzyloxy)bicyclo
[2.2.1]hept-2-ene

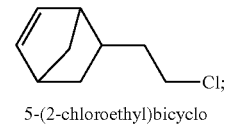

5-(2-chloroethyl)bicyclo
[2.2.1]hept-2-ene
(NBEtCl)

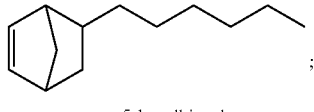

5-hexylbicyclo
[2.2.1]hept-2-ene
(HexNB)

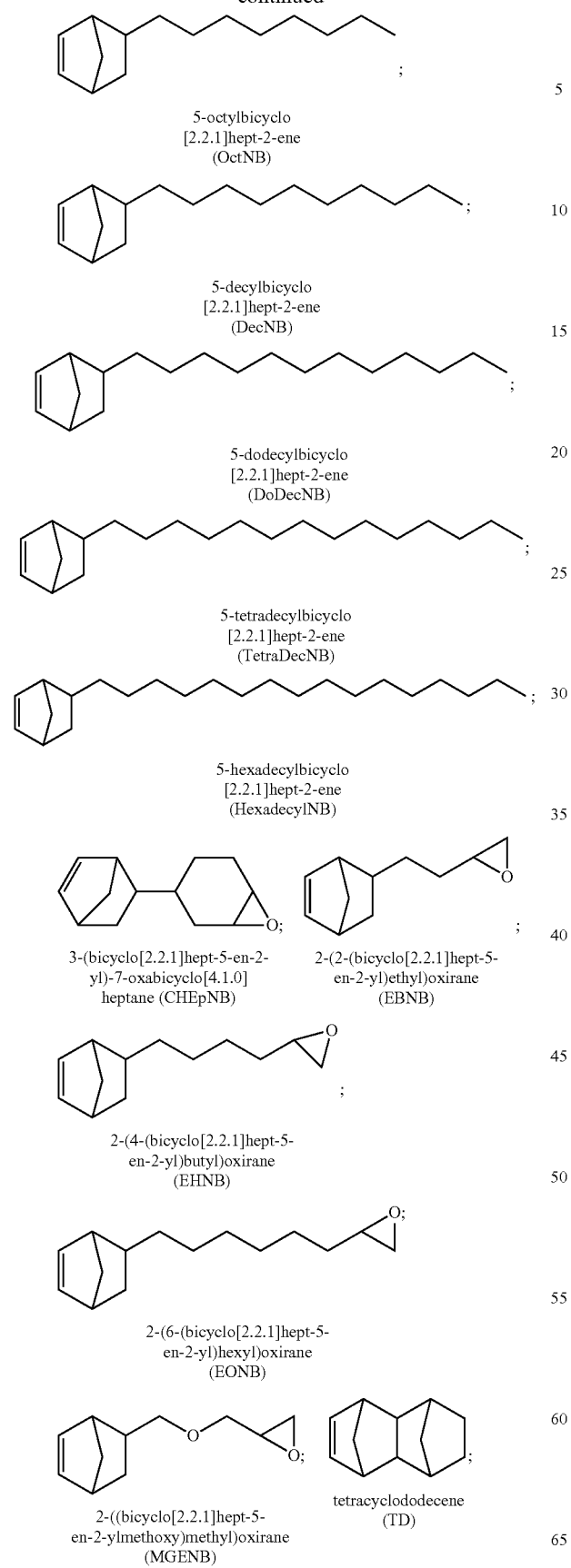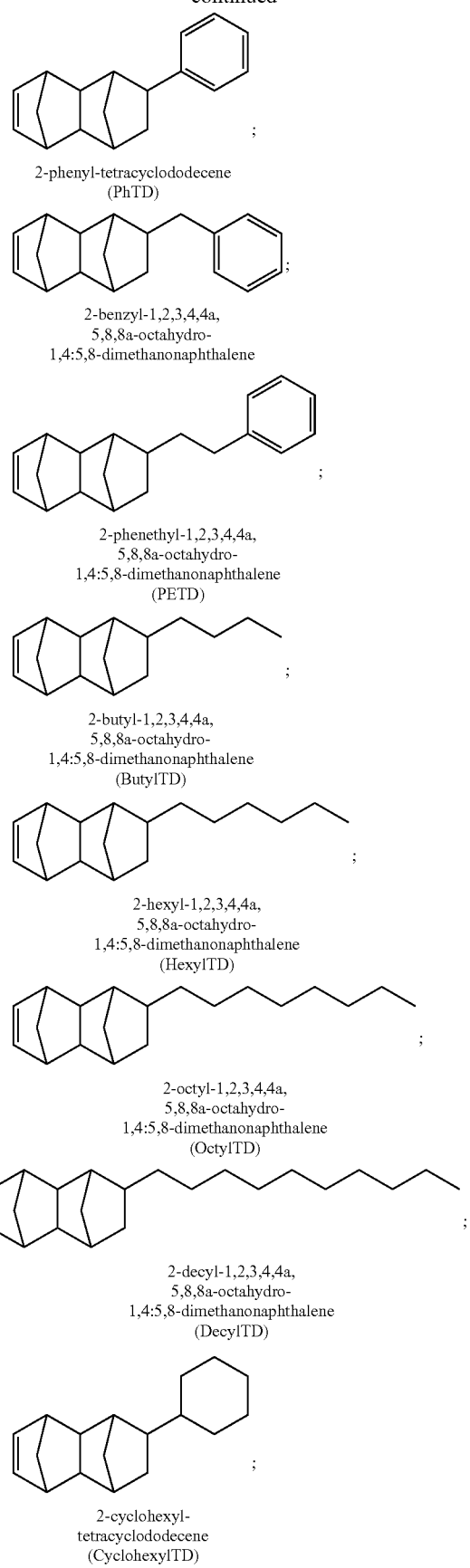

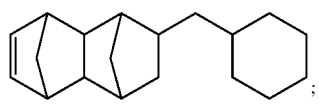

2-cyclohexylmethyl-1,2,3,4,4a,5,8,8a-
octahydro-1,4:5,8-
dimethanonaphthalene

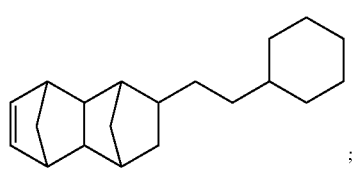

; and 2-cyclohexylethyl-1,2,3,4,4a,5,8,8a-
octahydro-1,4:5,8-
dimethanonaphthalene

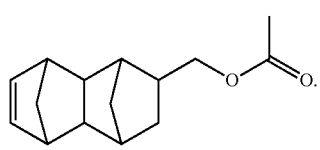

(1,2,3,4,4a,5,8,8a-octahydro-
1,4:5,8-dimethanonaphthalen-
2-yl)methyl acetate
(TDMeOAc)

Again it should be noted that any of the aforementioned monomers of formula (V) can be used as one or more monomers in any combination thereof in the compositions of this invention. All such permissible combinations are part of this invention.

Turning now to monomer of formula (VI) to form the composition of this invention it is contemplated that any monomer within the scope of monomer of formula (VI) can be employed. Exemplary monomers of such type include but not limited to those selected from the group consisting of:

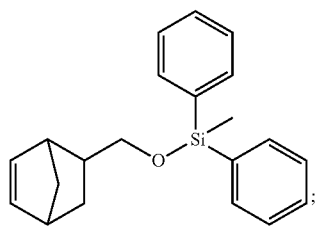

(bicyclo[2.2.1]hept-5-en-2-ylmethoxy)
(methyl)diphenylsilane
(NBCH$_2$OSiMePh$_2$)

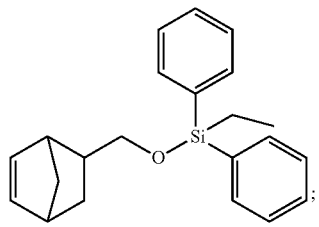

(bicyclo[2.2.1]hept-5-en-2-ylmethoxy)
(ethyl)diphenylsilane

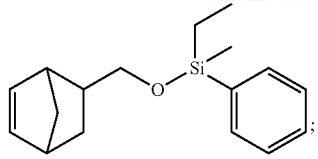

(bicyclo[2.2.1]hept-5-en-2-ylmethoxy)
(ethyl)(methyl)(phenyl)silane

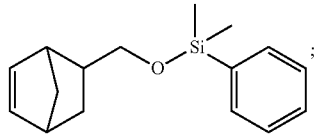  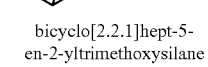

(bicyclo[2.2.1]hept-5-en-2-ylmethoxy)
dimethyl(phenyl)silane bicyclo[2.2.1]hept-5-
en-2-yltrimethoxysilane

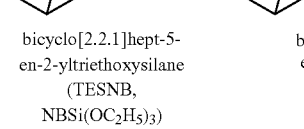

bicyclo[2.2.1]hept-5-
en-2-yltriethoxysilane
(TESNB,
NBSi(OC$_2$H$_5$)$_3$)

bicyclo[2.2.1]hept-5-
en-2-yl(tert-butoxy)
dimethoxysilane

(2-(bicyclo[2.2.1]hept-5-
en-2-yl)ethyl)
trimethoxysilane

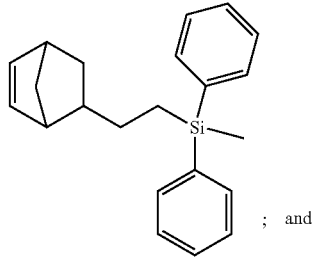

; and (2-(bicyclo[2.2.1]hept-5-en-
2-yl)ethyl)
(methyl)diphenylsilane

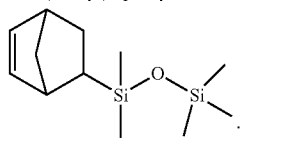

1-(bicyclo[2.2.1]hept-
5-en-2-yl)-1,1,3,3,3-
pentamethyldisiloxane

Turning now to monomer of formula (VII) to form the composition of this invention it is contemplated that any monomer within the scope of monomer of formula (VII) can be employed. Exemplary monomers of such type include but not limited to those selected from the group consisting of:

1,4-di(bicyclo[2.2.1]hept-5-en-2-yl)benzene

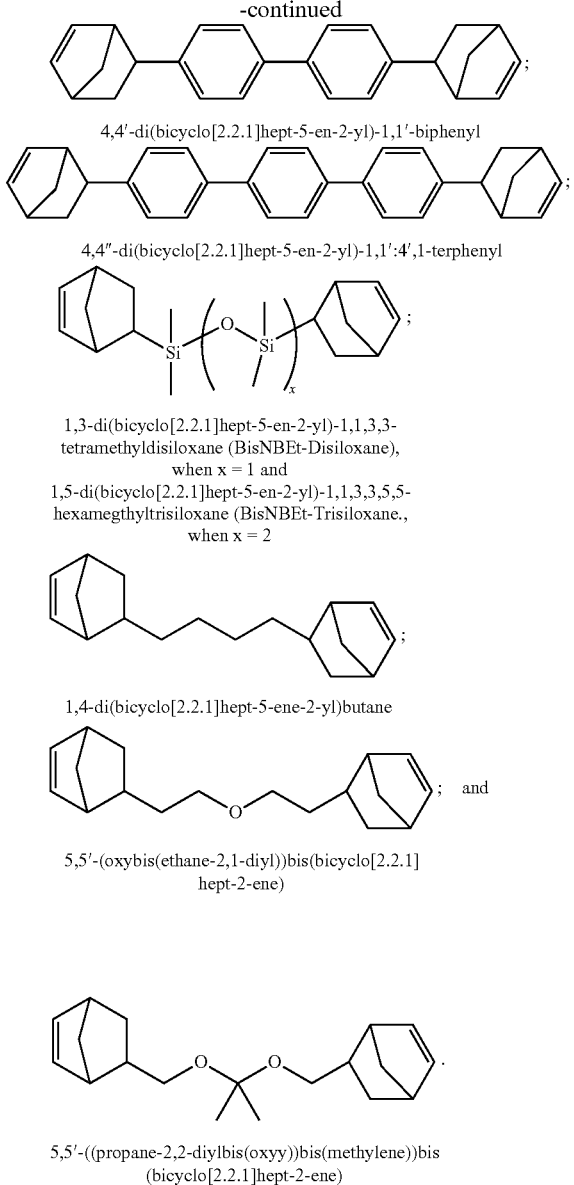

4,4′-di(bicyclo[2.2.1]hept-5-en-2-yl)-1,1′-biphenyl 4,4″-di(bicyclo[2.2.1]hept-5-en-2-yl)-1,1′:4′,1-terphenyl 1,3-di(bicyclo[2.2.1]hept-5-en-2-yl)-1,1,3,3-tetramethyldisiloxane (BisNBEt-Disiloxane), when x = 1 and
1,5-di(bicyclo[2.2.1]hept-5-en-2-yl)-1,1,3,3,5,5-hexamegthyltrisiloxane (BisNBEt-Trisiloxane., when x = 2

1,4-di(bicyclo[2.2.1]hept-5-ene-2-yl)butane 5,5′-(oxybis(ethane-2,1-diyl))bis(bicyclo[2.2.1]hept-2-ene) ; and 5,5′-((propane-2,2-diylbis(oxyy))bis(methylene))bis(bicyclo[2.2.1]hept-2-ene).

In a further embodiment, the composition of this invention encompasses one or more monomers of formula (V) and at least one monomer of formula (VI).

In another embodiment, the composition of this invention encompasses one or more monomers of formula (VI) and at least one monomer of formula (VII) and optionally one monomer of formula (V).

In yet a further embodiment, the composition of this invention encompasses at least one monomer of formula (V) and at least one monomer of formula (VI), and optionally one monomer of formula (VII).

In yet a further embodiment, the composition of this invention encompasses one monomer of formula (VI), optionally one or more monomers of formula (V) or monomer of formula (VII).

In yet another embodiment, the composition of this invention may include one or more monomers selected from the following:

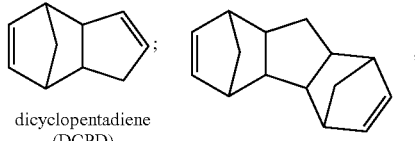

dicyclopentadiene (DCPD)

4,4a,4b,5,8,8a,9,9a-octahydro-1H-1,4:5,8-dimethanofluorene (one of trimers of cyclopentadiene, TCPD2)

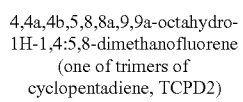

1-methyoxy-dixyxlopentadiene 1-(n-butoxy)-dicyclopentadiene

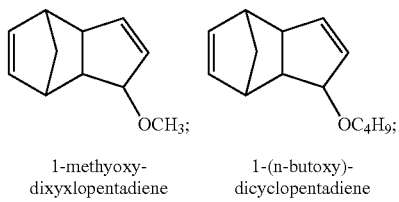

1-(n-butoxy)-dicyclopentadiene 3a,4,7,7a-tetrahydro-1H-4,7-methanoinden-1-yl acetate

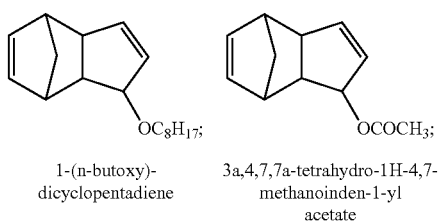

3a,4,7,7a-tetrahydro-1H-4,7-methanoinden-1-yl benzoate

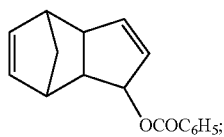

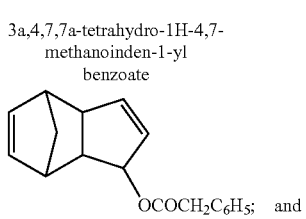

3a,4,7,7a-tetrahydro-1H-4,7-methanoinden-1-yl 2-phenylacetate

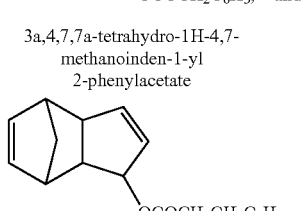

3a,4,7,7a-tetrahydro-1H-4,7-methanoinden-1-yl 3-phenylpropanoate

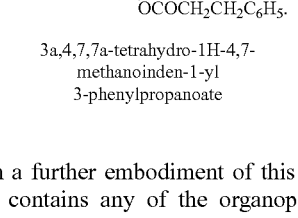

In a further embodiment of this invention, the composition contains any of the organopalladium compounds of formula (I) that would bring about the mass polymerization as described herein. Generally, such suitable organopalladium compound of formula (I) contains a bidentate monoanionic ligand which is selected from the group consisting of:

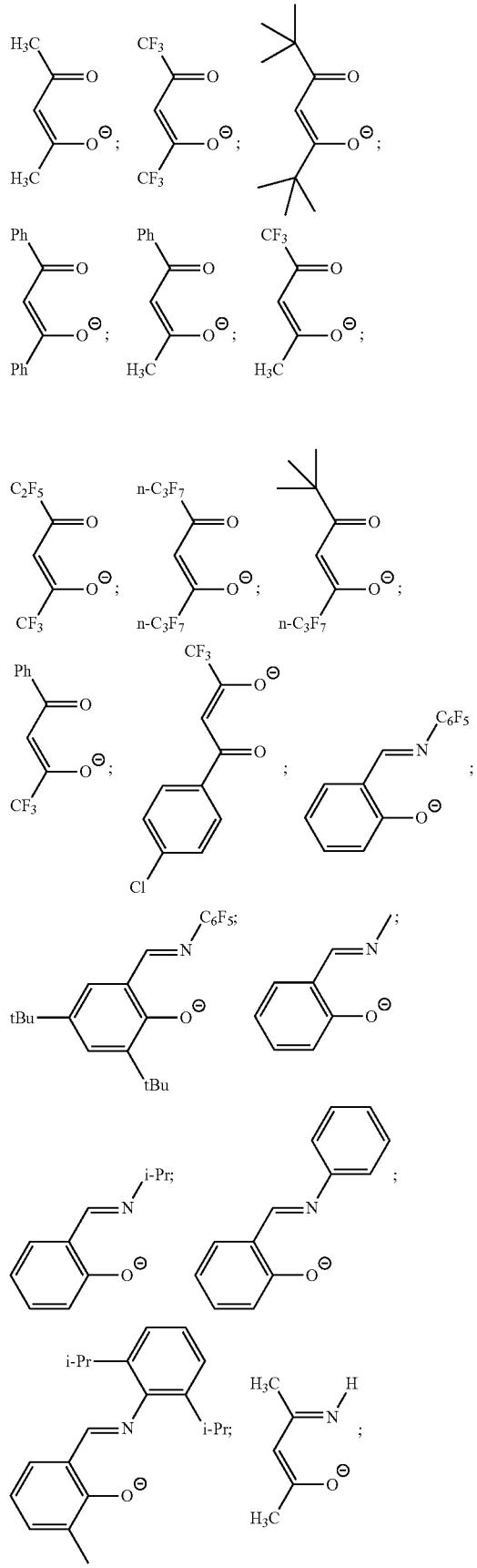

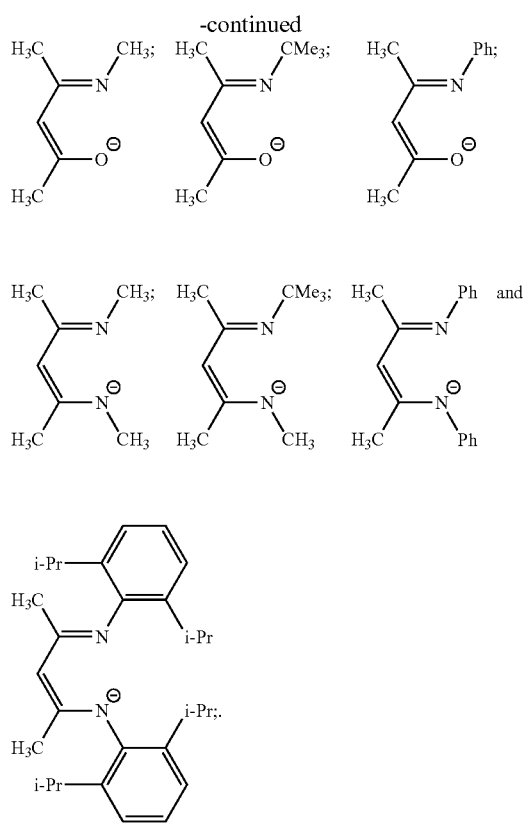

Several of the organopalladium compounds of formula (I) that are suitable to be employed in the compositions of this invention are known in the literature or can be readily made by any of the known procedures in the art. See for example, U.S. Pat. Nos. 7,442,800 B2 and 7,759,439 B2, pertinent portions of which are incorporated herein by reference.

Exemplary organopalladium compounds of formula (I) or organopalladium compounds of formula (IA) that can be employed in the composition of this invention without any limitation include the following:

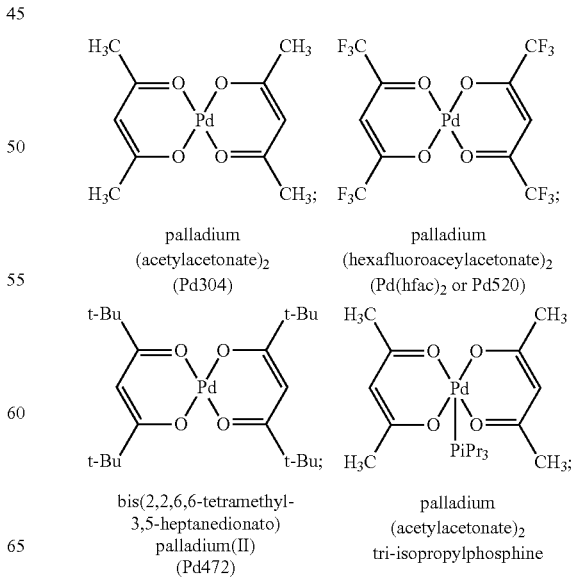

palladium (acetylacetonate)₂ (Pd304)

palladium (hexafluoroaceylacetonate)₂ (Pd(hfac)₂ or Pd520)

bis(2,2,6,6-tetramethyl-3,5-heptanedionato) palladium(II) (Pd472)

palladium (acetylacetonate)₂ tri-isopropylphosphine

-continued

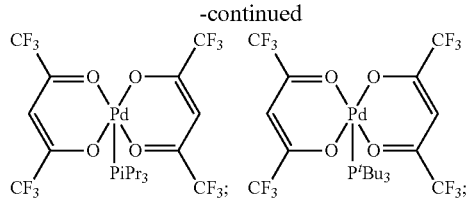

palladium
(hexafluoroacetylacetonat)₂
tri-isopropylphosphine
(Pd680)

palladium
(hexafluoroacetylacetonat)₂
tri-tert-butylphosphine
(Pd(hfac)₂P(tert-Bu)₃,
Pd722)

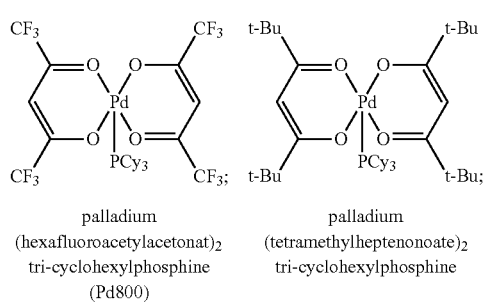

palladium
(hexafluoroacetylacetonat)₂
tri-cyclohexylphosphine
(Pd800)

palladium
(tetramethylheptenonoate)₂
tri-cyclohexylphosphine

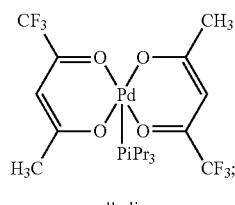

palladium
(trifluoroacetylacetonate)₂
(Pd(tfacac)₂)
tri-isopropylphosphine

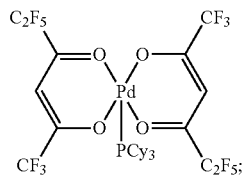

palladium
(pentafluoropropionyltrifluoroacetonate)₂
tri-cyclohexylphosphine

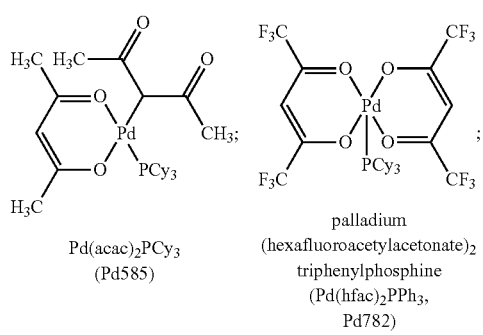

Pd(acac)₂PCy₃
(Pd585)

palladium
(hexafluoroacetylacetonate)₂
triphenylphosphine
(Pd(hfac)₂PPh₃,
Pd782)

-continued

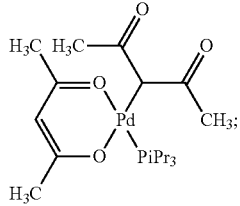

palladium
(acetylacetonate)₂
tri-isopropylphosphine
(Pd(acac)₂PiPr₃,
Pd465)

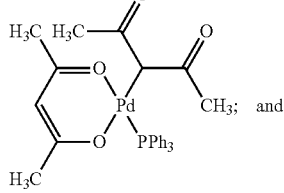

palladium
(acetylacetonate)₂
triphenylphosphine
(Pd(acac)₂PPh₃)

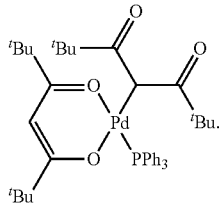

palladium
(2,2,6,6-tetramethylheptane-3,5-
dionate)₂
triphenylphosphine

As noted, the composition of this invention further contains a photoacid generator which when combined with the organopalladium compound of formula (I) and a photosensitizer will cause mass polymerization of the monomers contained therein when exposed to suitable radiation as described herein. Any of the known photoacid generators can be used in the compositions of this invention, such as for example, certain of the halonium salts.

In some embodiments the photoacid generator of the formula (IVa) are employed in the composition of this invention:

$$Aryl_1\text{-}Hal^{\oplus}\text{-}Aryl_2An^{\ominus} \qquad (IVa)$$

Wherein $Aryl_1$ and $Aryl_2$ are the same or different and are independently selected from the group consisting of substituted or unsubstituted phenyl, biphenyl and naphthyl; Hal is iodine or bromine; and $An^{\ominus}$ is a weakly coordinating anion (WCA) which is weakly coordinated to the cation complex. More specifically, the WCA anion functions as a stabilizing anion to the cation complex. The WCA anion is relatively inert in that it is non-oxidative, non-reducing, and non-nucleophilic. In general, the WCA can be selected from borates, phosphates, arsenates, antimonates, aluminates, boratobenzene anions, carborane, halocarborane anions, sulfonamidate and sulfonates Representative examples of the compounds of formula (IVa) may be listed as follows:

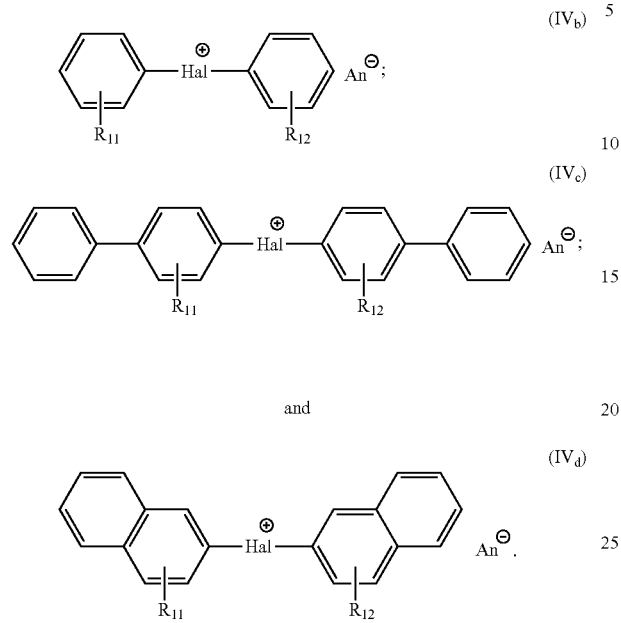

Wherein $R_{11}$ and $R_{12}$ are as defined herein. Similarly various sulfonium salts can be used as photoacid generators, which include broadly compounds of formula (III) as described herein.

Accordingly, non-limiting examples of suitable photoacid generators of formula (III) that may be employed in the composition of this invention are listed below:

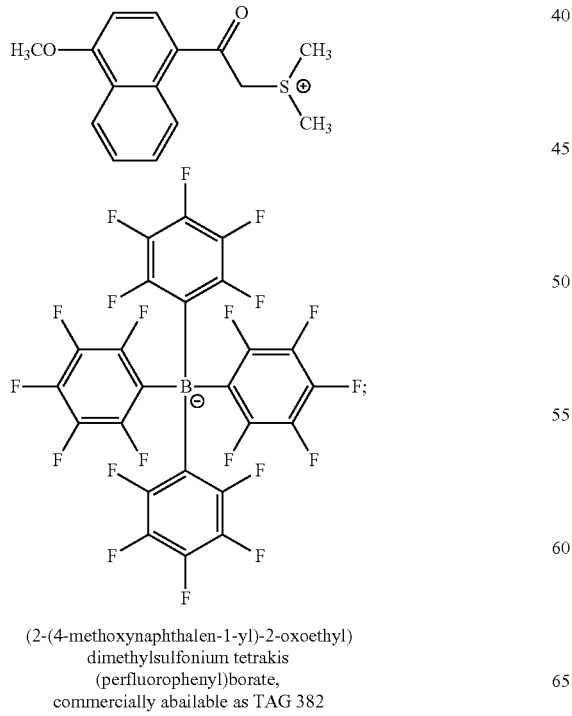

(2-(4-methoxynaphthalen-1-yl)-2-oxoethyl) dimethylsulfonium tetrakis (perfluorophenyl)borate, commercially abailable as TAG 382

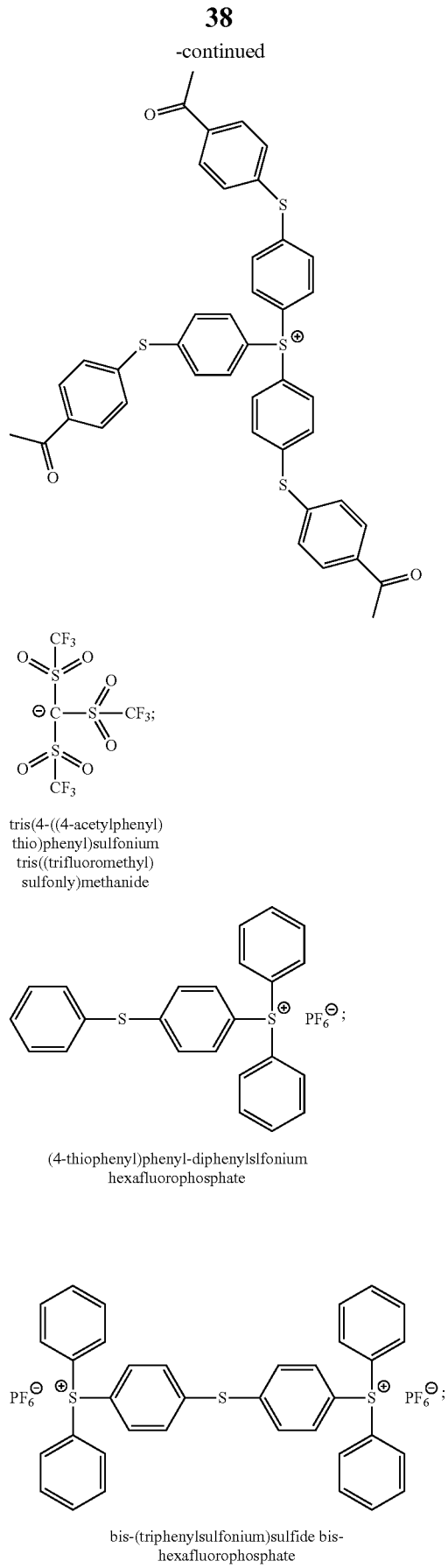

tris(4-((4-acetylphenyl) thio)phenyl)sulfonium tris((trifluoromethyl) sulfonly)methanide (4-thiophenyl)phenyl-diphenylslfonium hexafluorophosphate bis-(triphenylsulfonium)sulfide bis-hexafluorophosphate

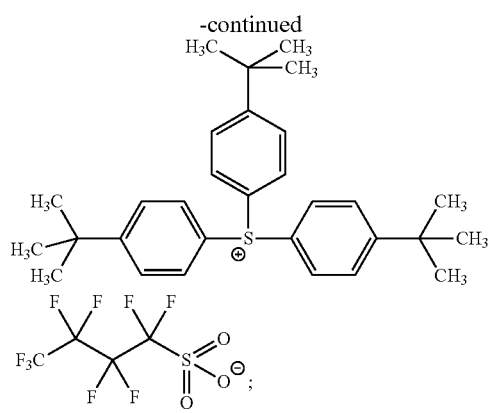

tris(4-tert-butylphenyl)sulfonium
perfluoro-butanesulfonate

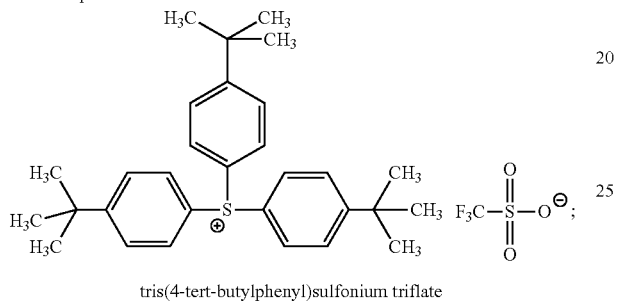

tris(4-tert-butylphenyl)sulfonium triflate

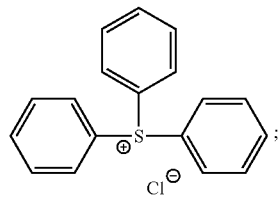

triphenylsulfonium chloride

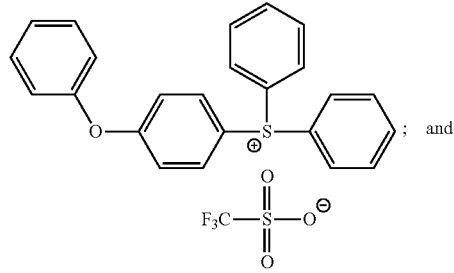

; and (4-phenoxyphenyl)diphenylsulfonium triflate

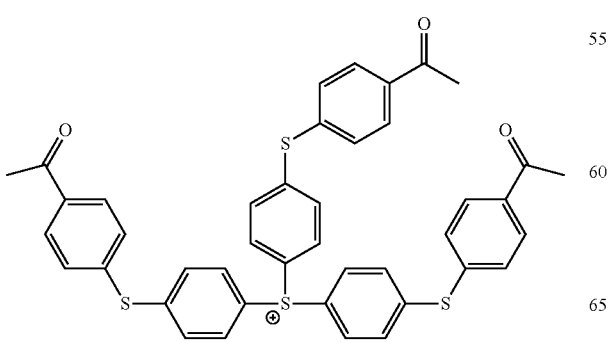

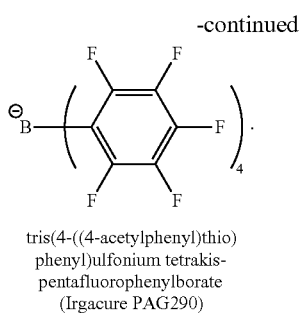

tris(4-((4-acetylphenyl)thio)
phenyl)ulfonium tetrakis-
pentafluorophenylborate
(Irgacure PAG290)

Non-limiting examples of suitable photoacid generators of formula (IV) that may be employed in the composition of this invention are listed below:

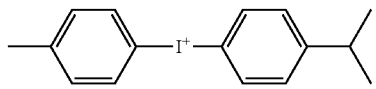

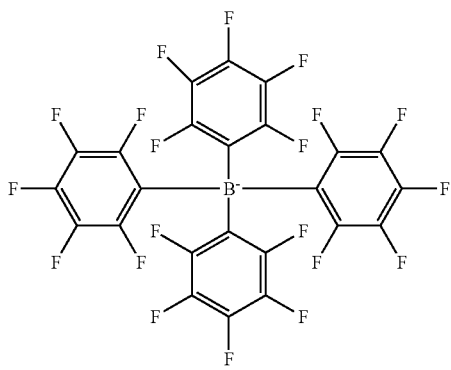

tolylcumyliodonium-tetrakis pentafluorophenylborate, commercially available under the tradename Bluesil PI 2074® from Elkem Silicones;

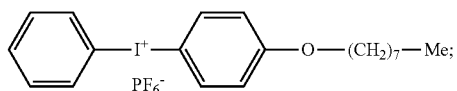

[4-(octyloxy)phenyl]-phenyliodonium (hexafluoro)
phosphate (OPPI PF$_6$)

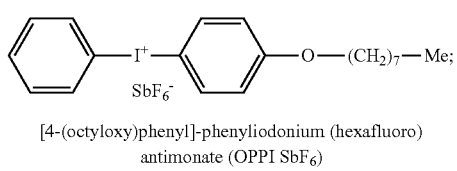

[4-(octyloxy)phenyl]-phenyliodonium (hexafluoro)
antimonate (OPPI SbF$_6$)

-continued

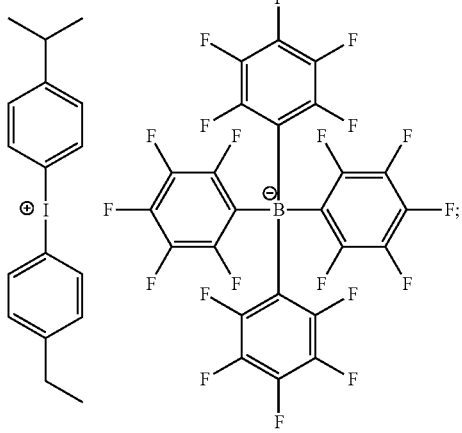

(4-ethylphenyl)(4-isopropylphenyl)iodonium tetrakis(perfluorophenyl)borate

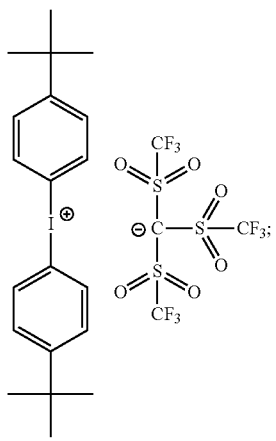

di-(p-t-butylphenyl)iodonium tris(trifluoromethanesulfonyl) methanide

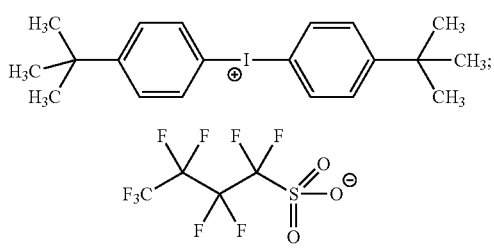

bis(4-tert-butylphenyl)iodonium perfluoro-1-butanesulfonate

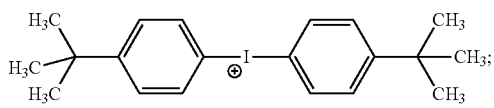

bis(4-tert-butylphenyl)iodonium-p-toluenesulfate

-continued

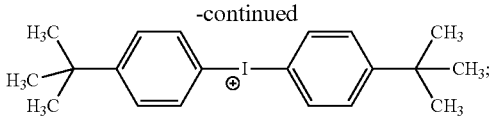

bis(4-tert-butylphenyl)iodonium-triflate

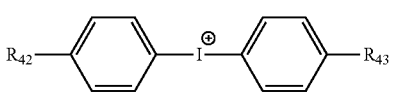

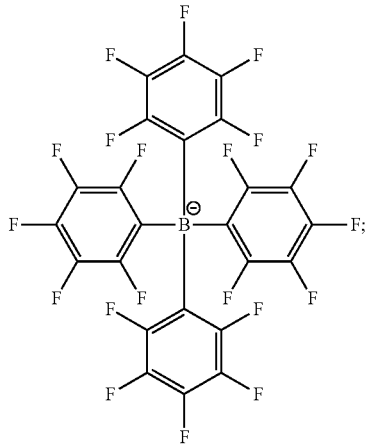

where $R_{42}$ and $R_{43}$ are the same or different and each independently selected from linear or branched ($C_{10}$-$C_{13}$) alkyl, for example iodonium, diphenyl-, 4,4'-di-$C_{10-13}$-alkyl derivatives, tetrakis(2,3,4,5,6-pentafluorophenyl)borates are commercially available under the tradename SILCOLEASE UV CATA 243; and

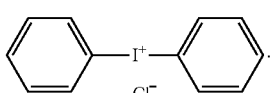

diphenyliodonium chloride

Other exemplary PAGs that may be suitable in the composition of this invention include the following:

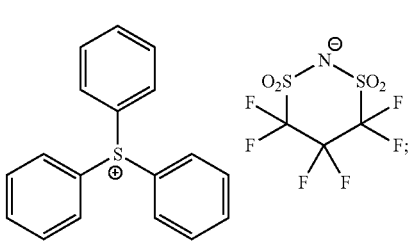

triphenylsulfonium 4,4,5,5,6,6-hexafluoro-1,3,2-dithiazinan-2-ide 1,1,3,3-tetraoxide

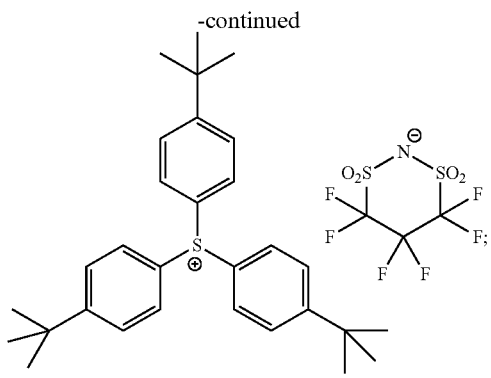

tris(4-(tert-butyl)phenyl)sulfonium
4,4,5,5,6,6-hexafluoro-1,3,2-dithiazinan-2-ide
1,1,3,3-tetraoxide

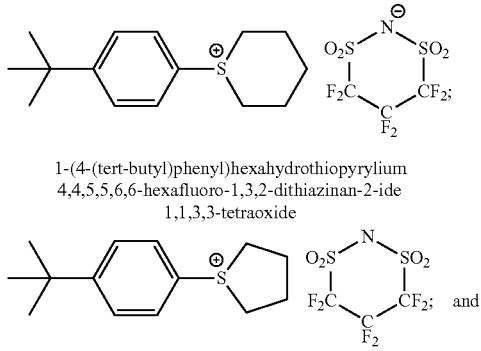

1-(4-(tert-butyl)phenyl)hexahydrothiopyrylium
4,4,5,5,6,6-hexafluoro-1,3,2-dithiazinan-2-ide
1,1,3,3-tetraoxide

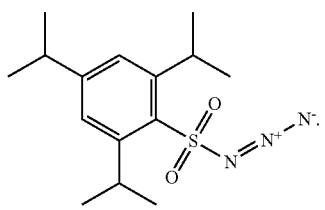

1-(4-(tert-butyl)phenyl)htetrahydro-1H-thiophen-1-ium
4,4,5,5,6,6-hexafluoro-1,3,2-idthiazinan-2-ide
1,1,3,3-tetraoxide

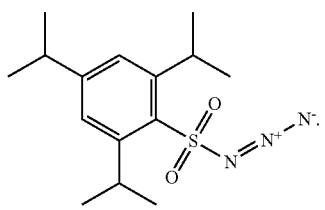

2,4,6-triisopropylbenzenesulfonyl azide

However, any of the other known photoacid generators which can activate the organopalladium compounds of formula (I) as employed herein when exposed to suitable radiation can also be used in the composition of this invention. All such compounds are part of this invention.

As noted, the composition of this invention additionally contains a photosensitizer compound which further facilitates the formation of the active catalyst when the composition is exposed to suitable radiation in the presence of the photoacid generator as employed herein. For this purpose, any suitable sensitizer compound can be employed in the compositions of the present invention, which activates the photoacid generator and/or the organopalladium compound of formula (I). Such suitable sensitizer compounds include, anthracenes, phenanthrenes, chrysenes, benzpyrenes, fluoranthenes, rubrenes, pyrenes, xanthones, indanthrenes, thioxanthen-9-ones, and mixtures thereof. In some exemplary embodiments, suitable sensitizer components include a compound of formula (VIII) or a compound of formula (IX):

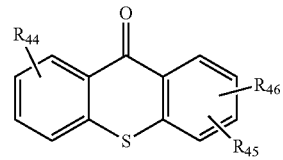

(VIII)

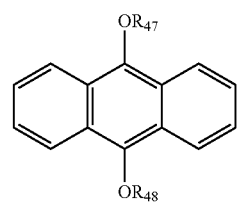

(IX)

wherein $R_{44}$, $R_{45}$ and $R_{46}$ are the same or different and independently of each other selected from the group consisting of hydrogen, halogen, hydroxy, $NO_2$, $NH_2$, methyl, ethyl, linear or branched ($C_3$-$C_{12}$)alkyl, ($C_3$-$C_{12}$)cycloalkyl, ($C_6$-$C_{12}$) bicycloalkyl, ($C_7$-$C_{14}$)tricycloalkyl, ($C_6$-$C_{10}$)aryl, ($C_6$-$C_{10}$) aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$) aryloxy($C_1$-$C_3$)alkyl, ($C_6$-$C_{10}$)-aryloxy, C(O)($C_1$-$C_6$)alkyl, COOH, C(O)O($C_1$-$C_6$)alkyl, and $SO_2$($C_6$-$C_{10}$)aryl;

$R_{47}$ and $R_{48}$ are the same or different and independently of each other selected from the group consisting of methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl and ($C_6$-$C_{10}$)aryl($C_1$-$C_3$)alkyl.

Representative examples of the compounds of formula (VIII) or the compounds of formula (IX) without any limitation may be listed as follows:

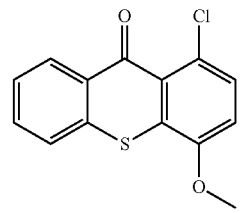

1-chloro-4-methoxy-9H-
thioxanthen-9-one

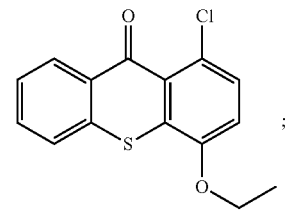

1-chloro-4-ethoxy-9H-
thioxanthen-9-one

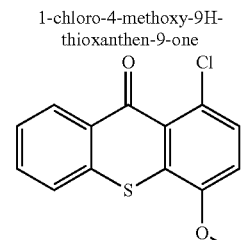

1-chloro-4-propoxy-9H-thioxanthen-
9-one
(commercially sold under the name
CPTX from Lambson)

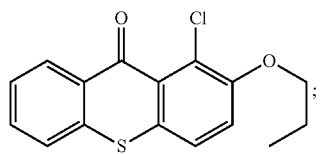

1-chloro-2-propoxy-9H-thioxanthen-9-one

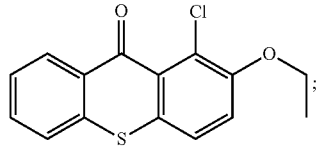

1-chloro-2-ethoxy-9H-thioxanthen-9-one

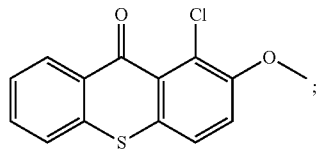

1-chloro-2-methoxy-9H-thioxanthen-9-one

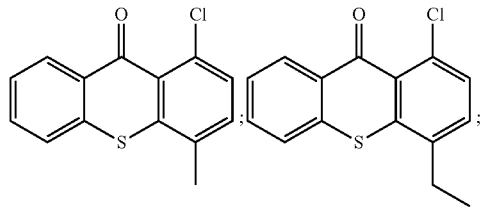

1-chloro-4-methyl-9H-thioxanthen-9-one 1-chloro-4-ethyl-9H-thioxanthen-9-one

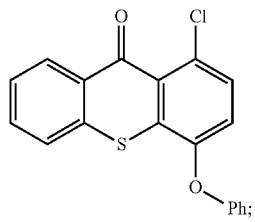

1-chloro-4-phenoxy-9H-thioxanthen-9-one

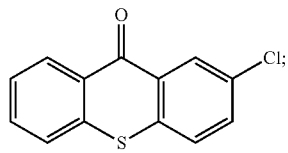

2-chlorothioxanthen-9-one (CTX)

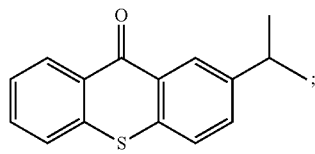

2-isoproyl-9H-thioxanthen-9-one (ITX)

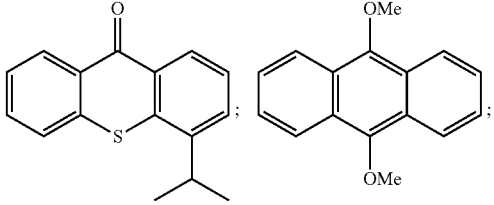

4-isopropyl-9H-thioxanthen-9-one 9,10-dimethoxyanthracene (DMA)

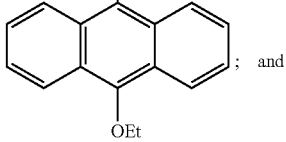

9,10-diethoxyanthracene (DEA)

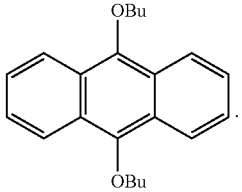

9,10-diethoxyanthracene (DBA)

Other suitable photosensitizer compounds include various substituted and unsubstituted phenothiazine derivatives, such as for example:

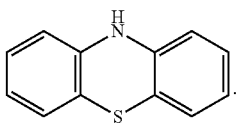

phenothiazine

Generally, photosensitizers absorb energy from the radiated light source and transfers that energy to the desirable substrate/reactant, which in the present invention is the photoacid generator employed in the composition of this invention. In some embodiments the compounds of formula (III) or the compounds of formula (IV) can be activated at certain wavelength of the electromagnetic radiation which can generally range from about 240 nm to 410 nm. Accordingly, any of the compounds which are active in this electromagnetic radiation can be employed in the compositions of this invention which are stable to various fabrications methods where the compositions of this invention can be used including for example OLED or the 3D fabrication methods. In some embodiments the wavelength of the radiation to activate the compounds of formulae (III) or (IV) is 260 nm. In some other embodiments the wavelength of the radiation to activate the compounds of formula (V) is 310 nm. In some other embodiments the wavelength of the radiation to activate the compounds of formula (V) is 365 nm. In yet some other embodiments the wavelength of the radiation to activate the compounds of formula (V) is 395 nm.

Any amount of organopalladium compound of formula (I), the photoacid generator of formulae (III) or (IV) and the photosensitizer of formulae (VIII) or (IX) can be employed in the composition of this invention which will bring about the intended result. Generally, the molar ratio of monomer of formula (V):compound of formula (I) is in the range of 25,000:1 to 5,000:1 or lower. In some other embodiments such monomer of formula (V):compound of formula (I) is 10,000:1, 15,000:1, 20,000:1 or higher than 30,000:1. It should be noted that monomer of formula (V) as mentioned herein may include one or more monomers of formula (V) distinct from each other and may additionally contain one or more monomers of formulae (VI) or (VII), and therefore, the above ratio represents combined molar amounts of all such monomers employed. Similarly, the molar ratio of organopalladium compound of formula (I):the photoacid generator of formulae (III) or (IV):the photosensitizer of formulae (VIII) or (IX) is in the range of 1:1:0.5 to 1:2:2 or 1:2:1 or 1:4:1, 1:2:4, 1:1:2, 1:4:2 or such ranges which will bring about the intended benefit.

Advantageously, it has further been found that the composition according to this invention forms a substantially transparent film when exposed to a suitable actinic radiation (UV irradiation). That is to say that when the composition of this invention is exposed to certain actinic radiation, the monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that any actinic radiation that is suitable to carry out this mass polymerization can be employed, such as for example, exposure to any actinic radiation in the wavelength of 200 nm to 400 nm. However, any radiation higher than 400 nm can also be employed. In some embodiments the wave length of the actinic radiation employed is 250 nm, 295 nm, 360 nm, 395 nm or higher than 400 nm.

In some other embodiments the composition of this invention undergoes mass polymerization when exposed to suitable actinic radiation and heat to form a substantially transparent film. In yet other embodiments the composition of this invention undergoes mass polymerization when exposed to suitable UV irradiation at a temperature from 50° C. to 100° C. to form a substantially transparent film.

Accordingly, exemplary compositions of this invention without any limitation may be enumerated as follows:

5-phenethylbicyclo[2.2.1]hept-2-ene (PENB), bis(2,2,6,6-tetramethyl-3,5-heptanedionato)palladium(II) (Pd472), 4,4'-di-$C_{10\text{-}13}$-alkyl derivatives, tetrakis(2,3,4,5,6-pentafluorophenyl)borates (PAG1) 1,8-bis(dimethylamino)-naphthalene (Proton Sponge) and 2-isopropyl-9H-thioxanthen-9-one (ITX);

5-decylbicyclo[2.2.1]hept-2-ene (DecNB), bis(2,2,6,6-tetramethyl-3,5-heptanedionato)palladium(II) (Pd472), 4,4'-di-$C_{10\text{-}13}$-alkyl derivatives, tetrakis(2,3,4,5,6-pentafluorophenyl)borates (PAG1) 1,8-bis(dimethylamino)-naphthalene (Proton Sponge) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1) 1,8-bis(dimethylamino)-naphthalene (Proton Sponge) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1) 1,8-bis(dimethylamino)-naphthalene (Proton Sponge) and 2-isopropyl-9H-thioxanthen-9-one (ITX);

5-phenethylbicyclo[2.2.1]hept-2-ene (PENB), bis(2,2,6,6-tetramethyl-3,5-heptanedionato)palladium(II) (Pd472), 4,4'-di-$C_{10\text{-}13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 4-dimethylaminopyridine (DMAP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 3-bromopyridine (BP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-phenylbicyclo[2.2.1]hept-2-ene (PhNB), 5-hexylbicyclo[2.2.1]hept-2-ene (HexNB), palladium (hexafluoroacetylacetonate)$_2$ tri-isopropylphosphine (Pd680), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX);

5-hexadecylbicyclo[2.2.1]hept-2-ene (HexadecylNB), 5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX); and 5-decylbicyclo[2.2.1]hept-2-ene (DecNB), palladium (hexafluoroacetylacetonate)$_2$ tri-isopropylphosphine (Pd680), 4,4'-di-C$_{10-13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX).

In a further aspect of this invention there is provided a kit for forming a substantially transparent film. There is dispensed in this kit a composition of this invention. Accordingly, in some embodiments there is provided a kit in which there is dispensed one or more olefinic monomers; an organopalladium compound of formula (I) or an organopalladium compound of formula (IA) or an organopalladium compound of formula (IB) as described herein; a photoacid generator of formulae (III) or (IV) as described herein, a photosensitizer of formulae (VIII) or (IX) and one or more compounds of formulae (X) to (XV) as described in as a stabilizer. In some embodiments the kit of this invention contains one or more monomers of formula (V) optionally in combination with one or more monomers of formulae (VI) or (VII) so as to obtain a desirable result and/or for intended purpose.

In some embodiments, the aforementioned kit encompasses one or more monomers of formula (V) and one or more monomers of formulae (VI) or (VII). In some other embodiments the kit of this invention encompasses at least two monomers wherein first monomer serves as a solvent for the second monomer. Any of the monomers of formulae (V) to (VII) as described herein can be used in this embodiment. The molar ratio of such two monomers contained in these embodiments can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed two monomers which could be one monomer of formula (V) and another monomer of formula (VI). Further, the monomer of formula (VI) is completely soluble in monomer of formula (V) to form a clear solution at room temperature. In some embodiments the monomer mixture may become a clear solution at slightly elevated temperature, such as for example, 30° C. or 40° C. or 50° C., before they undergo mass polymerization.

In another aspect of this embodiment of this invention the kit of this invention undergoes mass polymerization only when exposed to suitable actinic radiation for a sufficient length of time to form a polymeric film. That is to say that the composition of this invention is poured onto a surface or onto a substrate which needs to be encapsulated and exposed to suitable radiation in order for the monomers to undergo polymerization to form a solid transparent polymer which could be in the form of a transparent film.

Generally, as already noted above, such polymerization can take place at various wavelengths of actinic radiation, such as for example, at 265 nm 315 nm 365 nm or 395 nm and so on. The mass polymerization may further be accelerated by heating, which can also be in stages, for example heating to 40° C. or 50° C. or 60° C. for 5 minutes each, and if necessary further heating to 70° C. for various lengths of time such as from 5 minutes to 15 minutes and so on. By practice of this invention it is now possible to obtain polymeric films on such substrates which are substantially transparent film. The "substantially transparent film" as used herein means that the films formed from the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments of this invention the kit as described herein encompasses a composition which further contains one or more monomers selected from monomer of formula (III) or monomer of formula (IV) as described hereinabove. Again, any of the monomers of formula (III) or (IV) as described herein can be used in this embodiment, and in any desirable amounts depending on the nature of the intended use.

In some embodiments, the kit as described herein encompasses various exemplary compositions as described hereinabove.

In yet another aspect of this invention there is further provided a method of forming a substantially transparent film for the fabrication of a variety of optoelectronic device comprising:

forming a homogeneous clear composition comprising one or more monomers of formula (V) optionally in combination with one or more monomers of formulae (VI) or (VII); an organopalladium compound of formula (I) or an organopalladium compound of formula (IA) or an organopalladium compound of formula (IB); a photoacid generator of formulae (III) or (IV); a photosensitizer of formulae (VIII) or (IX); and one or more compounds selected from the group consisting of compounds of formulae (X) to (XV);

coating a suitable substrate with the composition or pouring the composition onto a suitable substrate to form a film; and exposing the film to a suitable actinic radiation to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 100° C. for about 1 to 60 minutes, although other appropriate temperatures and times can be used. In some embodiments the substrate is baked at a temperature of from about 60° C. to about 90° C. for 2 minutes to 10 minutes. In some other embodiments the substrate is baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided an optically transparent film obtained by the mass polymerization of the composition as described herein. In another embodiment there is also provided an optoelectronic device comprising the transparent film of this invention as described herein.

In yet some other embodiments the composition of this invention can also be used in a variety of photo induced nanoimprint lithography (NIL), such as for example, UV-NIL. For instance, the compositions of this invention can be used in a variety of photocurable imprint technology. Typically in such applications, the composition of this invention is suitably placed on a substrate (for example by coating or similar means), which is then covered by a suitable stamp and exposed to radiation so as to allow the composition of this invention to cure to a solid. The stamp is then released to obtain the nano-imprinted film. Such substrates can include for example a master digital video disk (DVD).

Surprisingly, in this aspect of the invention it has now been found that by judicious selection of monomers of formulae (V) optionally in combination with one or more monomers of formulae (VI) or (VII), organopalladium compounds of formulae (I) or (IA) or (IB), photoacid generators as described herein, the photosensitizers as described herein and one or more compounds of formulae (X) to (XV) it is now possible to form compositions in accordance with this aspect of the invention which feature unique properties. Accordingly, in some embodiments of this aspect of the invention the compositions thus formed exhibit longer storage stabilities, which can extend up to four months or longer at ambient temperatures or temperatures up to 60° C. The compositions of this aspect of the invention are more readily ink jettable as well as spreadable on suitable substrates using any of the known procedures including ink jetting, among other coating methods.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
PENB—5-phenethylbicyclo[2.2.1]hept-2-ene; PhNB—5-phenylbicyclo[2.2.1]hept-2-ene; DecNB—5-decylbicyclo [2.2.1]hept-2-ene; HexadecylNB—5-hexadecylbicyclo [2.2.1]hept-2-ene; HexNB—5-hexylbicyclo[2.2.1]hept-2-ene; Pd472—bis(2,2,6,6-tetramethyl-3,5-heptanedionato) palladium(II); Pd520—palladium hexafluoroacetylacetonate; Pd680—palladium (hexafluoroacetylacetonate)$_2$ tri-isopropylphosphine; Bluesil PI 2074—tolylcumyliodonium-tetrakis pentafluorophenylborate; PAG1—4,4'-di-$C_{10-13}$-alkyl derivatives, tetrakis(2,3,4,5,6-pentafluorophenyl)borates; ITX—4-isopropylthioxanthone; Cryptand 222—4,7,13,16,21,24-hexaoxa-1,10-diazabicyclo [8.8.8]hexacosane; HALS-1—bis(1,2,2,6,6-pentamethylpiperidin-4-yl) sebacate; HALS-2—bis(2,2,6,6-tetramethyl-1-(octyloxy)piperidin-4-yl) sebacate; HALS-3—bis(2,2,6,6-tetramethylpiperidin-4-yl) sebacate; Proton Sponge—1,8-bis(dimethylamino)-naphthalene; DBP—2,6-di-tert-butylpyridine; DMAP—4-dimethylaminopyridine; BP—3-bromopyridine; cP—centipoise; DSC—differential scanning calorimetry; TGA—thermogravimetric analysis.

Various monomers as used herein are either commercially available or can be readily prepared following the procedures as described in U.S. Pat. No. 9,944,818.

Various organopalladium compounds of formula (I) or (IA) are known in the literature and can be readily prepared following the procedures as described in the literature.

The following Examples 1-4 demonstrate that the composition of this invention is quite stable at room temperature for at least up to thirty six (36) days and yet can very readily be mass polymerized when exposed to UV radiation.

Examples 1-4

Shelf Life Stability and Mass Polymerization of PENB with Pd472 and Pd520

In separate glass bottles, Pd472 and Pd520 (1 molar part) were each mixed with PAG1 (2 molar parts), ITX (2 molar parts), Proton Sponge (0.5 molar parts) and dissolved in PENB or DecNB (5000 molar parts) to form a clear solution. The solutions were then UV light exposed for 4 sec (395 nm, 1 or 4 J/cm$^2$) at room temperature. All of the solutions turned into a solid in a few minutes indicating the monomers were polymerized, as also confirmed by DSC and TGA. From the TGA test, the residue percentage of solids from isothermal TGA (1 h at 100° C.) after UV exposure for all compositions were >98%. Td5 was determined by dynamic TGA (20° C./min). The UV-DSC studies showed that all of the compositions exhibited an exothermic peak after UV exposure for 4 secs., which continued to release heat after the UV exposure. In five minutes reaction time, the enthalpy change was measured to compare the reactivity of each of the composition. The catalyst used along with the monomer employed and the UV dose, Td5 and conversion are summarized in Table 1.

TABLE 1

| Example No. | Catalyst | Monomer | UV dose (J/cm$^2$) | Td5 (° C.) | Conversion (%) |
|---|---|---|---|---|---|
| Example 1 | Pd472 | PENB | 1 | 348.5 | 98.6 |
| Example 2 | Pd472 | DecNB | 4 | 369.9 | 99.5 |
| Example 3 | Pd520 | PENB | 1 | 311.9 | 98.4 |
| Example 4 | Pd520 | DecNB | 1 | 376.4 | 99.8 |

The compositions from each of Examples 1 to 4 were stored at room temperature. A small portion of the composition from each of the composition was removed for characterizing by DSC at the end of day 1, 2, 4, 6, 8, 10, 15, 17, 19 and 21.

TABLE 2

| Example No. | Enthalpy Change in 5 minutes (J/g) | | | | | | | | | Gel time |
|---|---|---|---|---|---|---|---|---|---|---|
| | Day 1 | Day 2 | Day 4 | Day 6 | Day 8 | Day 10 | Day 15 | Day 17 | Day 19 | Day 21 | |
| Ex. 1 | 317.1 | 329.5 | — | 290.1 | — | 311.4 | — | 324.4 | — | 323.1 | 36 days |
| Ex. 2 | 333.9 | — | 345.5 | — | 265.5 | — | 284.8 | — | 321.4 | — | 27 days |
| Ex. 3 | 323.2 | 223.0 | 257.6 | 325.3 | — | Gelled | | | | | 10 days |
| Ex. 4 | 341.5 | — | 358.9 | — | — | Gelled | | | | | 10 days |

The observed data are summarized in Table 2. It is evident from the data summarized in Table 2, the compositions remained liquid during this period or longer as summarized in Table 2, and exhibited fairly similar exotherm suggesting that these compositions are stable at least up to ten days in Examples 3 and 4. The compositions of Examples 1 and 2 are even more and remained liquid for 36 days and 27 days, respectively.

Examples 5-10

Dose Effects of Proton Sponge on Mass Polymerization of PENB

In separate glass bottles, Pd472 and Pd520 (1 molar part) were each mixed with PAG1 (2 molar parts), ITX (2 molar parts), Proton Sponge (at 0.5, 0.05 and 0.005 molar parts) and dissolved in PENB (5000 molar parts) to form a clear solution. The solutions were then UV light exposed for 4 sec (395 nm, 1 J/cm$^2$) at room temperature. All of the solutions turned into a solid in a few minutes indicating the monomers were polymerized, as also confirmed by DSC. The UV-DSC studies showed that all of the compositions exhibited an exothermic peak after UV exposure for 4 secs., which continued to release heat after the UV exposure. In five minutes reaction time, the enthalpy change was measured to compare the reactivity of each of the composition. The measured enthalpic data and gel time are summarized in Table 3.

TABLE 3

| Example No. | Catalyst | Proton-sponge (molar ratio) | Enthalpy Change in 5 minutes (J/g) | Gel time |
|---|---|---|---|---|
| Example 5 | Pd472 | 0.5 | 314.9 | 36 days |
| Example 6 | Pd472 | 0.05 | 298.3 | 1 day |
| Example 7 | Pd472 | 0.005 | 308.1 | 1 day |
| Example 8 | Pd520 | 0.5 | 319.0 | 10 days |
| Example 9 | Pd520 | 0.05 | 312.6 | 6 days |
| Example 10 | Pd520 | 0.005 | 337.8 | 1 day |

It is evident from the data presented in Table 3 the Proton Sponge at levels lower than 0.5 molar parts may not provide longer term shelf life stability. That is, by increasing the levels of Proton Sponge from 0.005 molar parts to 0.05 molar parts has no significant benefit. However, a significant benefit is realized by increasing the levels of Proton Sponge from 0.05 molar parts to 0.5 molar parts; the shelf life stability of Example 5 is increased to 36 days from 1 day in Example 6. Similarly, the shelf life stability of the composition of Example 8 is increased to 10 days from 6 days in Example 9.

Examples 11-12

Mass Polymerization of PENB with Cryptand 222

In two separate glass bottles, Pd472 and Pd520 (1 molar part) were each mixed with PAG1 (2 molar parts), ITX (2 molar parts), and dissolved in PENB (5000 molar parts) to form a clear solution. Cryptand 222 (0.5 molar parts) was added into each solution. The solutions were then UV light exposed for 4 sec (395 nm, 1 J/cm$^2$) at room temperature, during which time the solutions turned into a gel. The UV-DSC studies showed that these compositions exhibited an exothermic peak after UV exposure for 4 secs., which continued to release heat after the UV exposure. In five minutes reaction time, the enthalpy change was measured to compare the reactivity of each of the composition. The measured enthalpic data and gelation time are summarized in Table 4. It is evident from this data that the solutions were stable up to 14 days at room temperature.

TABLE 4

| Example No. | Catalyst | Enthalpy Change in 5 minutes (J/g) | Gelled after |
|---|---|---|---|
| Example 11 | Pd472 | 262.5 | 14 days |
| Example 12 | Pd520 | 292.8 | 14 days |

Example 13

Mass Polymerization of PENB with 2,6-Di-tert-butylpyridine (DBP) as Stabilizer

In a glass bottle, Pd520 (1 molar part), DBP (1 mol part), PAG1 (2 molar parts) and ITX (1 molar part) were dissolved in PENB (5000 molar parts) to form a solution. The solution was then UV light exposed for 4 sec (1 J/cm$^2$, 395 nm) at room temperature. The solution turned to a solid in a minute indicating the monomer was polymerized, as further confirmed by TGA. The residue percentage of solids after UV exposure was determined to be >98% from isothermal TGA (1 h at 100° C.); and the $T_d$ (5% wt. loss) was 332° C. as measured by dynamic TGA (20° C./min). The unexposed solution was then taken in parts in several bottles and stored at room temperature. The viscosity (at room temperature) of the unexposed solution was measured periodically, and the results are summarized in Table 5. The reactivity of the composition was also measured periodically by UV-DSC as heat of polymerization in 5 mins under UV light exposure (1 J/cm$^2$, 400 nm) at 30° C. and the results are summarized in Table 5. It is evident from this data that the viscosity of the solution remained constant even after 56 days. It is also apparent from the UV-DSC data the composition remained active during this period and readily polymerized with almost no change in enthalpic value, i.e., heat of polymerization, as measured by UV DSC.

TABLE 5

| Example 13 | Day 0 | Day 7 | Day 14 | Day 28 | Day 56 | Day 80 |
|---|---|---|---|---|---|---|
| Enthalpy (J/g) | 346 | 333 | 328 | 336 | 320 | Not determined |
| Viscosity (cP) | 8 | 8 | 8.1 | 8.5 | 8.6 | gelled |

Examples 14-15

Varied Amounts of DBP on Mass Polymerization of PENB

The procedures of Example 13 were substantially followed in these Examples 14-16 except that the amounts of DBP were varied (0.1 and 0.5 molar parts). Each of the compositions were UV light exposed for 4 sec (1 J/cm$^2$, 395 nm) at room temperature. These solutions turned into a solid in a few minutes indicating the monomer was polymerized, as further confirmed by TGA and UV-DSC. The residue percentage of solids from isothermal TGA (1 h at 100° C.) after UV exposure were ~99% in each of these Examples 14-16. The UV-DSC (1 J/cm$^2$, 400 nm, 30° C.) studies showed that all of the compositions exhibited an exothermic peak after UV exposure for 4 secs. The unexposed solutions were stored at room temperature and monitored at regular intervals for the viscosity change. The results are summarized in Table 6. It is evident that shelf life of the compositions are dramatically improved with the addition of DBP, even at as small amount as 0.1 molar parts.

TABLE 6

| Example No. | DBP (mol parts) | Residue (TGA, 1 h, 100° C.) | Enthalpy change in 5 minutes (J/g) | Gelling time (days) |
|---|---|---|---|---|
| Example 14 | 0.1 | 99.2% | 326 | 15 |
| Example 15 | 0.5 | 99% | 331 | 63 |

Example 16

Mass Polymerization of PENB with 4-Dimethylaminopyridine (DMAP) as Stabilizer

In a glass bottle, Pd520 (1 molar part), DMAP (1 mol part), PAG1 (2 molar parts) and ITX (1 molar part) were dissolved in PENB (5000 molar parts) to form a solution. The solution was then UV light exposed for 4 sec (1 J/cm$^2$, 395 nm) at room temperature. The solution turned to a hard solid in 5 minutes indicating the monomer was polymerized. The residue percentage of solids from isothermal TGA (1 h at 100° C.) after UV exposure was ~97%. The unexposed solution was then stored at room temperature and the viscosity was measured over time. The UV-DSC (1 J/cm$^2$, 400 nm, 30° C.) studies were used to record the enthalpy change over time. These results are summarized in Table 7. It is evident from the data presented in Table 7 that shelf life of the compositions are much improved with the addition of DMAP.

TABLE 7

| Example 16 | Day 0 | Day 7 | Day 14 | Day 16 |
|---|---|---|---|---|
| Enthalpy (J/g) | 343 | 335 | 327 | Not determined |
| Viscosity (cP) | 8 | 8 | 8.5 | gelled |

Examples 17-18

Varied Amounts of DMAP on Mass Polymerization of PENB

The procedures of Example 16 was substantially followed in these Examples 17-18 except that varying amounts of DMAP (0.1 and 0.5 molar parts) were used. The compositions were then UV light exposed for 4 sec (1 J/cm$^2$, 395 nm) at room temperature. The solutions turned into a solid in a few minutes indicating the monomers were polymerized, as further confirmed by TGA and UV-DSC. The residue percentage of solids from isothermal TGA (1 h at 100° C.) after UV exposure were ~97% in both Examples 17 and 18. The UV-DSC (1 J/cm$^2$, 400 nm, 30° C.) studies showed that both compositions exhibited exothermic peaks after UV exposure for 4 secs. The unexposed solutions were stored at room temperature and the viscosity was measured at regular intervals. The results are summarized in Table 8. It is evident from the data presented in Table 8 the shelf life stability of the compositions are improved with the addition of DMAP even at lower level of 0.1 molar part but for a shorter duration of time.

TABLE 8

| Example No. | DMAP (mol parts) | Residue (TGA, 1 h, 100° C.) | Enthalpy change in 5 minutes (J/g) | Gelling time (days) |
|---|---|---|---|---|
| Example 17 | 0.1 | 97.3% | 352 | 4 |
| Example 18 | 0.5 | 97.6% | 354 | 10 |

Example 19

Mass Polymerization of PENB with 3-Bromopyridine (BP) as Stabilizer

In a glass bottle, Pd520 (1 molar part), BP (1 mol part), PAG1 (2 molar parts) and ITX (1 molar part) were dissolved in PENB (5000 molar parts) to form a solution. The solution was then UV light exposed for 4 sec (1 J/cm$^2$, 395 nm) at room temperature. The solution turned to a hard solid in 5 minutes indicating the monomer was polymerized. The unexposed solution was then stored at room temperature. The viscosity and reactivity was recorded overtime as summarized in Table 9. It is evident that shelf life of the composition is improved with the addition of BP.

TABLE 9

| Example 19 | Day 0 | Day 7 | Day 14 | Day 28 |
|---|---|---|---|---|
| Enthalpy (J/g) | 350 | 332 | 282 | Not determined |
| Viscosity (cP) | 8 | 8.5 | 45.1 | gelled |

Example 20

Mass Polymerization of PENB with Bis(1,2,2,6,6-pentamethyl-4-piperidyl) Sebacate (HALS-1)

In a glass bottle, Pd520 (1 molar part), HALS-1 (0.5 mol parts), PAG1 (2 molar parts) and ITX (1 molar part) were dissolved in PENB (5000 molar parts) to form a solution. The solution was then UV light exposed for 4 sec (1 J/cm$^2$, 395 nm) at room temperature. The solution turned to a hard solid in 5 minutes indicating the monomer was polymerized. The residue percentage of solids from isothermal TGA (1 h at 100° C.) after UV exposure was ~99%. The unexposed solution was then stored at room temperature and the viscosity was measured overtime. The UV-DSC (1 J/cm$^2$, 400 nm, 30° C.) studies were used to record the enthalpy change overtime. The results are summarized in Table 10. It is evident from this data that the viscosity of the solution remained constant at ~8 cP even after 56 days. After UV exposure, the solution turned into a hard solid in 5 minutes indicating that the monomer was active during this period and readily polymerized with almost no change in enthalpic value, i.e., heat of polymerization, as measured by UV DSC.

TABLE 10

| Example 20 | Day 0 | Day 7 | Day 14 | Day 28 | Day 56 | Day 130 |
|---|---|---|---|---|---|---|
| Enthalpy (J/g) | 348 | 349 | 334 | 324 | 333 | Not determined |
| Viscosity (cP) | 8 | 8 | 8 | 8.1 | 8.3 | gelled |

Example 21

The procedures of Example 20 were substantially followed in this Example 21 except that 0.1 molar parts of HALS-1 were used. The composition was then UV light exposed for 4 sec (1 J/cm$^2$, 395 nm) at room temperature. The solution turned into a solid in a few minutes indicating the monomer was polymerized, as further confirmed by TGA and UV-DSC. The residue percentage of solids from isothermal TGA (1 h at 100° C.) after UV exposure was ~99%. The UV-DSC (1 J/cm$^2$, 400 nm, 30° C.) studies showed that the composition exhibited an exothermic peak after UV exposure for 4 secs (339 J/g). The unexposed solution was stored at room temperature and the viscosity was monitored at certain time intervals. The composition gelled only after 13 days. It is evident that shelf life of the composition is dramatically improved with the addition of HALS-1, even at a small amount of 0.1 molar parts.

Example 22

Shelf Stability at Elevated Temperatures with HALS-1

In a glass bottle, Pd520 (1 molar part), HALS-1 (1 mol part), PAG1 (4 molar parts) and ITX (2 molar parts) were dissolved in PENB (5000 molar parts) to form a solution. The solution was then UV light exposed for 4 sec (1 J/cm$^2$, 395 nm) at room temperature. The solution turned to a hard solid in 5 minutes indicating the monomer was polymerized, as further confirmed by TGA and UV-DSC. The residue percentage of solids from isothermal TGA (1 h at 100° C.) after UV exposure was ~99%. The UV-DSC (1 J/cm$^2$, 400 nm, 30° C.) studies showed that the composition exhibited an exothermic peak after UV exposure for 4 secs. Portions of the unexposed solution were stored at different temperatures and their viscosity was monitored. The results are summarized in Table 11. It is evident that shelf life of the compositions are dramatically improved with the addition of HALS-1, even at elevated temperature of from 40° C. to 60° C.

TABLE 11

| Storage temperature | Day 0 Viscosity (cP) | Day 0 Enthalpy (J/g) | Day 7 Viscosity (cP) | Day 7 Enthalpy (J/g) | Day 14 Viscosity (cP) | Day 14 Enthalpy (J/g) | Gelling time (days) |
|---|---|---|---|---|---|---|---|
| Room Temp. | 8 | 339 | 8 | 349 | 8 | 334 | >120 |
| 40° C. | 8 | 339 | 8 | 327 | 8 | 344 | >14 |
| 60° C. | 8 | 339 | 8.3 | 324 | not measured | not measured | 10 |

Example 23

In a glass bottle, Pd680 (1 molar part), HALS-1 (1 mol part), PAG1 (4 molar parts) and ITX (2 molar parts) were dissolved in PENB (5000 molar parts) to form a solution. The solution was then UV light exposed for 4 sec (1 J/cm$^2$, 395 nm) at room temperature. The solution turned to a hard solid in 5 minutes indicating the monomer was polymerized, as further confirmed by TGA and UV-DSC. The residue percentage of solids from isothermal TGA (1 h at 100° C.) after UV exposure was ~99%. The UV-DSC (1 J/cm$^2$, 400 nm, 30° C.) studies showed that the composition exhibited an exothermic peak after UV exposure for 4 secs. The unexposed solutions were stored at 60° C. storage temperatures and monitored for the viscosity change at certain intervals. The results are summarized in Table 12. It is evident that the composition was very stable and remained as a reactive composition even after 14 days storage at 60° C.

TABLE 12

| Example 23 | Day 0 | Day 7 | Day 14 |
|---|---|---|---|
| Enthalpy (J/g) | 306 | 343 | 357 |
| Viscosity (cP) | 8 | 8 | 8 |

Examples 24-26

Thermal Stability/Reactivity of PENB/HexNB Composition

In separate glass bottles, Pd680 (1 molar part), HALS-1 (0.1, 0.5 and 1 molar parts), PAG1 (2 molar parts) and ITX (2 molar parts) were dissolved in PENB/HexNB (80/20 molar parts ratio, 10000 molar parts total) to form clear solutions. The reactivity of the compositions was measured by UV-DSC as heat of polymerization in 5 mins under UV light exposure (25° C., 250 mW/cm$^2$, 4 secs of 400 nm UV light). The thermal stability was evaluated by measuring viscosity (at 23° C.) of the formulations after conditioning at 60° C. for 7 days. The results are summarized in Table 13.

TABLE 13

| Example No | HALS-1 (molar parts) | Enthalpy change in 5 min. (J/g) | Viscosity (cP) |
|---|---|---|---|
| 24 | 0.1 | 212 | 6.1 |
| 25 | 0.5 | 84 | 6.1 |
| 26 | 1.0 | 3 | 6.0 |

It is again evident that the thermal stability of the composition at 60° C. can be dramatically improved even with the addition of small amounts of HALS-1 (0.1 molar parts) without much change in reactivity of the composition at 23° C.

Examples 27-29

Shelf Life Stability with Various Hindered Amines as Stabilizers

In separate glass bottles, Pd520 (1 molar part), various hindered amines as stabilizers (0.5 mol parts), PAG1 (4 molar parts) and ITX (2 molar parts) were dissolved in DecNB (5000 molar parts) to form a solution. The solution was then UV light exposed for 4 sec (1 J/cm$^2$, 395 nm) at room temperature. The solution turned to a hard solid in 5 minutes indicating the monomer was polymerized, as further confirmed by TGA and UV-DSC. The residue percentage of solids from isothermal TGA (1 h at 100° C.) after UV exposure was ~99%. The UV-DSC (1 J/cm$^2$, 400 nm, 30° C.) studies showed that the composition exhibited an exothermic peak after UV exposure for 4 secs. Portions of the unexposed solutions were stored at room temperatures and their gelling time was recorded overtime. The results are summarized in Table 14. It is evident that the stability of the compositions were dramatically improved by the addition of the stabilizers: DBP in Example 27, HALS-1 in Example 28 and HALS-2 in Example 29. It is further evident that HALS-2 provides much longer shelf life stability when compared with either DBP or HALS-1.

TABLE 14

|  | Example 27 | Example 28 | Example 29 |
|---|---|---|---|
| Stabilizers | DBP | HALS-1 | HALS-2 |
| Gelling time | ~3 weeks | ~5 weeks | ~12 weeks |

Example 30

Shelf Stability of DecNB Composition with HALS-2

In a glass bottle, Pd520 (1 molar part), HALS-2 (1 molar part), PAG1 (8 molar parts) and ITX (2 molar parts) were dissolved in DecNB (5000 molar parts) to form a solution. The solution was then UV light exposed for 4 sec (1 J/cm$^2$, 395 nm) at room temperature. The solution turned to a hard solid in 5 minutes indicating the monomer was polymerized. The residue percentage of solids from isothermal TGA (1 h at 100° C.) after UV exposure was ~99%. The unexposed solution was then stored at two different temperatures: room temperature and 40° C. The viscosity of the solutions was measured overtime. The UV-DSC (1 J/cm$^2$, 400 nm, 30° C.) studies were used to record the enthalpy change overtime. The results are summarized in Table 15 (at room temperature) and Table 16 (at 40° C.). It is evident that the shelf life of the composition is dramatically improved with the addition of HALS-2, even at elevated temperature, 40° C., Table 16. Even after 90 days of storage at room temperature or at 40° C., the UV exposure of the respective composition turned into a hard solid in 5 minutes indicating that the composition remained active during this period and readily polymerized with almost no change in enthalpic value, i.e., heat of polymerization, as measured by UV DSC.

TABLE 15

| | @ Room Temperature | | | | | | |
|---|---|---|---|---|---|---|---|
| | Day 0 | Day 10 | Day 20 | Day 30 | Day 40 | Day 60 | Day 90 |
| Enthalpy (J/g) | 390 | 370 | 380 | 390 | 390 | 380 | 360 |
| Viscosity (cP) | 7.2 | 7.4 | 7.3 | 7.5 | 7.8 | 11.0 | 12.2 |

TABLE 16

| @40° C. | Day 0 | Day 10 | Day 20 | Day 30 | Day 40 | Day 60 | Day 90 |
|---|---|---|---|---|---|---|---|
| Enthalpy (J/g) | 390 | 380 | 380 | 350 | 370 | 360 | 330 |
| Viscosity(cP) | 7.2 | 7.6 | 8.0 | 10.0 | 11.6 | 14.0 | 27.0 |

Example 31

Mass Polymerization of HexadecylNB/PENB

In a glass bottle, Pd520 (1 molar part), HALS-2 (1 molar part), PAG1 (8 molar parts) and ITX (2 molar parts) were dissolved in a mixture of HexadecylNB/PENB (70/30, 5000 molar parts) to form a solution. The solution was then UV light exposed for 4 sec (1 J/cm$^2$, 395 nm) at room temperature. The solution turned to a hard solid in 5 minutes indicating the monomer was polymerized. The residue percentage of solids from isothermal TGA (1 h at 100° C.) after UV exposure was ~99%. The viscosity of the solution was measured to be 15 cP at room temperature. The unexposed solution was then stored at 40° C. Even after two months of storage at 40° C., the solution remained free-flowing, and the measured viscosity was 19 cP at room temperature. It is evident that the shelf life of the composition is extended by the addition of HALS-2, even at elevated temperature (40° C.). The composition stored after two months was still equally active as evidenced by the UV exposure turned the solution into a hard solid in 5 minutes indicating that the composition remained active during this period and readily underwent polymerization to form a solid.

Example 32

Mass Polymerization of DecNB with HALS-2 and Pd680

In a glass bottle, Pd680 (1 molar part), HALS-2 (1 mol part), PAG1 (8 molar parts) and ITX (2 molar parts) were dissolved in DecNB (5000 molar parts) to form a solution. The solution was then UV light exposed for 4 sec (4 J/cm$^2$, 395 nm) at room temperature. The solution turned to a hard solid in 5 minutes indicating the monomer was polymerized. The residue percentage of solids from isothermal TGA (1 h at 100° C.) after UV exposure was ~99%. The unexposed solution was then stored at 40° C. and its viscosity was monitored overtime. The initial viscosity of the solution was measured to be 7.2 cP at room temperature. Even after two months of storage at 40° C., the solution remained free-flowing, and the measured viscosity was 7.5 cP at room temperature. It is evident that the shelf life of the composition is extended by the addition of HALS-2, even at elevated temperature (40° C.). The composition stored after two months was still equally active as evidenced by the UV exposure turned the solution into a hard solid in 5 minutes indicating that the composition remained active during this period and readily underwent polymerization to form a solid.

The following Comparative Examples 1-4 demonstrate that in the absence of Proton Sponge the compositions exhibit very short shelf life stability, which was about one day in each of these Comparative Examples 1-4.

Comparative Examples 1-4

Mass Polymerization of PENB or DecNB without Proton-Sponge

In separate glass bottles, Pd472 or Pd520 (1 molar part) were each mixed with PAG1 (2 molar parts), ITX (2 molar parts) and dissolved in PENB or DecNB (5000 molar parts) to form a clear solution. The solutions were then UV light exposed for 4 sec (395 nm, 1 or 4 J/cm$^2$) at room temperature. All of the solutions turned into a solid in a few minutes indicating the monomers were polymerized, as also confirmed by DSC and TGA. From the TGA test, the residue percentage of solids from isothermal TGA (1 h at 100° C.) after UV exposure for all compositions were >98%. The UV-DSC studies showed that all of the compositions exhibited an exothermic peak after UV exposure for 4 secs., which continued to release heat after the UV exposure. In five minutes reaction time, the enthalpy change was measured to compare the reactivity of each of the compositions. The measured TGA and enthalpic data are summarized in Table 17. The compositions in each of these Comparative Examples 1 to 4 gelled within a day of storing at room temperature as summarized in Table 17.

TABLE 17

| Example No. | Catalyst | Monomer | UV dose (J/cm$^2$) | Td5 (° C.) | Conversion (%) | Enthalpy Change in 5 minutes (J/g) | Gel time |
|---|---|---|---|---|---|---|---|
| Comp. Ex. 1 | Pd472 | PENB | 1 | 344.7 | 98.6 | 336.9 | 1 day |
| Comp. Ex. 2 | Pd472 | DecNB | 4 | 378.0 | 99.7 | 393.4 | 1 day |
| Comp. Ex. 3 | Pd520 | PENB | 1 | 315.5 | 98.1 | 329.2 | 1 day |
| Comp. Ex. 4 | Pd520 | DecNB | 1 | 387.9 | 99.8 | 395.1 | 1 day |

The following Comparative Examples 5-8 demonstrate that use of other bases, such as N,N-dimethyl aniline or crown ethers in place of Proton Sponge or Cryptand will not provide any shelf life stability, which was about one day in each of these Comparative Examples 5-8.

Comparative Examples 5-8

Use of N,N-Dimethylaniline and Crown Ether in Mass Polymerization of PENB

In separate glass bottles, Pd472 and Pd520 (1 molar part) were each mixed with PAG1 (2 molar parts), ITX (2 molar parts), and dissolved in PENB (5000 molar parts) to form a clear solution. The additives, N,N-dimethylaniline (0.5 molar ratio) or 15-Crown-5 (0.5 molar ratio) were added into the solutions as summarized in Table 18. The solutions were then UV light exposed for 4 sec (395 nm, 1 J/cm$^2$) at room temperature. The solutions with N,N-dimethylaniline and 15-Crown-5 turned into a solid in a few minutes indicating the monomers were polymerized. The measured enthalpic data and gelation time are summarized in Table 18.

TABLE 18

| Example No. | Additive | Catalyst | Enthalpy Change in 5 minutes (J/g) | Gelled after |
|---|---|---|---|---|
| Comp. Ex. 5 | N,N-dimethyl aniline | Pd472 | Not determined. | 1 day |
| Comp. Ex. 6 | N-N-dimethyl aniline | Pd520 | Not determined. | 1 day |

TABLE 18-continued

| Example No. | Additive | Catalyst | Enthalpy Change in 5 minutes (J/g) | Gelled after |
|---|---|---|---|---|
| Comp. Ex. 7 | 15-Crown-5 | Pd472 | Not determined. | 1 day |
| Comp. Ex. 8 | 15-Crown-5 | Pd520 | Not determined. | 1 day |

Comparative Example 9

In a glass bottle, Pd520 (1 molar part), PAG1 (4 molar parts) and ITX (2 molar parts) were dissolved in PENB (5000 molar parts) to form a solution. The solution was then UV light exposed for 4 sec (1 J/cm², 395 nm) at room temperature. The solution turned to a hard solid in 5 minutes indicating the monomer was polymerized, as further confirmed by TGA and UV-DSC. The residue percentage of solids from isothermal TGA (1 h at 100° C.) after UV exposure was ~99%. The UV-DSC (1 J/cm², 400 nm, 30° C.) studies showed that the composition exhibited an exothermic peak after UV exposure for 4 secs. Portions of the unexposed solutions were stored separately at room temperature, 40° C. and 60° C., each of the samples gelled within 4 to 6 hours.

Comparative Example 10

In a glass bottle, Pd680 (1 molar part), PAG1 (4 molar parts) and ITX (2 molar parts) were dissolved in PENB (5000 molar parts) to form a solution. The solution was then UV light exposed for 4 sec (1 J/cm², 395 nm) at room temperature. The solution turned to a hard solid in 5 minutes indicating the monomer was polymerized, as further confirmed by TGA and UV-DSC. The residue percentage of solids from isothermal TGA (1 h at 100° C.) after UV exposure was ~99%. The UV-DSC (1 J/cm², 400 nm, 30° C.) studies showed that the composition exhibited an exothermic peak after UV exposure for 4 secs. The unexposed solution was stored at 60° C. and gelled after 4 days.

Comparative Examples 11-13

The procedures of Example 13 were substantially followed in these Comparatives Examples 11-13 except that different additives were employed as follows: Comparative Example 11—N,N-dimethylaniline (1 mol part), Comparative Example 12—phenothiazine (1 mol part), and Comparative Example 13—ethyl-4-dimethylamino benzoate (1 mol part) were used as the additives. The compositions were prepared in separate glass bottles, and then UV light exposed for 4 sec (1 J/cm², 395 nm) at room temperature. These solutions turned into a solid in a few minutes indicating the monomers were polymerized. The unexposed solutions were then stored at room temperature and the gelling time was recorded overtime as summarized in Table 19. It is evident that shelf life of these formulations could not be improved with the addition of these comparative additives.

TABLE 19

| Example No. | Additive | Gelled after |
|---|---|---|
| Comp. Ex. 11 | N,N-dimethyl aniline | 1 day |
| Comp. Ex. 12 | phenothiazine | 1 day |
| Comp. Ex. 13 | ethyl-4-dimethylamino benzoate | 1 day |

Comparative Example 14

The procedures of Examples 27-29 were substantially repeated in this Comparative Example 14 except for using HALS-3 as the stabilizer. The composition gelled within one day of storage at room temperature.

Comparative Example 15

The procedures of Examples 27-29 were substantially repeated in this Comparative Example 15 except for using no stabilizer. The composition gelled within one day of storage at room temperature.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:
1. A composition comprising:
a) one or more olefinic monomers;
b) an organopalladium compound selected from the group consisting of a compound of formula (I), a compound of formula (IA) and a compound of formula (IB):

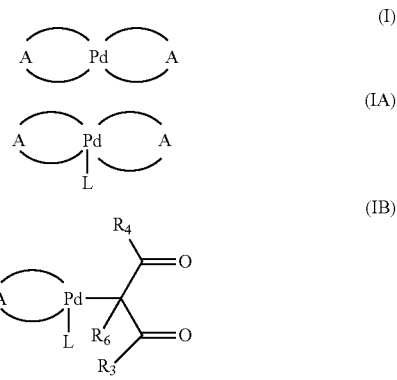

wherein:
L is a ligand selected from the group consisting of P(R)₃, P(OR)₃, O=P(R)₃, RCN and substituted or unsubstituted pyridines, where R is selected from the group consisting of methyl, ethyl, linear or branched (C₃-C₁₆) alkyl, (C₁-C₁₆)perfluoroalkyl, (C₃-C₁₀)cycloalkyl, (C₆-C₁₀)aryl(C₁-C₁₆)alkyl and substituted or unsubstituted (C₆-C₁₀)aryl;
each A independently is a bidentate monoanionic ligand of formula (II):

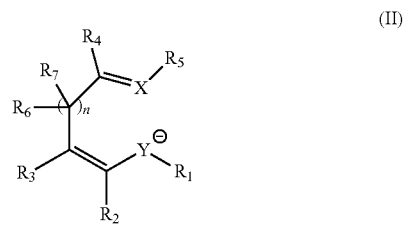

wherein:

n is an integer 0, 1 or 2;

X and Y are independently of each other selected from O, N and S;

$R_1, R_2, R_3, R_4, R_5, R_6$ and $R_7$ are the same or different and each independently selected from the group consisting of hydrogen, methyl, ethyl, linear or branched ($C_3$-$C_{16}$) alkyl, ($C_1$-$C_{16}$)perfluoroalkyl, ($C_3$-$C_{10}$)cycloalkyl, ($C_6$-$C_{10}$)aryl($C_1$-$C_{16}$)alkyl and substituted or unsubstituted ($C_6$-$C_{10}$)aryl; provided when either X or Y is O or S, $R_1$ and $R_5$, respectively, do not exist;

c) a photoacid generator selected from the group consisting of:

a compound of formula (III):

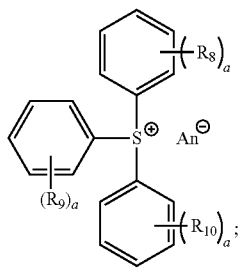

(III)

a compound of formula (IV):

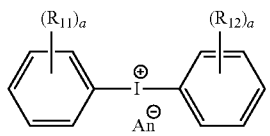

(IV)

wherein:

a is an integer from 0 to 5;

$An^\ominus$ is selected from the group consisting of $Cl^\ominus$, $Br^\ominus$, $I^\ominus$, $BF_4^\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl) borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl) borate, ethyltris(perfluorophenyl)borate, phenyltris (perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl] pheny-l]borate, tetrakis[3-[1-methoxy-2,2,2-trifluoro-1-(trifluoromethyl)ethyl]-5-(trifluoromethyl)phenyl] borate, and tetrakis[3-[2,2,2-trifluoro-1-(2,2,2-trifluoroethoxy)-1-(trifluoromethyl)-ethyl]-5-(trifluoromethyl)phenyl]borate, $PF_6^\ominus$, $SbF_6^\ominus$, n-$C_4F_9SO_3^\ominus$, $CF_3SO_3^\ominus$ and p-$CH_3$($C_6H_4$)—$SO_3^\ominus$;

$R_8, R_9, R_{10}, R_{11}$ and $R_{12}$ are the same or different and each independently selected from the group consisting of halogen, methyl, ethyl, linear or branched ($C_3$-$C_{20}$) alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$) bicycloalkoxy, ($C_7$-$C_{14}$)tricycloalkoxy, ($C_6$-$C_{10}$) aryloxy($C_1$-$C_3$)alkyl, ($C_6$-$C_{10}$)-aryloxy, ($C_6$-$C_{10}$) thioaryl, ($C_1$-$C_6$)alkanoyl($C_6$-$C_{10}$)thioaryl, ($C_1$-$C_6$) alkoxy($C_6$-$C_{10}$)aroyl($C_1$-$C_6$)alkyl and ($C_6$-$C_{10}$) thioaryl-($C_6$-$C_{10}$)diarylsulfonium salt;

d) a compound selected from the group consisting of:

a compound of formula (X):

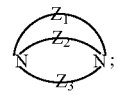

(X)

where $Z_1$, $Z_2$ and $Z_3$ are the same or different and each independently is $((CH_2)_gO)_h(CH_2)_g)$ where g and h are integers from 2 to 4;

a compound of formula (XI):

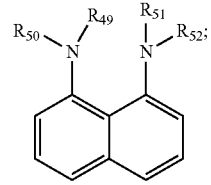

(XI)

where $R_{49}$, $R_{50}$, $R_{51}$ and $R_{52}$ are the same or different and each independently selected from the group consisting of hydrogen, methyl, ethyl and linear or branched ($C_3$-$C_{20}$)alkyl; and a compound of formula (XII):

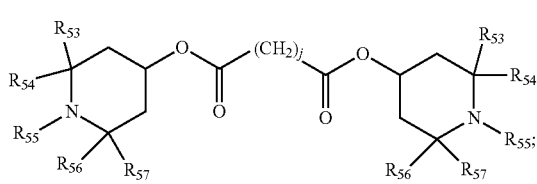

(XII)

a compound of formula (XIII):

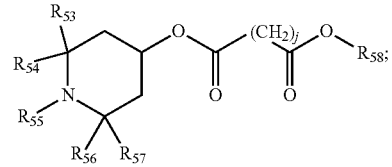

(XIII)

where j is an integer from 6 to 16;

$R_{53}$, $R_{54}$, $R_{56}$, $R_{57}$ and $R_{58}$ are the same or different and each independently selected from the group consisting of hydrogen, methyl, ethyl and linear or branched ($C_3$-$C_{20}$)alkyl;

$R_{55}$ is selected from the group consisting of methyl, ethyl, linear or branched ($C_3$-$C_{20}$)alkyl, methoxy, ethoxy and linear or branched ($C_3$-$C_{20}$)alkoxy; and a compound of formula (XIV):

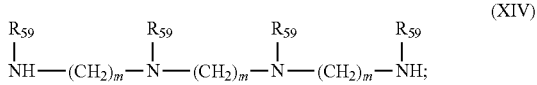
(XIV)

where each m maybe same or different and is an integer from 2 to 6;

$R_{59}$ is a group of formula:

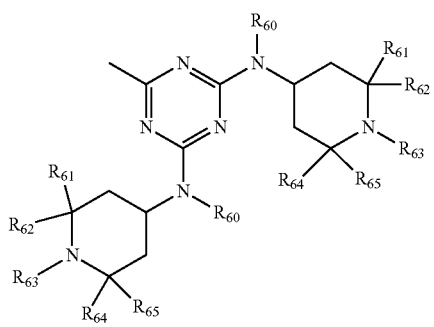

$R_{60}$, $R_{61}$, $R_{62}$, $R_{63}$, $R_{64}$ and $R_{65}$ are the same or different and each independently selected from the group consisting of hydrogen, methyl, ethyl and linear or branched ($C_3$-$C_{20}$)alkyl; and a compound of formula (XV):

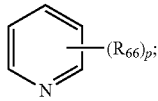
(XV)

where p is an integer from 1 to 5;

each $R_{66}$ maybe the same or different and each independently selected from the group consisting of halogen, methyl, ethyl and linear or branched ($C_3$-$C_{20}$)alkyl and $NR_{67}R_{68}$, where each $R_{67}$ and $R_{67}$ are the same or different and each independently selected from the group consisting of methyl, ethyl and linear or branched ($C_3$-$C_{20}$)alkyl; and e) a photosensitizer.

2. The composition according to claim 1, wherein said olefinic monomer is of formula (V):

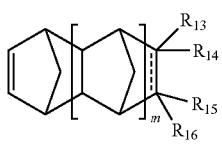
(V)

wherein:

m is an integer 0, 1 or 2;

----- is a single bond or a double bond;

$R_{13}$, $R_{14}$, $R_{15}$ and $R_{16}$ are the same or different and each independently selected from the group consisting of hydrogen, halogen, a hydrocarbyl or halohydrocarbyl group selected from methyl, ethyl, linear or branched ($C_3$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, epoxy($C_1$-$C_{10}$)alkyl, epoxy($C_1$-$C_{10}$)alkyloxy($C_1$-$C_{10}$)alkyl, epoxy($C_3$-$C_{10}$)cycloalkyl, perfluoro($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy, ($C_6$-$C_{10}$)aryl($C_1$-$C_6$)alkoxy, perfluoro($C_6$-$C_{10}$)aryloxy, perfluoro($C_6$-$C_{10}$)aryl($C_1$-$C_3$)alkoxy, a group of formula (A):

—Z-Aryl    (A);

a group of formula (A1):

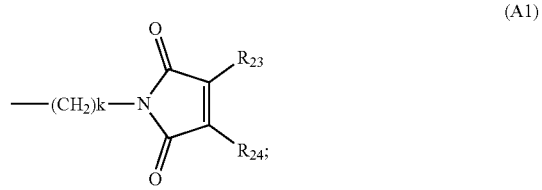
(A1)

a group of formula (A2):

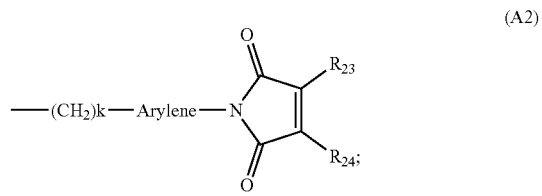
(A2)

a group of formula (A3):

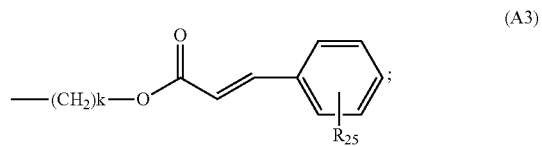
(A3)

and a group of formula (A4):

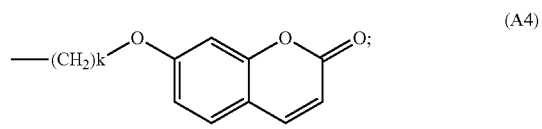
(A4)

wherein:

Z is selected from the group consisting of:

O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}$ $R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, and $(SiR_{17}R_{18})_bO$, where $R_{17}$ and $R_{18}$ are the same or different and each independently selected from hydrogen, methyl, ethyl, linear or branched $(C_3-C_{12})$alkyl, substituted or unsubstituted $(C_6-C_{14})$aryl, methoxy, ethoxy, linear or branched $(C_3-C_6)$alkyloxy, $(C_2-C_6)$acyl, $(C_2-C_6)$acyloxy, and substituted or unsubstituted $(C_6-C_{14})$aryloxy; and b is an integer from 0 to 12, inclusive;

Aryl is selected from the group consisting of substituted or unsubstituted phenyl, substituted or unsubstituted biphenyl and substituted or unsubstituted naphthyl, substituted or unsubstituted terphenyl, substituted or unsubstituted anthracenyl substituted or unsubstituted fluorenyl, wherein substituents are selected from the group consisting of halogen, methyl, ethyl, linear or branched $(C_3-C_6)$alkyl, perfluoro$(C_1-C_{12})$alkyl, $(C_3-C_{12})$cycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_6)$alkyl, methoxy, ethoxy, linear or branched $(C_3-C_{16})$ alkoxy, perfluoro$(C_1-C_{12})$alkoxy, $(C_3-C_{12})$cycloalkoxy, $(C_6-C_{10})$aryloxy, $(C_6-C_{10})$aryl$(C_1-C_6)$alkoxy, perfluoro $(C_6-C_{10})$aryloxy and perfluoro$(C_6-C_{10})$aryl$(C_1-C_3)$ alkoxy;

k is an integer from 1 to 12;

$R_{23}$, $R_{24}$ and $R_{25}$ are the same or different and each independently selected from the group consisting of hydrogen, methyl, ethyl, linear or branched $(C_3-C_{12})$ alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_6)$alkyl; or $R_{23}$ and $R_{24}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$arylene;

or one of $R_1$ and $R_2$ taken together with one of $R_3$ and $R_4$ and the carbon atoms to which they are attached to form a substituted or unsubstituted $(C_5-C_{14})$cyclic, $(C_5-C_{14})$ bicyclic or $(C_5-C_{14})$tricyclic ring.

3. The composition according to claim 2, wherein said composition contains two distinctive monomers of formula (V) in a molar ratio of from 1:99 to 99:1 and is in a clear liquid state having a viscosity below 100 centipoise.

4. The composition according to claim 1, wherein said composition forms a substantially transparent film when exposed to suitable actinic radiation, and wherein said substantially transparent film has a transmission of equal to or higher than 90 percent of visible light.

5. The composition according to claim 1, wherein said bidentate monoanionic ligand is selected from the group consisting of:

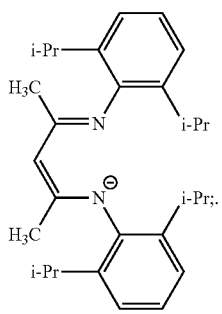

6. The composition according to claim 1, wherein the compound of formula (X) is selected from the group consisting of:

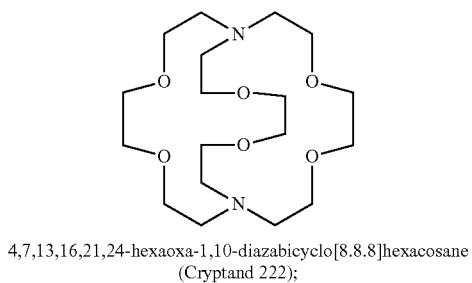

4,7,13,16,21,24-hexaoxa-1,10-diazabicyclo[8.8.8]hexacosane (Cryptand 222);

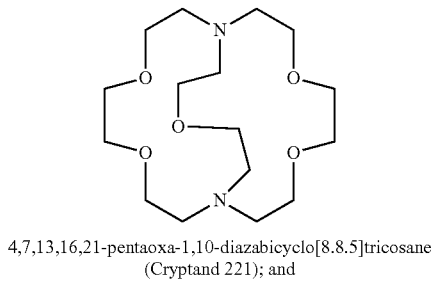

4,7,13,16,21-pentaoxa-1,10-diazabicyclo[8.8.5]tricosane (Cryptand 221); and

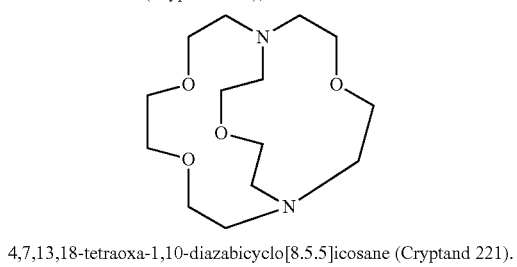

4,7,13,18-tetraoxa-1,10-diazabicyclo[8.5.5]icosane (Cryptand 221).

7. The composition according to claim 1, wherein the compound of formula (XI) or the compound of formula (XII) or the compound of formula (XIII) or the compound of formula (XV) is selected from the group consisting of:

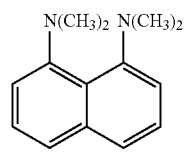

1, 8-bis(dimethylamino)naphthalene (Proton Sponge®)

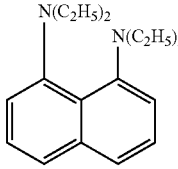

1, 8-bis(diethylamino)naphthalene

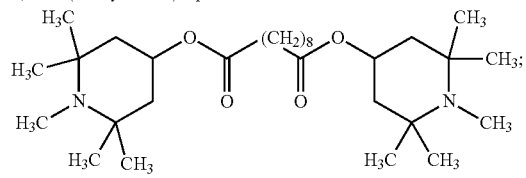

bis(1,2,2,6,6-pentamethylpiperidin-4-yl) sebacate (HALS-1)

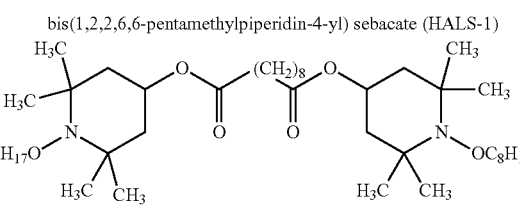

bis(2,2,6,6-tetramethyl-1-(octyloxy)piperidin-4-yl) sebacate (HALS-2)

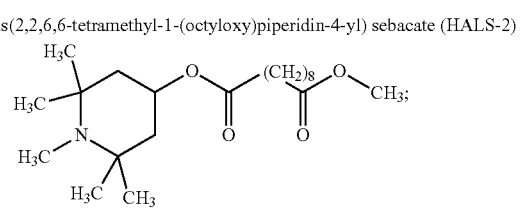

methyl (1,2,2,6,6-pentamethylpiperidin-4-yl) sebacate 2,6-di-tert-butylpyridine (DBP);
4-methyl-2,6-di-tert-butylpyridine;
4-dimethylaminopyridine (DMAP); and
3-bromopyridine (BP).

8. The composition according to claim 2 further comprising one or more monomers selected from monomer of formula (VI) or monomer of formula (VII), wherein said monomer of formula (VI) is:

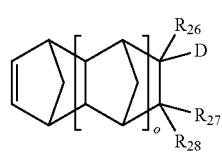

(VI)

wherein:
o is an integer from 0 to 2, inclusive;
D is $SiR_{29}R_{30}R_{31}$ or a group selected from:

$$-(CH_2)_c-O-SiR_{29}R_{30}R_{31} \qquad (E);$$

$$-(CH_2)_c-SiR_{29}R_{30}R_{31} \qquad (F); \text{ or}$$

$$-(SiR_{29}R_{30})_c-O-SiR_{29}R_{30}R_{31} \qquad (G); \text{ wherein}$$

c is an integer from 1 to 10, inclusive, and where one or more of $CH_2$ is optionally substituted with $(C_1$-$C_{10})$ alkyl or $(C_1$-$C_{10})$perfluoroalkyl;
$R_{26}$, $R_{27}$ and $R_{28}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{29}$, $R_{30}$ and $R_{31}$ are each independently of one another methyl, ethyl, linear or branched $(C_3-C_9)$alkyl, substituted or unsubstituted $(C_6-C_{14})$aryl, methoxy ethoxy, linear or branched $(C_3-C_9)$alkoxy or substituted or unsubstituted $(C_6-C_{14})$aryloxy;

said monomer of formula (VII) is:

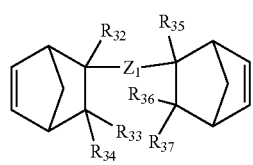

(VII)

wherein:

$Z_1$ is selected from the group consisting of substituted or unsubstituted $(C_1-C_{12})$alkylene, —$(CH_2)_dO(CH_2)_e$—, —$(CH_2)_d(SiR_{38}SR_{39})(OSiR_{40}R_{41})_f(CH_2)_e$— where d, e and f are independently integers from 0 to 6, inclusive, $R_{38}$, $R_{39}$, $R_{40}$ and $R_{41}$ are the same or different and independently of each other selected from methyl, ethyl, linear or branched $(C_3-C_{12})$alkyl, and an arylene selected from the following:

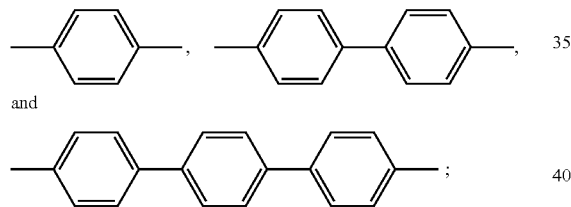

and $R_{32}$, $R_{33}$, $R_{34}$, $R_{35}$, $R_{36}$ and $R_{37}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$-aryloxy.

9. The composition according to claim 2, wherein the monomer of formula (V) is selected from the group consisting of:

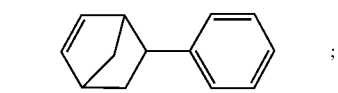

5-phenylbicyclo[2.2.1]hept-2-ene (PhNB)

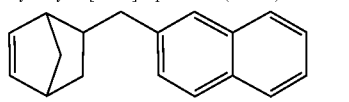

2-(bicyclo[2.2.1]hept-5-en-2-ylmethyl)naphthalene

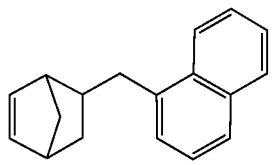

1-(bicyclo[2.2.1]hept-5-en-2-ylmethyl)naphthalene

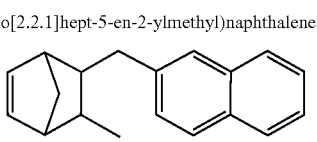

2-((3-methylbicyclo[2.2.1]hept-5-en-2-ylmethyl)naphthalene

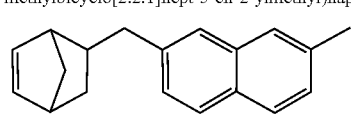

2-(bicyclo[2.2.1]hept-5-en-2-ylmethyl)-7-methynapthalene

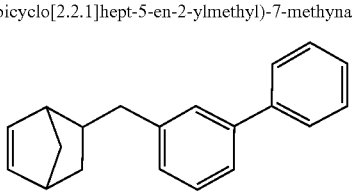

5-([1,1'-biphenyl]-3-ylmethyl)bicyclo[2.2.1]hept-2-ene

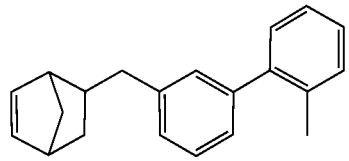

5-((2'-methyl[1,1'-biphenyl]-3-yl)methyl)bicyclo[2.2.1]hept-2-ene

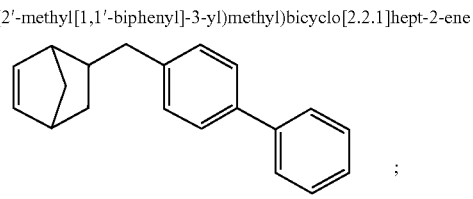

5-([1,1'-biphenyl]-4-ylmethyl)bicyclo[2.2.1]hept-2-ene

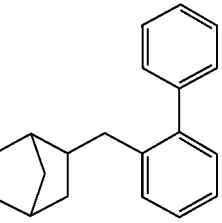

5-([1,1'-biphenyl]-2-ylmethyl)bicyclo[2.2.1]hept-2-ene

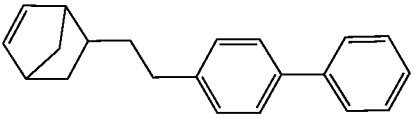

5-(2-([1,1'-biphenyl]-4-yl)ethyl)bicyclo[2.2.1]hept-2-ene (NBEtPhPh)

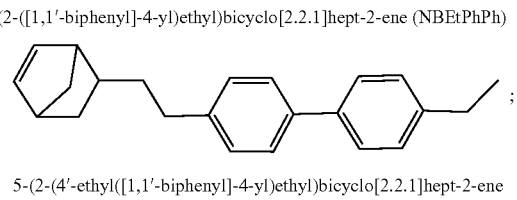

5-(2-(4'-ethyl([1,1'-biphenyl]-4-yl)ethyl)bicyclo[2.2.1]hept-2-ene

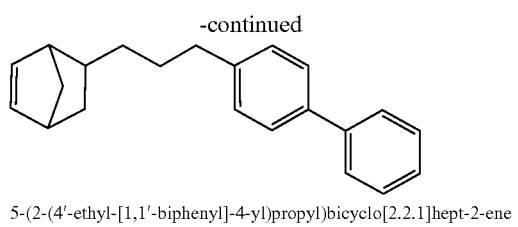

5-(2-(4'-ethyl-[1,1'-biphenyl]-4-yl)propyl)bicyclo[2.2.1]hept-2-ene

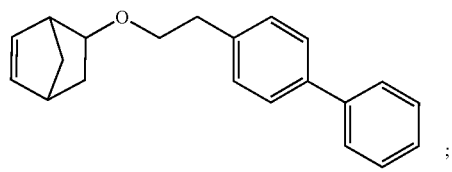

5-(2-([1,1'-biphenyl]-4-yl)ethoxy)bicyclo[2.2.1]hept-2-ene

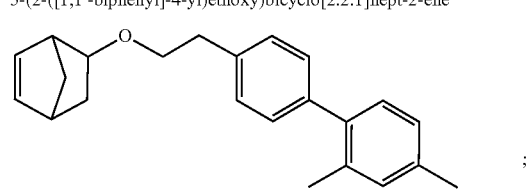

5-(2-(2',4'-dimethyl-[1,1'-biphenyl]-4-yl)ethoxy)bicyclo[2.2.1]hept-2-ene

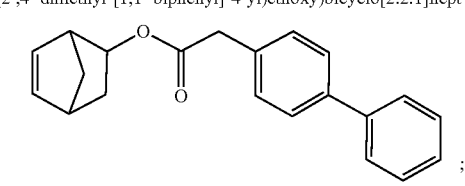

bicyclo[2.2.1]hept-5-en-2-yl 2-([1,1'-biphenyl]-4-yl)acetate

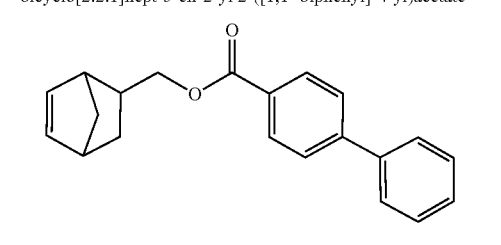

bicyclo[2.2.1]hept-5-en-2-ylmethyl [1,1'-biphenyl]-4-carboxylate

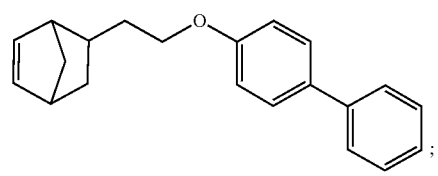

5-(2-([1,1'-biphenyl]-4-yloxy)bicyclo[2.2.1]hept-2-ene

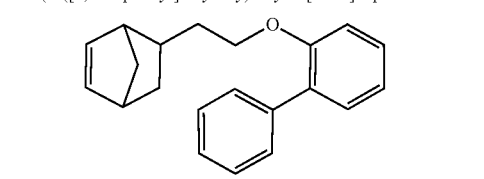

5-(2-([1,1'-biphenyl]-2-yloxy)ethyl)bicyclo[2.2.1]hept-2-ene (NBEtOPhPh)

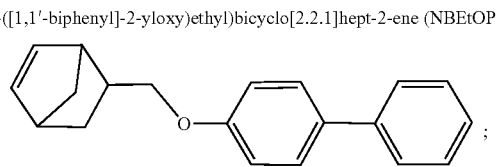

5-(2-([1,1'-biphenyl]-4-yloxy)methyl)bicyclo[2.2.1]hept-2-ene

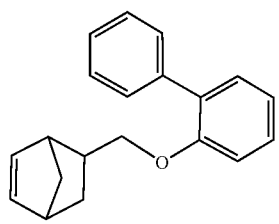

5-(2-([1,1'-biphenyl]-2-yloxy)methyl)bicyclo[2.2.1]hept-2-ene (NBMeOPhPh)

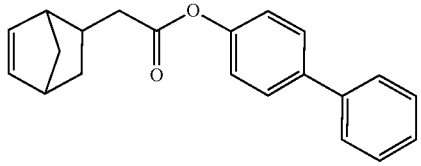

[1,1'-biphenyl]-4-yl 2-(bicyclo[2.2.1]hept-5-en-2-yl)acetate

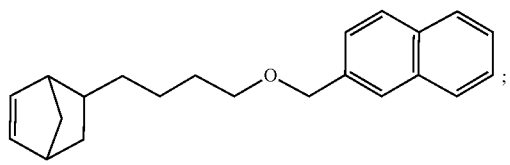

2-((4-(bicyclo[2.2.1]hept-5-en-2-yl)butoxy)methyl)naphthalene

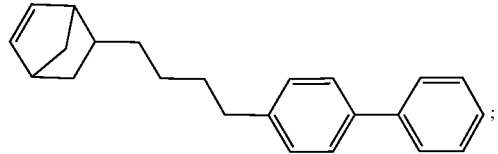

5-(4-([1,1'-biphenyl]-4-yl)butyl)bicyclo[2.2.1]hept-2-ene

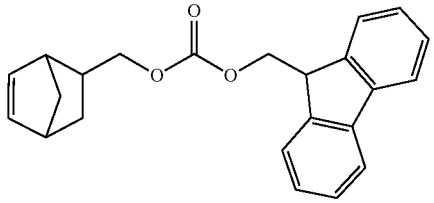

(9H-fluoren-9-yl)methyl (bicyclo[2.2.1]hept-5-en-2-ylmethyl)carbonate

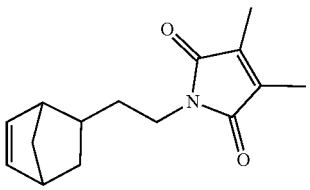

1-(4-bicyclo[2.2.1]hept-5-en-2-ylethyl)-3, 4-dimethy-1H-pyrrole-2, 5-dione

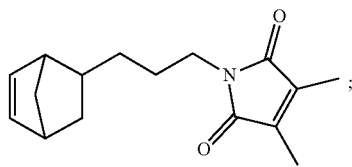

1-(4-bicyclo[2.2.1]hept-5-en-2-ylpropyl)-3, 4-dimethyl-1H-pyrrole-2, 5-dione

-continued

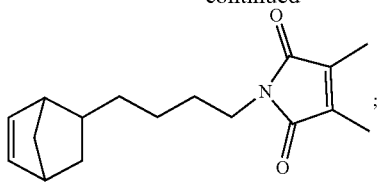

1-(4-bicyclo[2.2.1]hept-5-en-2-ylbutyl)-3,
4-dimethyl-1H-pyrrole-2, 5-dione

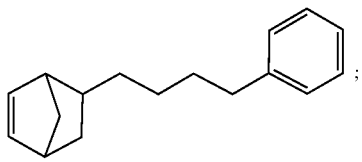

5-(4-phenylbutyl)bicyclo[2.2.1]hept-2-ene

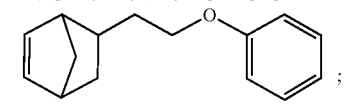

5-(2-phenylpropyl)bicyclo[2.2.1]hept-2-ene

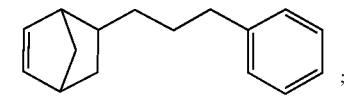

5-(3-phenylpropyl)bicyclo[2.2.1]hept-2-ene

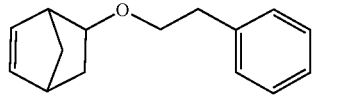

5-phenethoxybicyclo[2.2.1]hept-2-ene

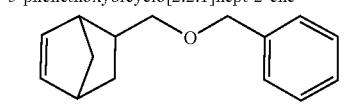

5-((benzyloxy)methyl)bicyclo[2.2.1]hept-2-ene

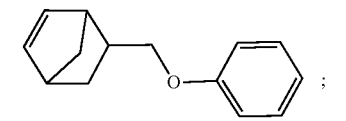

5-(phenomethyl)bicyclo[2.2.1]hept-2-ene

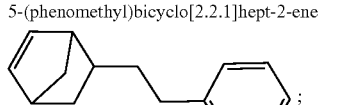

5-phenethylbicyclo[2.2.1]hept-2-ene

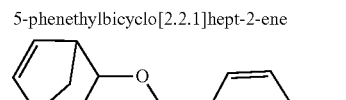

5-(benzyloxy)bicyclo[2.2.1]hept-2-ene

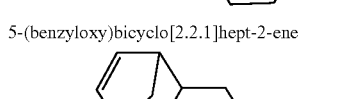

5-(2-chloroethyl)bicyclo[2.2.1]hept-2-ene (NBEtCl)

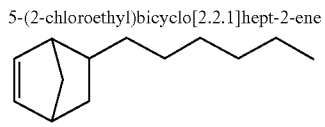

5-hexylbicyclo[2.2.1]hept-2-ene (HexNB)

-continued

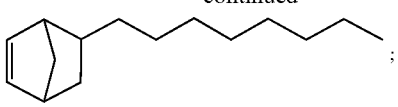

5-octylbicyclo[2.2.1]hept-2-ene (OctNB)

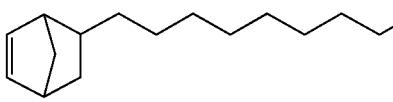

5-decylbicyclo[2.2.1]hept-2-ene (DecNB)

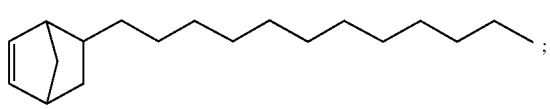

5-dodecylbicyclo[2.2.1]hept-2-ene (DoDecNB)

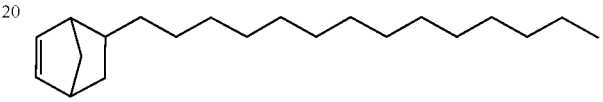

5-tetradecylbicyclo[2.2.1]hept-2-ene (TetraDecNB)

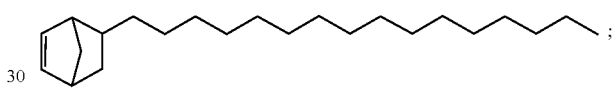

5-hexadecylbicyclo[2.2.1]hept-2-ene (HexadecylNB)

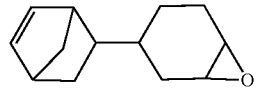

3-(bicyclo[2.2.1]hept-5-en-2-yl)-7-oxabicyclo[4.1.0]heptane (CHEpNB)

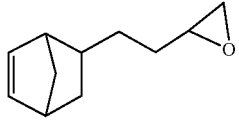

2-(2-(bicyclo[2.2.1]hept-5-en-2-yl)butyl)oxirane (EHNB)

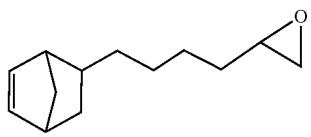

2-(4-bicyclo[2.2.1]hept-5-en-2-yl)butyl)oxirane (EHNB)

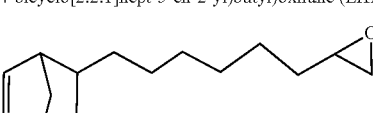

2-(6-bicyclo[2.2.1]hept-5-en-2-yl)hexyl)oxirane (EONB)  ; and

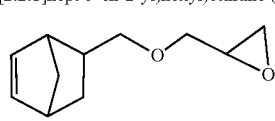

2-((bicyclo[2.2.1]hept-5-en-2-ylmethoxy)methyl)oxirane (MGENB)

10. The composition according to claim 8, wherein the monomer of formula (VI) or the monomer of formula (VII) is selected from the group consisting of:

79

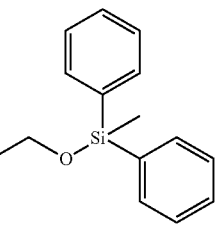

(bicyclo[2.2.1]hept-5-en-2-ylmethoxy)(methyl)diphenylsilane (NBCH$_2$OSiMePh$_2$);

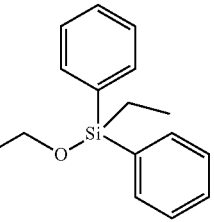

(bicyclo[2.2.1]hept-5-en-2-ylmethoxy)(ethyl)diphenylsilane;

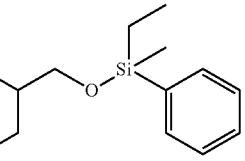

(bicyclo[2.2.1]hept-5-en-2-ylmethoxy)(ethyl)(methyl)(phenyl)silane;

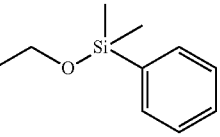

(bicyclo[2.2.1]hept-5-en-2-ylmethoxy)dimethyl(phenyl)silane;

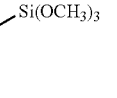

bicyclo[2.2.1]hept-5-en-2-yltrimethoxysilane;

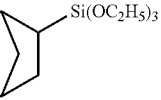

bicyclo[2.2.1]hept-5-en-2-yltriethoxysilane (NBSi(OC$_2$H$_5$)$_3$;

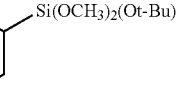

bicyclo[2.2.1]hept-5-en-2-yl(tert-butoxy)dimethoxysilane;

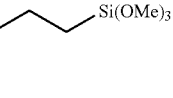

(2-(bicyclo[2.2.1]hept-5-en-2-yl)ethyl)trimethoxysilane;

1,4-di(bicyclo[2.2.1]hept-5-en-2-yl)benzene;

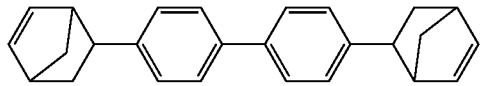

4,4'-di(bicyclo[2.2.1]hept-5-en-2-yl)-1,1'-biphenyl;

80

-continued

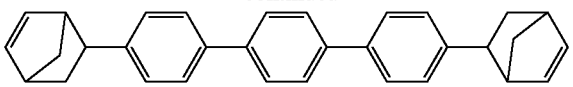

4,4''-di(bicyclo[2.2.1]hept-5-en-2-yl)-1,1':4',1''-terphenyl;

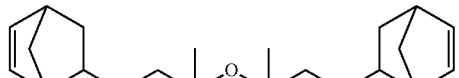

1,3-bis(norbornenylethyl)-1,1,3,3,-tetramethyldisiloxane; and

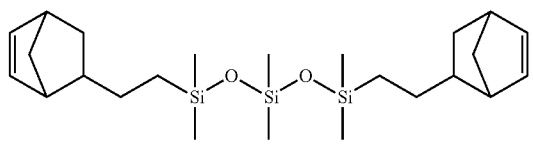

1,5-bis(norbornenylethyl)-1,1,3,3,5,5,-hexamethyltrisiloxane.

11. The composition according to claim 1, wherein the organopalladium compound of formula (I) or the organopalladium compound of formula (IA) or the organopalladium compound of formula (IB) is selected from the group consisting of:

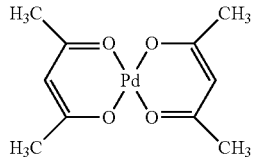

palladium (acetylacetonate)$_2$ (Pd304);

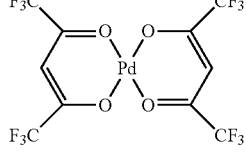

palladium (hexafluoroacetylacetonate)$_2$ (Pd(hfac)$_2$ or Pd520);

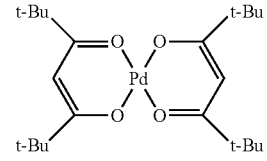

bis(2,2,6,6-tetramethyl-3,5-heptanedionato)palladium(II) (Pd472);

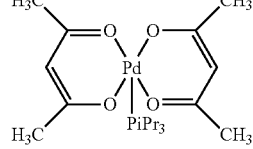

palladium (acetylacetonate)$_2$ tri-isopropylphosphine;

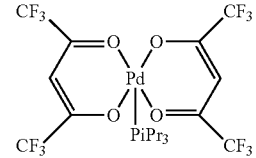

palladium (hexafluoroacetylacetonate)$_2$ tri-isopropylphosphine (Pd680);

-continued

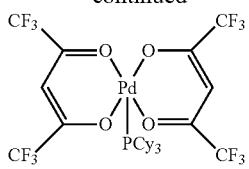

palladium (hexafluoroacetylacetonate)₂ tri-cyclohexylphosphine (Pd800);

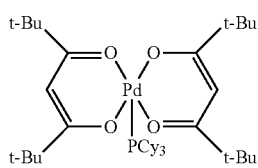

palladium (tetramethylheptenonoate)₂ tri-cyclohexylphosphine;

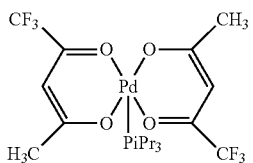

palladium (trifluoroacetylacetonate)₂ (Pd(tfacac)₂) tri-isopropylphosphine;

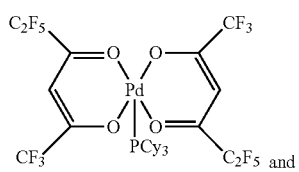

palladium (pentafluoropropionyltrifluoroacetonate)₂ tri-cyclohexylphosphine;

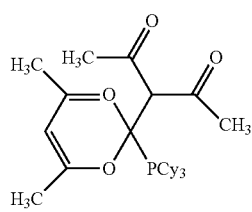

Pd(acac)₂PCy₃ (Pd585).

12. The composition according to claim 1, wherein the compound of formula (III) or the compound of formula (IV) is selected from the group consisting of:

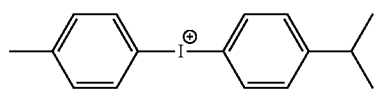

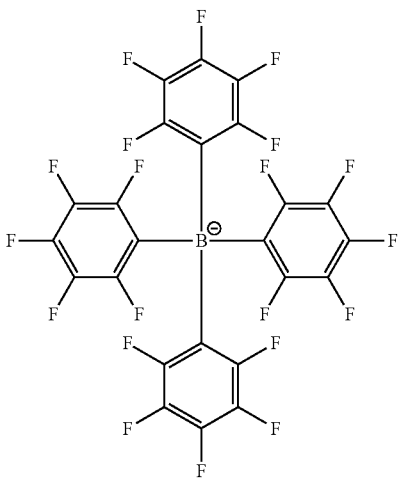

tolylcumyliodonium-tetrakis pentafluorophenylborate, commercially available under the tradename Bluesil PI 2074® from Bluestar Silicones;

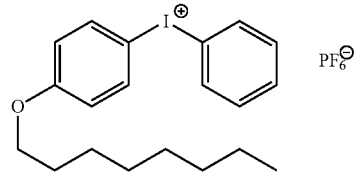

4-(octyloxy)phenyl)(phenyl)iodonium hexafluorophosphate (OPPI-PF₆);

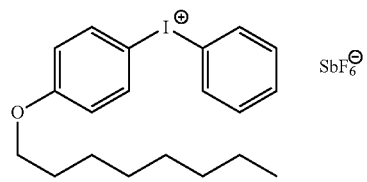

4-(octyloxy)phenyl)(phenyl)iodonium hexafluoroantimonate (OPPI-SBF₆);

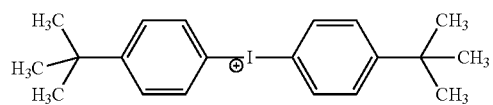

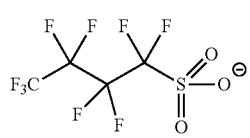

bis(4-tert-butylphenyl)iodonium perfluoro-1-butanesulfonate;

-continued

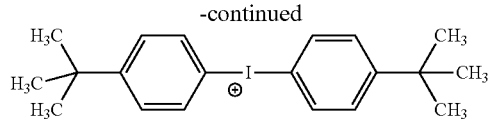

bis(4-tert-butylphenyl)iodonium p-toluenesulfonate;

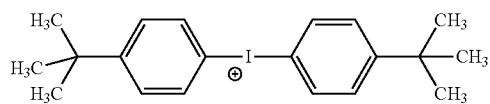

bis(4-tert-butylphenyl)iodonium triflate;

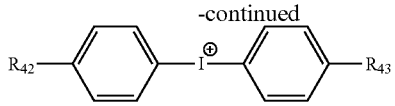

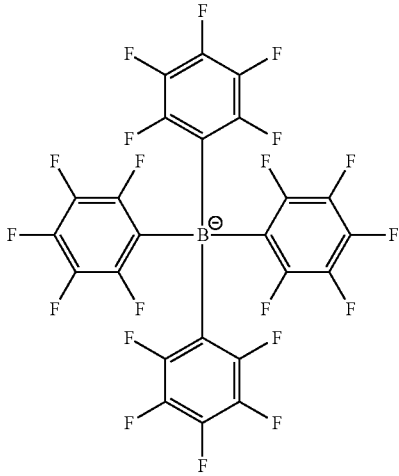

where $R_{42}$ and $R_{43}$ are the same or different and each independently selected from linear or branched ($C_{10}$-$C_{13}$)alkyl;

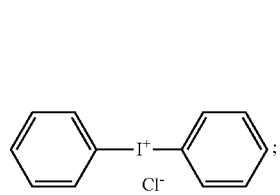

diphenyliodonium chloride

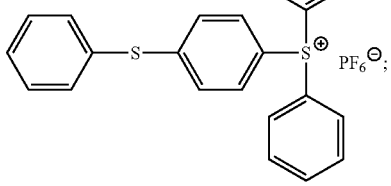

(4-thiophenyl)phenyl-diphenylsulfonium hexofluorophosphate

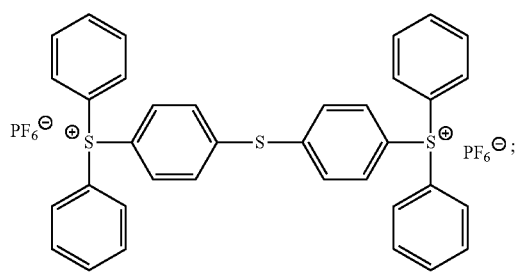

bis-(triphenylsulfonium) sulfide bis- hexafluorophosphate

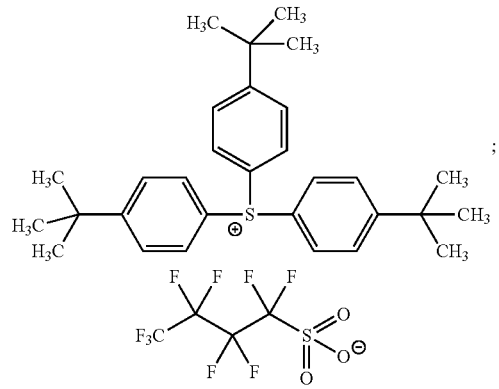

tris(4-tert-butylphenyl)sulfonium perfluoro-1-butanesulfonate

-continued
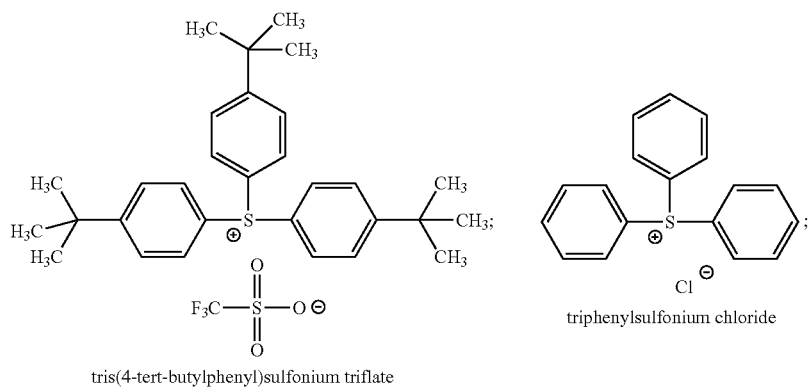
tris(4-tert-butylphenyl)sulfonium triflate
triphenylsulfonium chloride
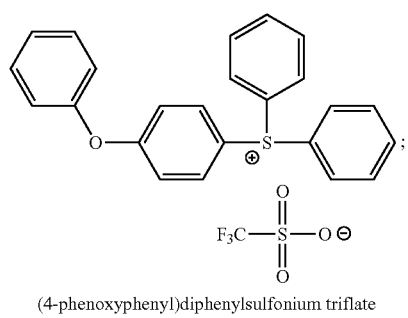
(4-phenoxyphenyl)diphenylsulfonium triflate
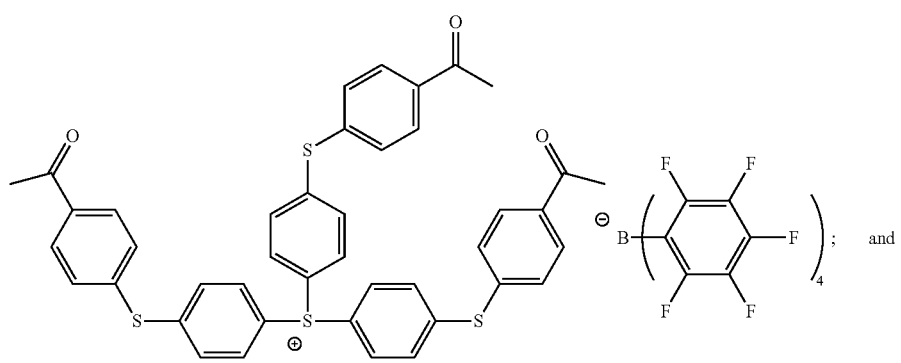
tris(4-((4-acetylphenyl)thio)phenyl)sulfonium tetrakis-pentafluorophenylborate (Irgacure PAG 290)
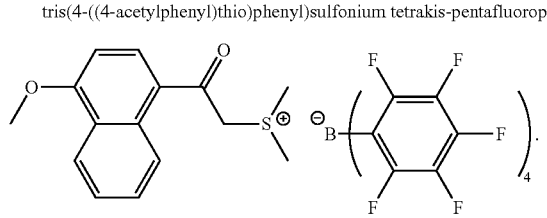
(2-(4-methoxynaphthalen-1-yl)-2-oxoethyl)dimethylsulfonium tetrakis-pentafluorophenylborate (TAG 382)

13. The composition according to claim 1, wherein the photosensitizer is a compound of formula (VIII) or a compound of formula (IX):

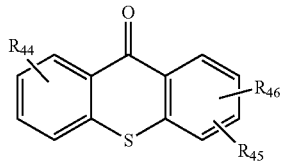

(VIII)

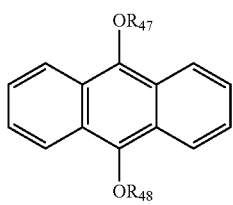

(IX)

wherein $R_{44}$, $R_{45}$ and $R_{46}$ are the same or different and independently of each other selected from the group consisting of hydrogen, halogen, hydroxy, $NO_2$, $NH_2$, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_6-C_{10})$-aryloxy, $C(O)(C_1-C_6)$alkyl, COOH, $C(O)O(C_1-C_6)$alkyl, and $SO_2(C_6-C_{10})$aryl;

$R_{47}$ and $R_{48}$ are the same or different and independently of each other selected from the group consisting of methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl and $(C_6-C_{10})$aryl$(C_1-C_3)$alkyl.

14. The composition according to claim 1, wherein the compound of formula (VIII) or the compound of formula (IX) is selected from the group consisting of:

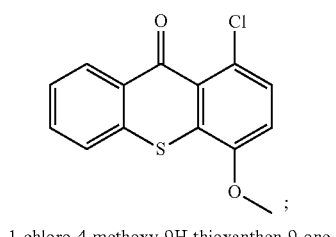

1-chloro-4-methoxy-9H-thioxanthen-9-one

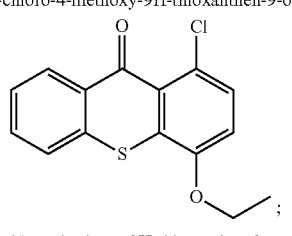

1-chloro-4-ethoxy-9H-thioxanthen-9-one

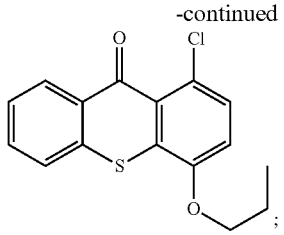

1-chloro-4-propoxy-9H-thioxanthen-9-one

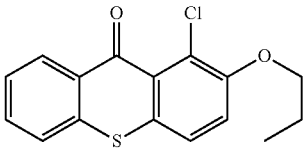

1-chloro-4-propoxy-9H-thioxanthen-9-one

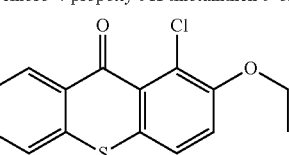

1-chloro-4-ethoxy-9H-thioxanthen-9-one

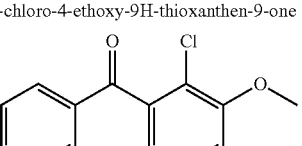

1-chloro-2-methoxy-9H-thioxanthen-9-one

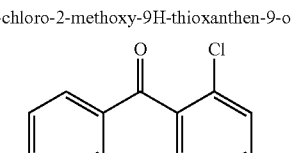

1-chloro-4-methyl-9H-thioxanthen-9-one

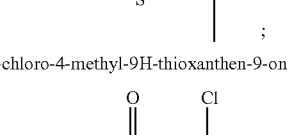

1-chloro-4-ethyl-9H-thioxanthen-9-one

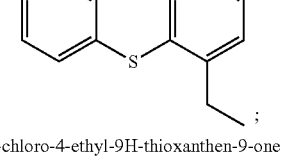

1-chloro-4-phenoxy-9H-thioxanthen-9-one

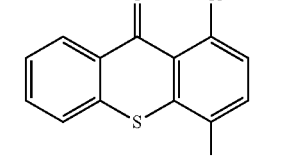

2-chlorothioxanthen-9-one (CTX)

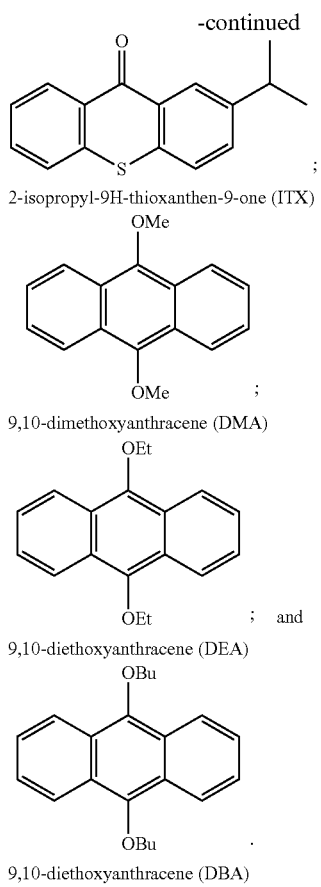

2-isopropyl-9H-thioxanthen-9-one (ITX)

9,10-dimethoxyanthracene (DMA)

9,10-diethoxyanthracene (DEA)

9,10-diethoxyanthracene (DBA)

15. The composition according to claim 1, which is selected from the group consisting of:
- 5-phenethylbicyclo[2.2.1]hept-2-ene (PENB), bis(2,2,6,6-tetramethyl-3,5-heptanedionato)palladium(II) (Pd472), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);
- 5-decylbicyclo[2.2.1]hept-2-ene (DecNB), bis(2,2,6,6-tetramethyl-3,5-heptanedionato)palladium(II) (Pd472), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);
- 5-decylbicyclo[2.2.1]hept-2-ene (DecNB), palladium hexafluoroacetylacetonate (Pd520), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);
- 5-phenethylbicyclo[2.2.1]hept-2-ene (PENB), bis(2,2,6,6-tetramethyl-3,5-heptanedionato)palladium(II) (Pd472), 4,4'-di-$C_{10-13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), 4-dimethylaminopyridine (DMAP) and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), 3-bromopyridine (BP) and 2-isopropyl-9H-thioxanthen-9-one (ITX);
- 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);
- 5-phenylbicyclo[2.2.1]hept-2-ene (PhNB), 5-hexylbicyclo[2.2.1]hept-2-ene (HexNB), palladium (hexafluoroacetylacetonate)$_2$ tri-isopropylphosphine (Pd680), 4,4'-di-$C_{10-13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);
- 5-decylbicyclo[2.2.1]hept-2-ene (DecNB), palladium hexafluoroacetylacetonate (Pd520), 4,4'-di-$C_{10-13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);
- 5-decylbicyclo[2.2.1]hept-2-ene (DecNB), palladium hexafluoroacetylacetonate (Pd520), 4,4'-di-$C_{10-13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);
- 5-decylbicyclo[2.2.1]hept-2-ene (DecNB), palladium hexafluoroacetylacetonate (Pd520), 4,4'-di-$C_{10-13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX);
- 5-hexadecylbicyclo[2.2.1]hept-2-ene (HexadecylNB), 5-phenethylbicyclo[2.2.1]hept-2-ene (PENB), palladium hexafluoroacetylacetonate (Pd520), 4,4'-di-$C_{10-13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX); and
- 5-decylbicyclo[2.2.1]hept-2-ene (DecNB), palladium (hexafluoroacetylacetonate)$_2$ tri-isopropylphosphine (Pd680), 4,4'-di-$C_{10-13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX).

16. A film comprising the composition of claim 1.

17. An optoelectronic device comprising the composition of claim 1.

18. A kit for forming a substantially transparent film comprising:

a) one or more olefinic monomers of the formula (V):

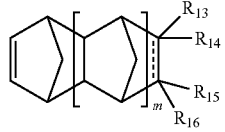 (V)

wherein:

m is an integer 0, 1 or 2;

 is a single bond or a double bond;

$R_{13}$, $R_{14}$, $R_{15}$ and $R_{16}$ are the same or different and each independently selected from the group consisting of hydrogen, halogen, a hydrocarbyl or halohydrocarbyl group selected from methyl, ethyl, linear or branched $(C_3\text{-}C_{16})$alkyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_6)$alkyl, perfluoro$(C_6\text{-}C_{10})$aryl, perfluoro$(C_6\text{-}C_{10})$aryl$(C_1\text{-}C_6)$alkyl, methoxy, ethoxy, linear or branched $(C_3\text{-}C_{16})$alkoxy, epoxy$(C_1\text{-}C_{10})$alkyl, epoxy$(C_1\text{-}C_{10})$alkyloxy$(C_1\text{-}C_{10})$alkyl, epoxy$(C_3\text{-}C_{10})$cycloalkyl, perfluoro$(C_1\text{-}C_{12})$alkoxy, $(C_3\text{-}C_{12})$cycloalkoxy, $(C_6\text{-}C_{12})$bicycloalkoxy, $(C_7\text{-}C_{14})$tricycloalkoxy, $(C_6\text{-}C_{10})$aryloxy, $(C_6\text{-}C_{10})$aryl$(C_1\text{-}C_6)$alkoxy, perfluoro$(C_6\text{-}C_{10})$aryloxy, perfluoro$(C_6\text{-}C_{10})$aryl$(C_1\text{-}C_3)$alkoxy, a group of formula (A):

—Z-Aryl (A);

a group of formula (A1):

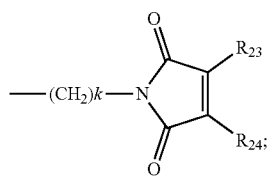 (A1)

a group of formula (A2):

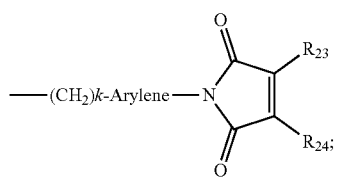 (A2)

a group of formula (A3):

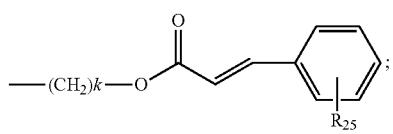 (A3)

and a group of formula (A4):

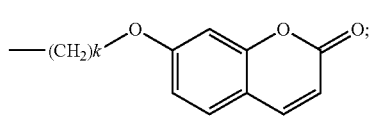 (A4)

wherein:

Z is selected from the group consisting of:
O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, and $(SiR_{17}R_{18})_bO$, where $R_{17}$ and $R_{18}$ are the same or different and each independently selected from hydrogen, methyl, ethyl, linear or branched $(C_3\text{-}C_{12})$alkyl, substituted or unsubstituted $(C_6\text{-}C_{14})$aryl, methoxy, ethoxy, linear or branched $(C_3\text{-}C_6)$alkyloxy, $(C_2\text{-}C_6)$acyl, $(C_2\text{-}C_6)$acyloxy, and substituted or unsubstituted $(C_6\text{-}C_{14})$aryloxy; and b is an integer from 0 to 12, inclusive;

Aryl is selected from the group consisting of substituted or unsubstituted phenyl, substituted or unsubstituted biphenyl and substituted or unsubstituted naphthyl, substituted or unsubstituted terphenyl, substituted or unsubstituted anthracenyl substituted or unsubstituted fluorenyl, wherein substituents are selected from the group consisting of halogen, methyl, ethyl, linear or branched $(C_3\text{-}C_6)$alkyl, perfluoro$(C_1\text{-}C_{12})$alkyl, $(C_3\text{-}C_{12})$cycloalkyl, $(C_6\text{-}C_{10})$aryl, $(C_6\text{-}C_{10})$aryl$(C_1\text{-}C_6)$alkyl, perfluoro$(C_6\text{-}C_{10})$aryl, perfluoro$(C_6\text{-}C_{10})$aryl$(C_1\text{-}C_6)$alkyl, methoxy, ethoxy, linear or branched $(C_3\text{-}C_{16})$alkoxy, perfluoro$(C_1\text{-}C_{12})$alkoxy, $(C_3\text{-}C_{12})$cycloalkoxy, $(C_6\text{-}C_{10})$aryloxy, $(C_6\text{-}C_{10})$aryl$(C_1\text{-}C_6)$alkoxy, perfluoro$(C_6\text{-}C_{10})$aryloxy and perfluoro$(C_6\text{-}C_{10})$aryl$(C_1\text{-}C_3)$alkoxy;

k is an integer from 1 to 12;

$R_{23}$, $R_{24}$ and $R_{25}$ are the same or different and each independently selected from the group consisting of hydrogen, methyl, ethyl, linear or branched $(C_3\text{-}C_{12})$alkyl, perfluoro$(C_1\text{-}C_{12})$alkyl, methoxy, ethoxy, linear or branched $(C_3\text{-}C_{12})$alkoxy, $(C_3\text{-}C_{12})$cycloalkyl, $(C_6\text{-}C_{12})$bicycloalkyl, $(C_7\text{-}C_{14})$tricycloalkyl, $(C_6\text{-}C_{10})$aryl, $(C_6\text{-}C_{10})$aryl$(C_1\text{-}C_6)$alkyl, perfluoro$(C_6\text{-}C_{10})$aryl and perfluoro$(C_6\text{-}C_{10})$aryl$(C_1\text{-}C_6)$alkyl; or $R_{23}$ and $R_{24}$ taken together with the intervening carbon atoms to which they are attached to form a substituted or unsubstituted $(C_5\text{-}C_{14})$cyclic, $(C_5\text{-}C_{14})$bicyclic or $(C_5\text{-}C_{14})$tricyclic ring; and Arylene is substituted or unsubstituted bivalent $(C_6\text{-}C_{14})$arylene;

or one of $R_1$ and $R_2$ taken together with one of $R_3$ and $R_4$ and the carbon atoms to which they are attached to form a substituted or unsubstituted (C$_5$-C$_{14}$)cyclic, (C$_5$-C$_{14}$) bicyclic or (C$_5$-C$_{14}$)tricyclic ring;

b) an organopalladium compound selected from the group consisting of a compound of formula (I), a compound of formula (IA) and a compound of formula (IB):

(I)

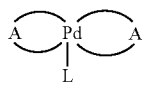

(IA)

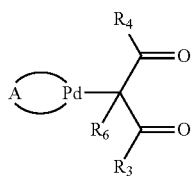

(IB)

wherein:

L is a ligand selected from the group consisting of P(R)$_3$, P(OR)$_3$, O=P(R)$_3$, RCN and substituted or unsubstituted pyridines, where R is selected from the group consisting of methyl, ethyl, linear or branched (C$_3$-C$_{16}$) alkyl, (C$_1$-C$_{16}$)perfluoroalkyl, (C$_3$-C$_{10}$)cycloalkyl, (C$_6$-C$_{10}$)aryl(C$_1$-C$_{16}$)alkyl and substituted or unsubstituted (C$_6$-C$_{10}$)aryl;

each A independently is a bidentate monoanionic ligand of formula (II):

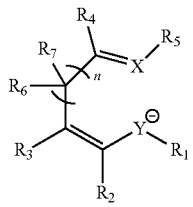

(II)

wherein:

n is an integer 0, 1 or 2;

X and Y are independently of each other selected from O, N and S;

R$_1$, R$_2$, R$_3$, R$_4$, R$_5$, R$_6$ and R$_7$ are the same or different and each independently selected from the group consisting of hydrogen, methyl, ethyl, linear or branched (C$_3$-C$_{16}$) alkyl, (C$_3$-C$_{10}$)cycloalkyl, (C$_6$-C$_{10}$)aryl(C$_1$-C$_{16}$)alkyl and substituted or unsubstituted (C$_6$-C$_{10}$)aryl; provided when either X or Y is O or S, R$_1$ and R$_5$, respectively, do not exist;

c) a photoacid generator selected from the group consisting of:

a compound of formula (III):

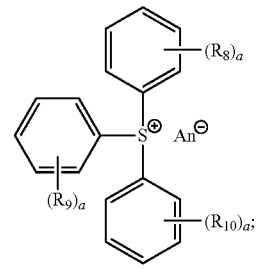

(III)

and a compound of formula (IV):

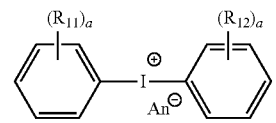

(IV)

wherein:

a is an integer from 0 to 5;

An$^\ominus$ is selected from the group consisting of Cl$^\ominus$, Br$^\ominus$, I$^\ominus$, BF$_4^\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis (4-fluorophenyl)borate, tetrakis(3,5-difluorophenyl) borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl) borate, ethyltris(perfluorophenyl)borate, phenyltris (perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl] pheny-l]borate, tetrakis[3-[1-methoxy-2,2,2-trifluoro-1-(trifluoromethyl)ethyl]-5-(trifluoromethyl)phenyl] borate, and tetrakis[3-[2,2,2-trifluoro-1-(2,2,2-trifluoroethoxy)-1-(trifluoromethyl)-ethyl]-5-(trifluoromethyl)phenyl]borate, PF$_6^\ominus$, SbF$_6^\ominus$, n-C$_4$F$_9$SO$_3^\ominus$, CF$_3$SO$_3^\ominus$ and p-CH$_3$(C$_6$H$_4$)—SO$_3^\ominus$;

R$_8$, R$_9$, R$_{10}$, R$_{11}$ and R$_{12}$ are the same or different and each independently selected from the group consisting of halogen, methyl, ethyl, linear or branched (C$_3$-C$_{20}$) alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$) bicycloalkoxy, (C$_7$-C$_{14}$)tricycloalkoxy, (C$_6$-C$_{10}$) aryloxy(C$_1$-C$_3$)alkyl, (C$_6$-C$_{10}$)-aryloxy, (C$_6$-C$_{10}$)-thioaryl, (C$_1$-C$_6$)alkanoyl(C$_6$-C$_{10}$)thioaryl, (C$_1$-C$_6$) alkoxy(C$_6$-C$_{10}$)aroyl(C$_1$-C$_6$)alkyl and (C$_6$-C$_{10}$)-thioaryl-(C$_6$-C$_{10}$)diarylsulfonium salt;

d) a compound selected from the group consisting of:

a compound of formula (X):

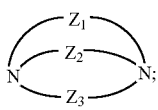

where $Z_1$, $Z_2$ and $Z_3$ are the same or different and each independently is $((CH_2)_gO)_h(CH_2)_g)$ where g and h are integers from 2 to 4;

a compound of formula (XI):

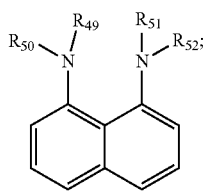

where $R_{49}$, $R_{50}$, $R_{51}$ and $R_{52}$ are the same or different and each independently selected from the group consisting of hydrogen, methyl, ethyl and linear or branched $(C_3-C_{20})$alkyl; and a compound of formula (XII):

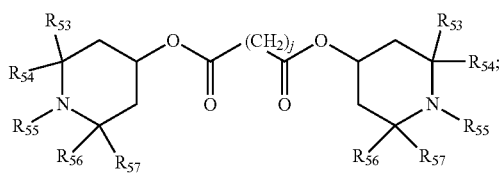

a compound of formula (XIII):

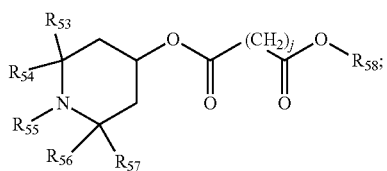

where j is an integer from 6 to 16;

$R_{53}$, $R_{54}$, $R_{56}$, $R_{57}$ and $R_{58}$ are the same or different and each independently selected from the group consisting of hydrogen, methyl, ethyl and linear or branched $(C_3-C_{20})$alkyl;

$R_{55}$ is selected from the group consisting of methyl, ethyl, linear or branched $(C_3-C_{20})$alkyl, methoxy, ethoxy and linear or branched $(C_3-C_{20})$alkoxy; and a compound of formula (XIV):

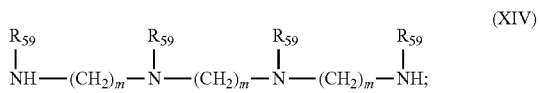

where each m maybe same or different and is an integer from 2 to 6;

$R_{59}$ is a group of formula:

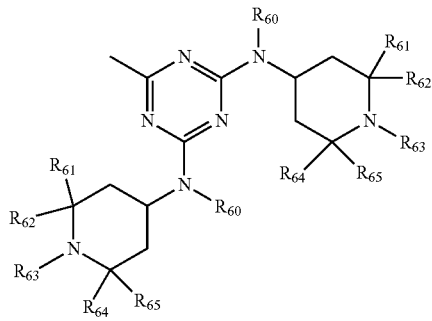

$R_{60}$, $R_{61}$, $R_{62}$, $R_{63}$, $R_{64}$ and $R_{65}$ are the same or different and each independently selected from the group consisting of hydrogen, methyl, ethyl and linear or branched $(C_3-C_{20})$alkyl; and a compound of formula (XV):

(XV)

where p is an integer from 1 to 5;

each $R_{66}$ maybe the same or different and each independently selected from the group consisting of halogen, methyl, ethyl and linear or branched $(C_3-C_{20})$alkyl and $NR_{67}R_{68}$, where each $R_{67}$ and $R_{67}$ are the same or different and each independently selected from the group consisting of methyl, ethyl and linear or branched $(C_3-C_{20})$alkyl; and e) a photosensitizer.

19. The kit according to claim 18, which contains at least two distinct first and second monomers of formula (V), wherein the first monomer is completely soluble in the second monomer, and when a composition of said kit is exposed to suitable actinic radiation for a sufficient length of time it forms a substantially transparent film having at least 90 percent of visible light transmission.

20. The kit according to claim 18, which is selected from the group consisting of:
  5-phenethylbicyclo[2.2.1]hept-2-ene (PENB), bis(2,2,6,6-tetramethyl-3,5-heptanedionato)palladium(II) (Pd472), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);
  5-decylbicyclo[2.2.1]hept-2-ene (DecNB), bis(2,2,6,6-tetramethyl-3,5-heptanedionato)palladium(II) (Pd472), 4,4'-di-$C_{10-13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1) 1,8-bis(dimethylamino)-naphthalene and 2-isopropyl-9H-thioxanthen-9-one (ITX);

5-phenethylbicyclo[2.2.1]hept-2-ene (PENB), bis(2,2,6,6-tetramethyl-3,5-heptanedionato)palladium(II) (Pd472), 4,4'-di-$C_{10\text{-}13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 4-dimethylaminopyridine (DMAP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 3-bromopyridine (BP) and 2-isopropyl-9H-thioxanthen-9-one (ITX);

5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-phenylbicyclo[2.2.1]hept-2-ene (PhNB), 5-hexylbicyclo[2.2.1]hept-2-ene (HexNB), palladium (hexafluoroacetylacetonate)$_2$ tri-isopropylphosphine (Pd680), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-decylbicyclo[2.2.1]hept-2-ene (DecNB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX); and 5-hexadecylbicyclo[2.2.1]hept-2-ene (HexadecylNB), 5-phenethylbicyclo[2.2.1]hept-2-ene (PENB), palladium hexafluoroacetylacetonate (Pd520), 4,4'-di-$C_{10\text{-}13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX); and 5-decylbicyclo[2.2.1]hept-2-ene (DecNB), palladium (hexafluoroacetylacetonate)$_2$ tri-isopropylphosphine (Pd680), 4,4'-di-$C_{10\text{-}13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX).

\* \* \* \* \*